(12) United States Patent
Zhong et al.

(10) Patent No.: US 10,525,398 B2
(45) Date of Patent: Jan. 7, 2020

(54) PROTEIN NANOFIBER AIR FILTER MATERIALS AND METHODS

(71) Applicant: Washington State University, Pullman, WA (US)

(72) Inventors: Wei-hong Zhong, Pullman, WA (US); Hamid Souzandeh, Pullman, WA (US); Yu Wang, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 15/940,498

(22) Filed: Mar. 29, 2018

(65) Prior Publication Data
US 2018/0214813 A1 Aug. 2, 2018

Related U.S. Application Data

(63) Continuation of application No. PCT/US2016/054526, filed on Sep. 29, 2016.
(Continued)

(51) Int. Cl.
*B01D 53/04* (2006.01)
*B01D 53/50* (2006.01)
(Continued)

(52) U.S. Cl.
CPC ............. *B01D 53/04* (2013.01); *B01D 53/00* (2013.01); *B01D 53/02* (2013.01); *B01D 53/14* (2013.01);
(Continued)

(58) Field of Classification Search
CPC .... B01D 39/00; B01D 39/04; B01D 46/0038; B01D 46/00; B01D 2201/00;
(Continued)

(56) References Cited

U.S. PATENT DOCUMENTS 8,741,152 B2 * 6/2014 Peng ................ B01D 67/0006 210/500.25
2010/0270233 A1 * 10/2010 Kim ................ B01D 67/0013 210/490
(Continued)

FOREIGN PATENT DOCUMENTS

EP 2 179 779 B1 * 11/2016 ......... B01D 67/0006

OTHER PUBLICATIONS

International Preliminary Report on Patentability dated Apr. 12, 2018, issued in corresponding International Application No. PCT/US2016/054526, filed Sep. 29, 2016, 7 pages.
(Continued)

*Primary Examiner* — Timothy C Vanoy
(74) *Attorney, Agent, or Firm* — Christensen O'Connor Johnson Kindness PLLC

(57) ABSTRACT

Air filters formed from mats of protein-containing nanowires are provided. The nanowires are formed into a mat with pores that allow air to pass through while physically filtering particulate matter. The protein in the protein-containing nanowires also serves to chemically filter polluted air passed through the filter. Specifically, chemical functional groups from the many amino acids that comprise the protein of the protein-containing nanowire react with certain chemical pollutants (e.g., carbon monoxide and formaldehyde) in order to capture or otherwise neutralize the pollutant. Accordingly, the single nanofiber mat performs two filtering functions. Methods of filtering air using the provided air filters are also disclosed, as well as methods for making the air filters from protein-containing nanofibers.

19 Claims, 54 Drawing Sheets

Related U.S. Application Data

(60) Provisional application No. 62/234,087, filed on Sep. 29, 2015.

(51) Int. Cl.

| | | |
|---|---|---|
| *B01D 53/56* | (2006.01) | |
| *B01D 53/62* | (2006.01) | |
| *B01D 53/72* | (2006.01) | |
| *C08J 5/00* | (2006.01) | |
| *B01D 53/00* | (2006.01) | |
| *B01D 53/02* | (2006.01) | |
| *B01D 53/14* | (2006.01) | |
| *B01D 53/82* | (2006.01) | |
| *B01J 20/24* | (2006.01) | |
| *B01J 20/26* | (2006.01) | |
| *B01J 20/28* | (2006.01) | |
| *B01D 53/58* | (2006.01) | |
| *B01D 53/64* | (2006.01) | |
| *B01D 53/66* | (2006.01) | |

(52) U.S. Cl.
CPC ......... *B01D 53/508* (2013.01); *B01D 53/565* (2013.01); *B01D 53/62* (2013.01); *B01D 53/72* (2013.01); *B01D 53/82* (2013.01); *B01J 20/24* (2013.01); *B01J 20/261* (2013.01); *B01J 20/262* (2013.01); *B01J 20/28007* (2013.01); *B01J 20/28035* (2013.01); *B01J 20/28038* (2013.01); *C08J 5/005* (2013.01); *B01D 53/58* (2013.01); *B01D 53/64* (2013.01); *B01D 53/66* (2013.01); *B01D 2252/205* (2013.01); *B01D 2253/20* (2013.01); *B01D 2253/202* (2013.01); *B01D 2253/302* (2013.01); *B01D 2253/304* (2013.01); *B01D 2253/308* (2013.01); *B01D 2257/106* (2013.01); *B01D 2257/302* (2013.01); *B01D 2257/404* (2013.01); *B01D 2257/406* (2013.01); *B01D 2257/502* (2013.01); *B01D 2257/504* (2013.01); *B01D 2257/60* (2013.01); *B01D 2257/708* (2013.01); *B01D 2257/7025* (2013.01); *B01D 2257/91* (2013.01); *B01D 2258/06* (2013.01); *B01J 2220/445* (2013.01); *C08J 2329/04* (2013.01); *C08J 2333/20* (2013.01); *C08J 2389/00* (2013.01); *C08J 2471/02* (2013.01); *Y02A 50/2341* (2018.01); *Y02C 10/04* (2013.01); *Y02C 10/08* (2013.01); *Y02C 20/20* (2013.01)

(58) Field of Classification Search
CPC ............ B01D 2239/00; B01D 2239/02; B01D 2239/025; B01D 2239/0258; B01D 2239/045; B01D 46/0027; B01D 39/16; B01D 39/1607; Y10S 977/705; Y10S 977/767; Y10S 977/963
See application file for complete search history.

(56) References Cited

U.S. PATENT DOCUMENTS

2012/0135234 A1\* 5/2012 Netravali ........... B01D 39/1615
428/401
2013/0252526 A1   9/2013 Paul et al.

OTHER PUBLICATIONS

International Search Report and Written Opinion dated Dec. 13, 2016, issued in corresponding International Application No. PCT/US2016/054526, filed Sep. 29, 2016, 7 pages.

Lang, G., et al., "Air Filter Devices Including Nonwoven Meshes of Electrospun Recombinant Spider Silk Proteins," Journal of Visualized Experiments 75:e50492, May 2013, pp. 1-10.

Lubasova, D., et al., "Water-Resistant Plant Protein-Based Nanofiber Membranes," Journal of Applied Polymer Science 132(16):1-14, Apr. 2015.

Souzandeh, H., et al., "Soy-Protein-Based Nanofabrics for Highly Efficient and Multifunctional Air Filtration," ACS Applied Materials & Interfaces 8(31):20023-20031, Jul. 2016.

\* cited by examiner

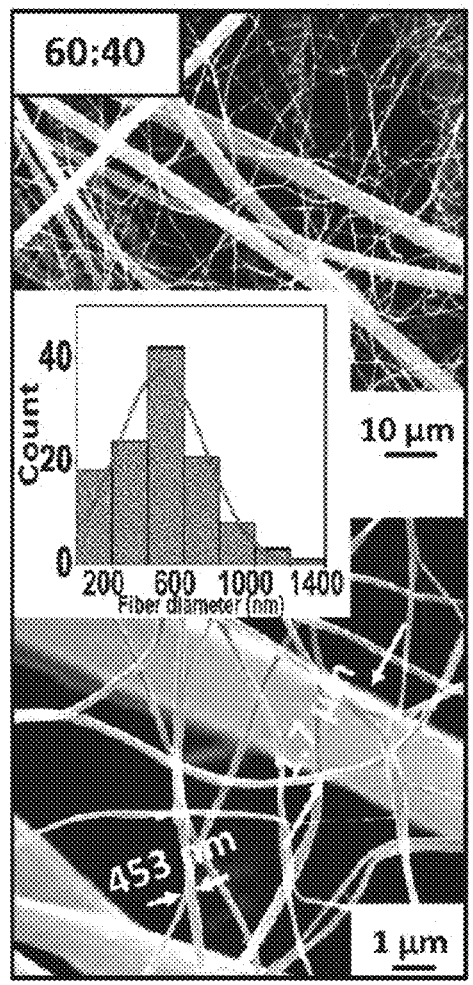
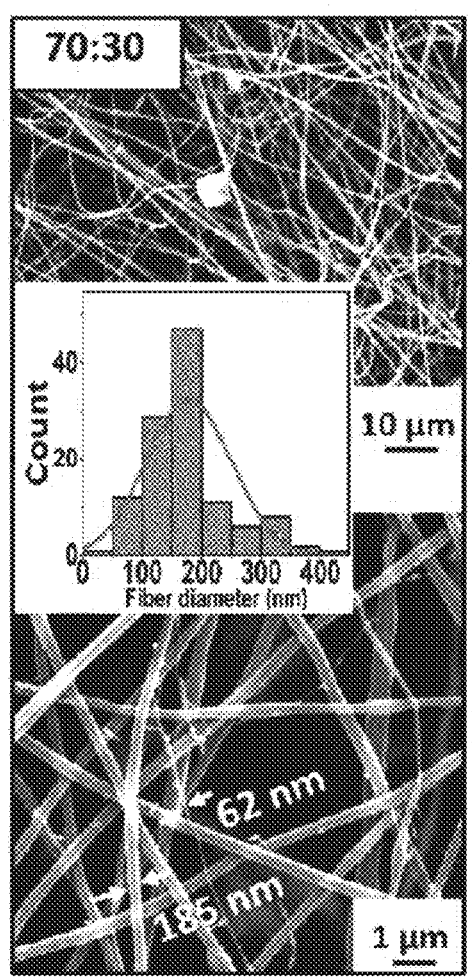
*FIG. 2a*  *FIG. 2b*

PROTEIN NANOFIBER AIR FILTER MATERIALS AND METHODS

CROSS-REFERENCE TO RELATED APPLICATION

This application is a continuation of PCT/US2016/054526, filed Sep. 29, 2016, which claims the benefit of U.S. Provisional Application No. 62/234,087, filed Sep. 29, 2015, the disclosures of which are hereby incorporated by reference in their entirety.

BACKGROUND

Air pollution has become a major environmental concern due to the huge amount of pollutants produced from vast human activities. It contains numerous combinations of pollutants such as particle matter (PM) of various sizes, chemical mixtures, biological hazards, and etc. Moreover, creation of unexpected chemical compounds due to the photochemical reactions in the polluted air, makes it more and more puzzling to clean the air. These complicated mixtures have posed excessive threats to public health. PM contains small solid particles and liquid droplets with different sizes. Regarding the size, particulate pollutants can be categorized by $PM_{2.5}$ and $PM_{10-2.5}$, indicating particle sizes below 2.5 and between 2.5 and 10 respectively. $PM_{2.5}$ is mainly one of the major pollutants in many developing countries. These particles are commonly composed of organic (e.g. carbon derivatives species such as carbon oxides) and inorganic (e.g. nitrates, sulfates, silicates, etc.) compounds which can seriously influence the air quality, public health, climate change, air visibility and so on. In addition, polluted air includes numerous types of toxic gaseous molecules, such as sulfur oxides ($SO_x$), nitrogen oxides ($NO_x$), carbon oxides (CO and $CO_2$), formaldehyde (HCHO), methane ($CH_4$), and a mixture of other volatile organic compounds (VOCs). These chemicals can undergo various photochemical reactions which may lead to the creation of unexpected hazardous pollutants. Biological hazards including bacteria, viruses, mites, pollen and etc. can trigger many allergic reactions and infectious illnesses such as influenza, measles and chicken pox. Because of the intensive effects of these pollutants on the environment and human health, providing an effective protection, particularly toward improving the indoor air quality, is urgently needed.

Filtration membranes are commonly used to remove the pollutants from the air and improve the quality of the air. Some attempts have been made for enhancing the outdoor personal protection, and improving the indoor air quality. An ideal air filter should have a high removal efficiency of pollutants yet maintaining low resistance to the air flow. Conventional air filters are usually made of micron-size fibers of synthetic plastics such as polyethylene and polypropylene. These air filters are ineffective for removing the toxic gaseous chemicals from the air due to the lack of active functional groups in the structure of the raw materials. These materials are only effective for capturing particulate pollutants based on the four primary physical and size-based filtration mechanisms, including sieving, interception, impaction, and diffusion.

In view of increasing global pollution, a need exist to provide filtration materials that filter both particles and chemical pollutant species, while not significantly reducing air flow.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In order to address the need for improved air filtering, we have found that the protein-based nanofiber ("nanofabric") materials can provide multifunctional air filtration capabilities with very high affinity to various pollutants. These protein-based nanofiber filters demonstrate extremely high removal efficiencies for both solid particles with different sizes and various toxic gaseous chemicals while maintaining a very low resistance to air. These capabilities make it possible to use thin layers of the protein-based nanofiber materials to develop high efficiency air filtering materials for practical filtration applications.

In one aspect, an air filter is provided. In one embodiment, the air filter includes a porous nanofiber mat configured to filter particles having a diameter of about 0.1 μm or greater when air is passed through the air filter, the porous nanofiber mat comprising a plurality of protein-containing nanofibers, comprising a protein configured to bind to, and thereby filter, at least one chemical species.

In another aspect, a method of filtering air is provided. In one embodiment, the method includes passing air through an air filter as provided herein. As noted previously, the disclosed air filters formed from porous nanofiber mats are intended to replace present air filters in essentially any application. Accordingly, the method of filtering air broadly include any application of the disclosed air filters for filtering air, wherein the air includes particulate matter and chemical pollutants, both of which are filtered (at least partially) by the protein-containing nanofibers.

In another aspect, a method of making an air filter according to the disclosed embodiments is provided. In one embodiment, the method includes electrospinning a solution comprising a solvent and a precursor to a protein-containing nanofiber. Electrospinning is applied in the present embodiments to solutions that form protein-containing nanofibers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2a-2d. SEM images of gelatin nanofabrics prepared in different ratios of AA-to-water; effect of solvent ratio on morphology and fiber diameters of gelatin nanofabrics compared with that of commercial HEPA filter; percentages in the table are relative standard deviation.

(FIGS. 3a, 3d) SEM images of gelatin filter with different magnifications along with photograph of gelatin air filter before filtration, (FIGS. 3b-3f) SEM images of gelatin filter with different magnifications along with photograph of gelatin air filter after filtration. Particulate removal efficiency of gelatin filter nanofabrics; (FIG. 3g) Particulate removal efficiency of gelatin air filters with different areal density for various PM particle sizes. (FIG.

3h) PM$_{2.5}$ and PM$_{10-2.5}$ removal efficiency comparison between gelatin air filters with different areal density and commercial HEPA filter.

FIGS. 4a-4d. Chemical removal efficiency of gelatin filter nanofabrics; (FIG. 4a) Formaldehyde (HCHO) removal efficiency comparison between gelatin air filters with different areal density and that of commercial HEPA filter, (FIG. 4b) Carbon monoxide (CO) removal efficiency comparison between gelatin air filters with different areal density and that of commercial HEPA filter. Pressure drop and overall air filter performance evaluation of gelatin filter material; (FIG. 4c) Dependence of pressure drop (air flow resistance) on the areal density for the gelatin nanofabrics, and (FIG. 4d) Quality factor comparison with commercial air filters and transparent PAN air filter, and gelatin air filter.

Figure 5A:
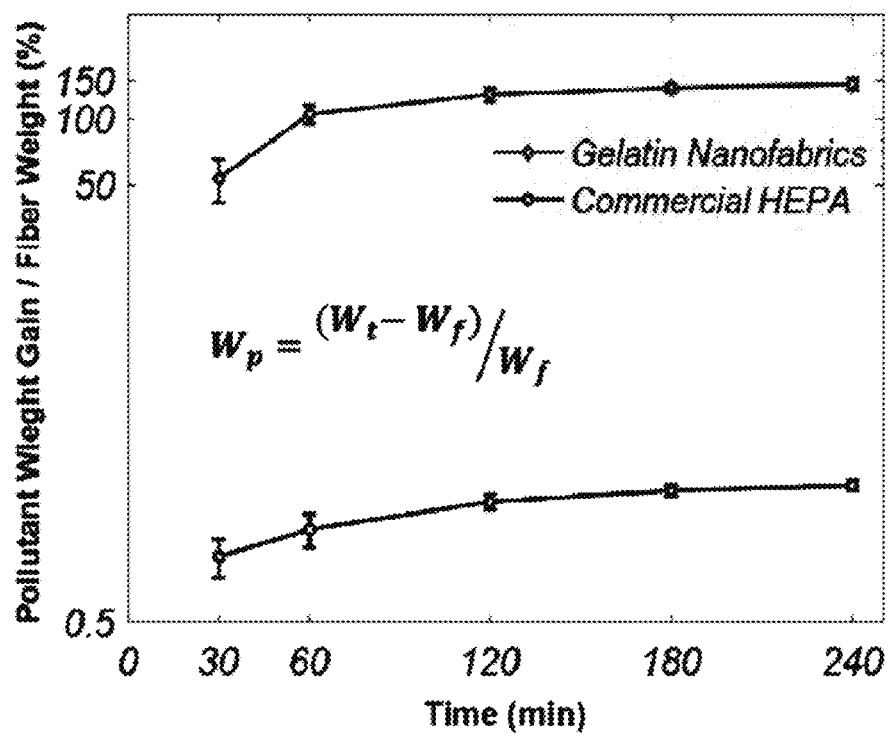
Figure 5B:
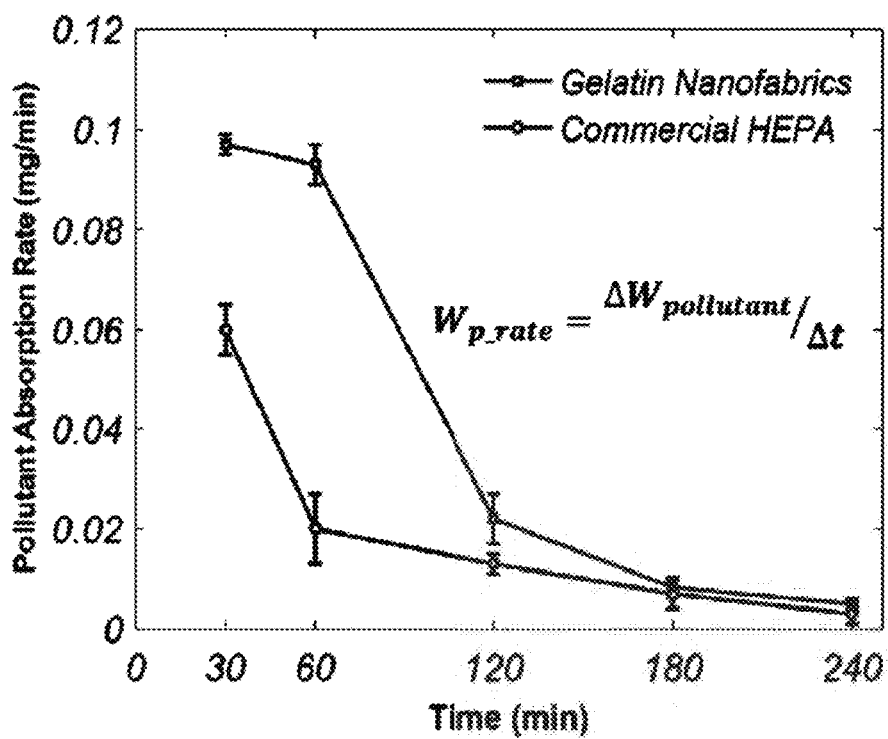

FIGS. 5a and 5b. (FIG. 5a) Pollutant weight percentage gain (W$_p$) changes of the gelatin air filter and commercial HEPA filter over the filtration time, and (FIG. 5b) pollutant weight absorption rate (W$_{p\_rate}$) of the gelatin air filter and commercial HEPA filter over the filtration time.

FIGS. 6a-6e. (FIG. 6a) Simplified representation of functional-capturing filtration mechanism of gelatin nanofabrics via interactions between gelatin molecules and pollutants. (FIG. 6b) SEM image of gelatin nanofabrics after filtration (FIG. 6c) FTIR characterization of cigarette smoke PM particles demonstrating existing functional groups. (FIG. 6d) FTIR characterization of gelatin filter before and after filtration showing the active functional groups and PM-filter interactions. (FIG. 6e) Functional group peak intensity comparison between gelatin fibers before and after filtration indicating strengthening of corresponding bonds due to PM-filter interactions.

FIGS. 7a-7f. SEM images of gelatin filter nanofabrics with different magnifications (FIGS. 7a-7c) before filtration test and (FIGS. 7d-7f) after filtration test showing the pollutants were grabbed around the fibers and deformed.

Figure 8A:
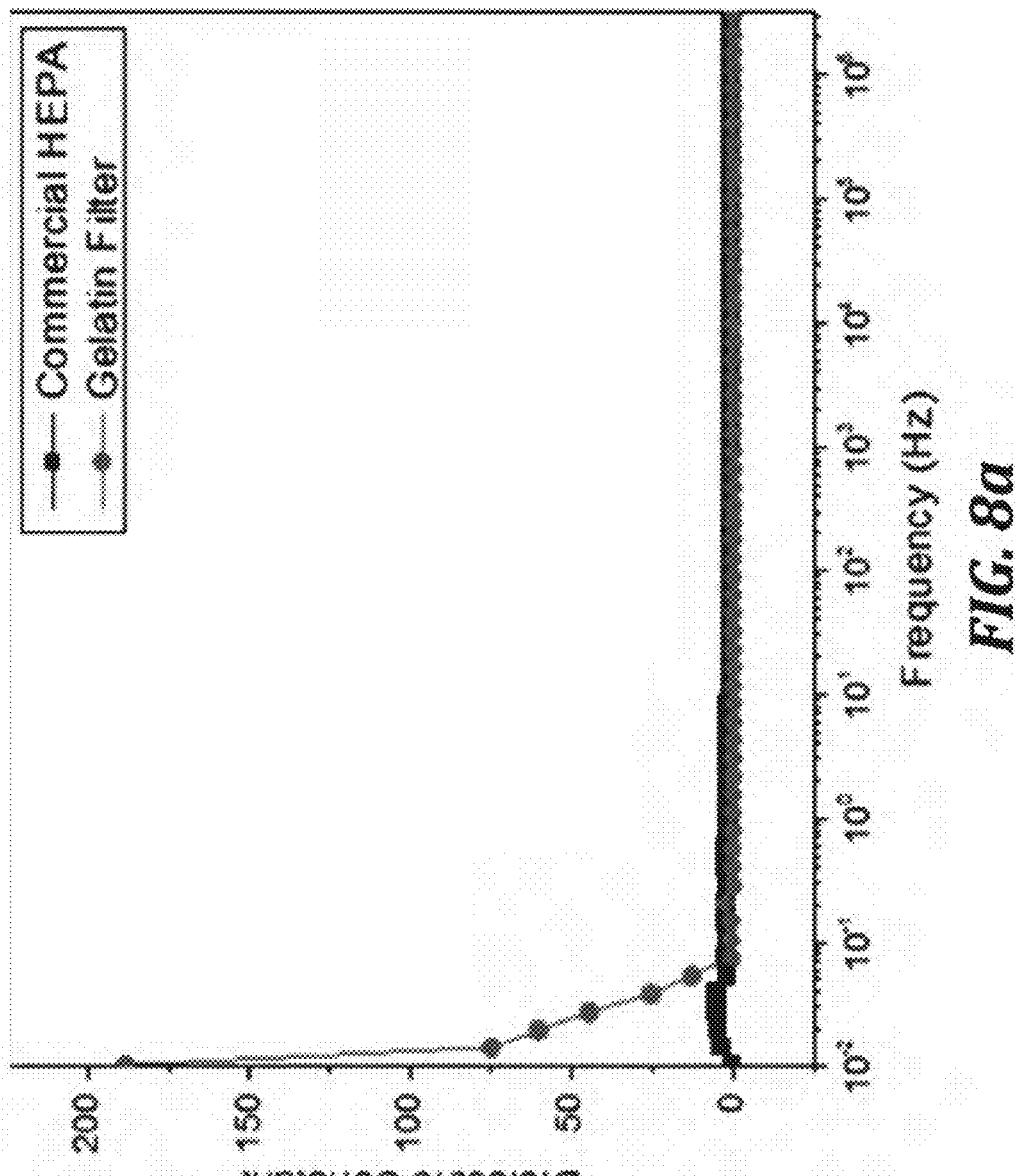
Figure 8B:
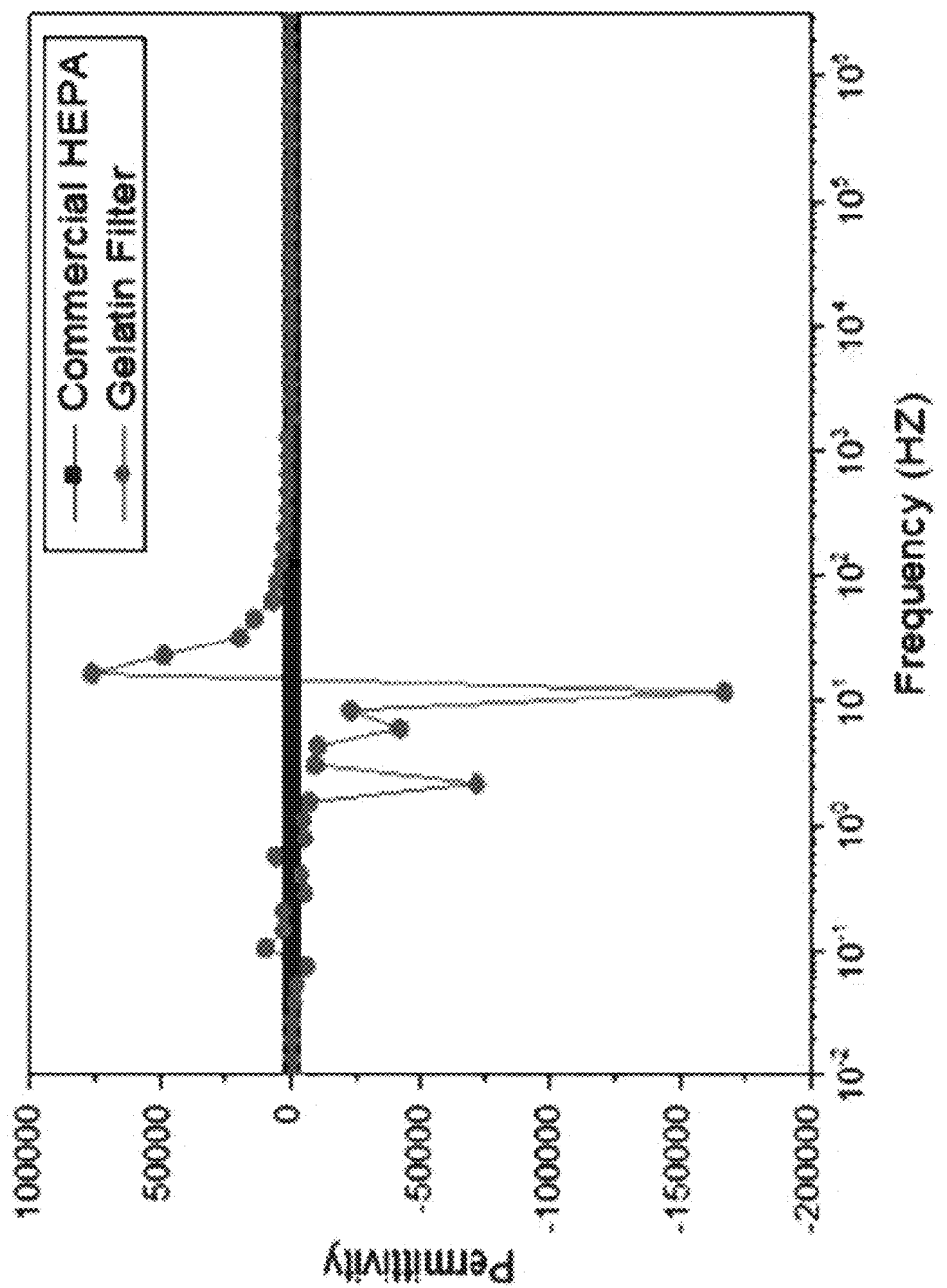

FIGS. 8a and 8b. Testing the functional group movements in the gelatin nanofabrics structure, FIG. 8a dielectric measurement, FIG. 8b permittivity measurement.

Figure 9C:
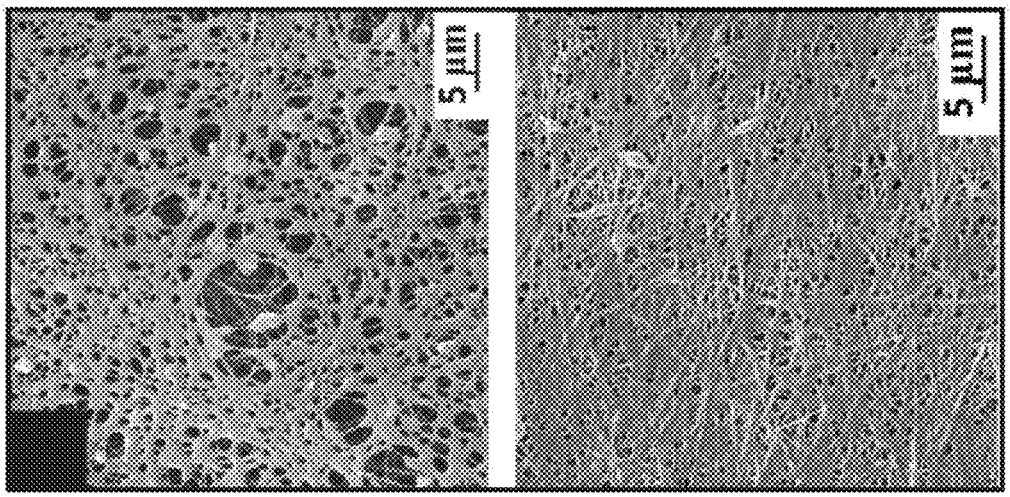
Figure 9B:
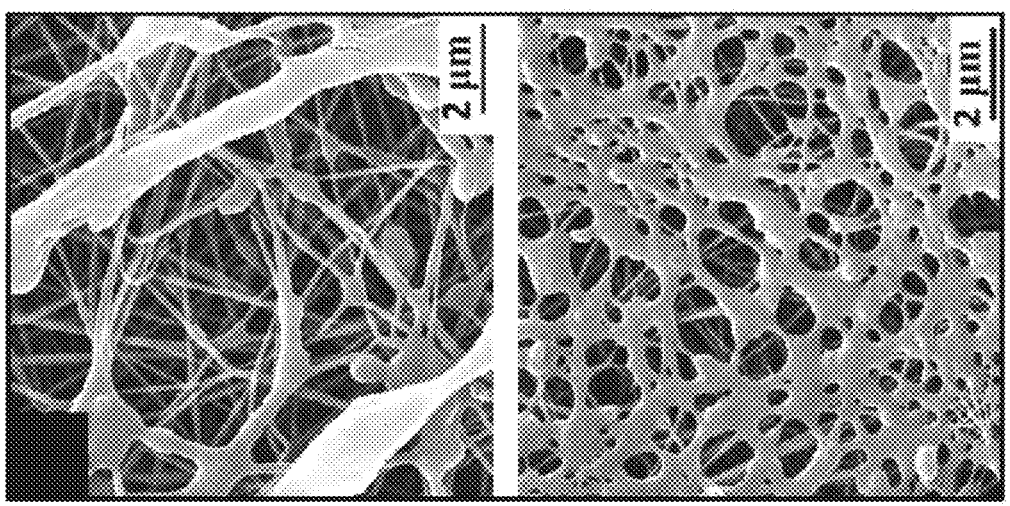
Figure 9A:
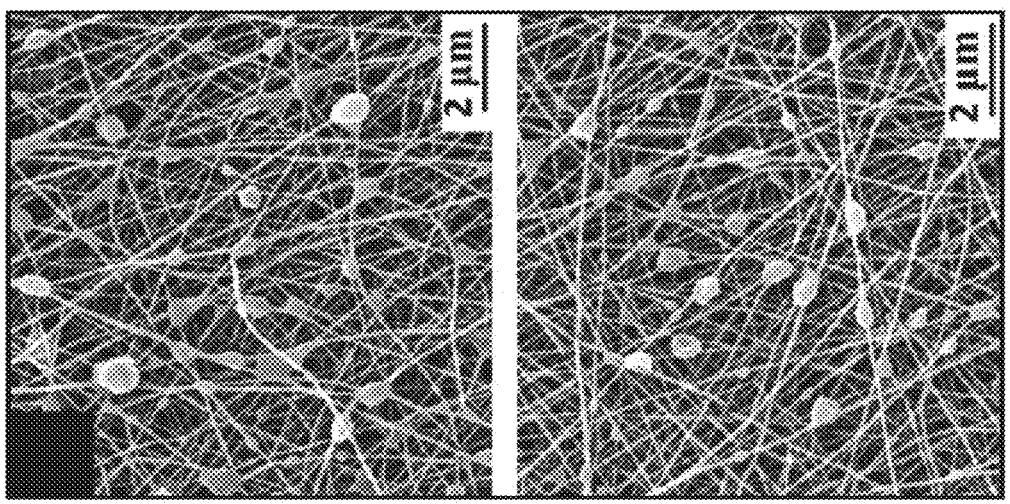

FIGS. 9a-9c. SEM images of gelatin air filter nanofabrics after being tested with cigarette smoke showing the deformation and migration of soft PM during saturation procedure, FIG. 9a first stage, FIG. 9b semi-saturated stage, and FIG. 9c saturated stage.

FIGS. 10a-10e. Denaturation of soy protein. (FIG. 10a) Schematic demonstration of pristine SPI powder, (FIG. 10b) SEM image of pristine SPI powders, (FIG. 10c) schematic demonstration of denatured SPI particles, (FIG. 10d) and (FIG. 10e), SEM and TEM images of the denatured SPI particles, respectively.

FIGS. 11a-11h. SEM images of SPI/PVA air filter nanofabrics before (FIGS. 11a, 11c, 11e) and after (FIGS. 11b, 11d, 11f) filtration with different SPI/PVA ratios: (FIGS. 11a, 11b) 0:1, (FIGS. 11c, 11d) 1:1, (FIGS. 11e, 11f) 1.5:1, Inserted digital photos are the air filter with SPI/PVA ratio of 1:1 before and after the air filtration testing. Scale bar: 1 μm. g) fiber diameter distribution and FIG. 11h pore size distribution of SPI/PVA air filter (SPI:PVA 1:1).

Figure 12:
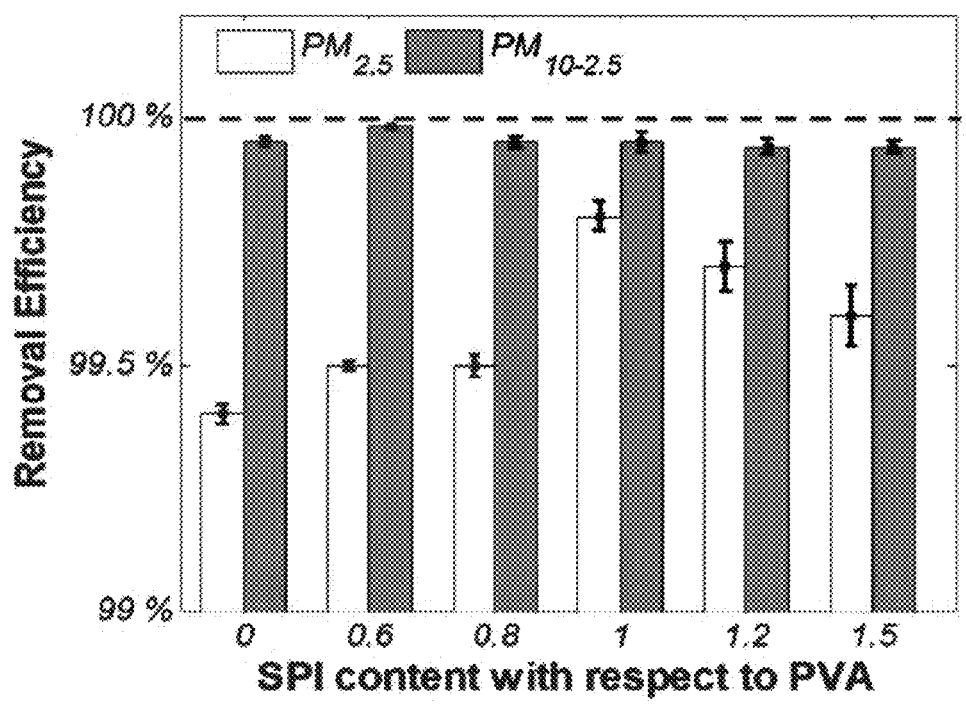

FIG. 12 Particulate removal efficiency of PM$_{2.5}$ and PM$_{10-2.5}$ for neat PVA and SPI/PVA air filter nanofabrics with different SPI content.

Figure 13A:
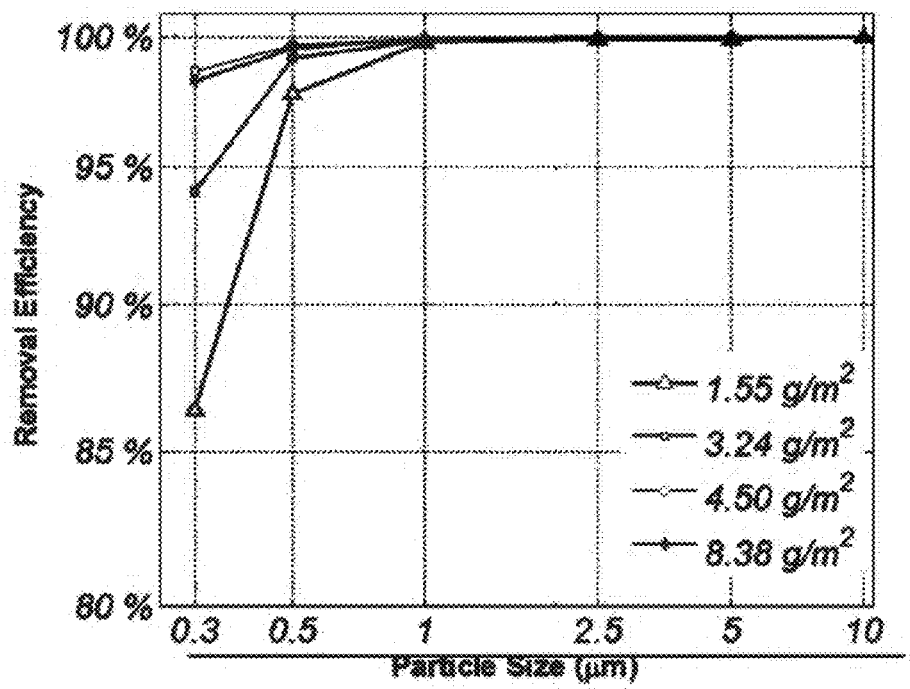
Figure 13B:
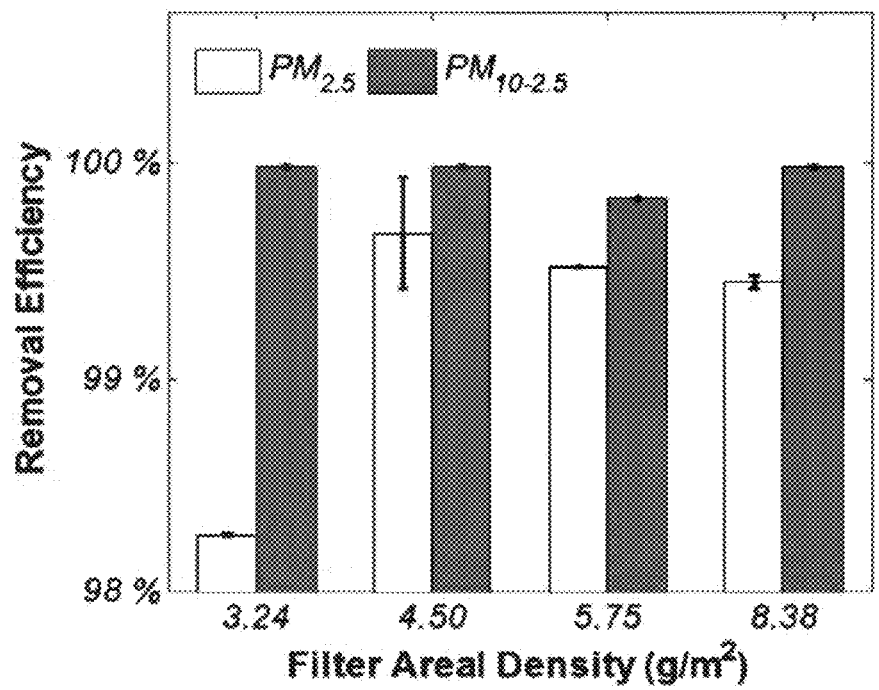

FIGS. 13a and 13b. Particulate removal efficiency of SPI/PVA air filters with different areal density. (FIG. 13a) Particulate removal efficiency for various PM particle sizes. (FIG. 13b) Effect of areal density on the PM$_{2.5}$ and PM$_{10-2.5}$ removal efficiency.

Figure 14A:
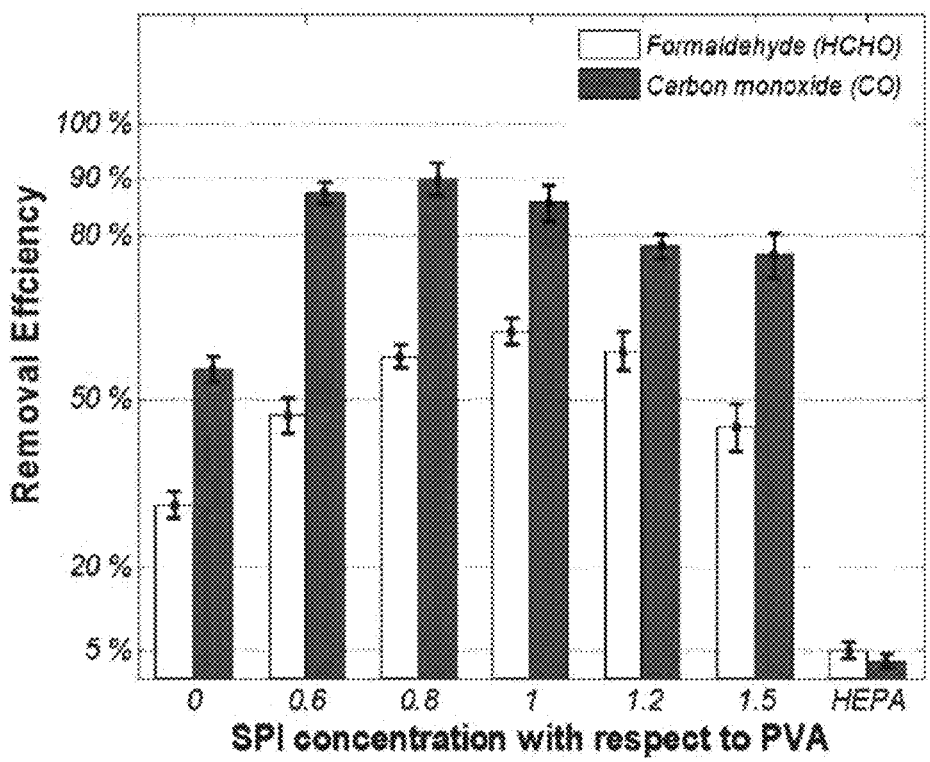
Figure 14B:
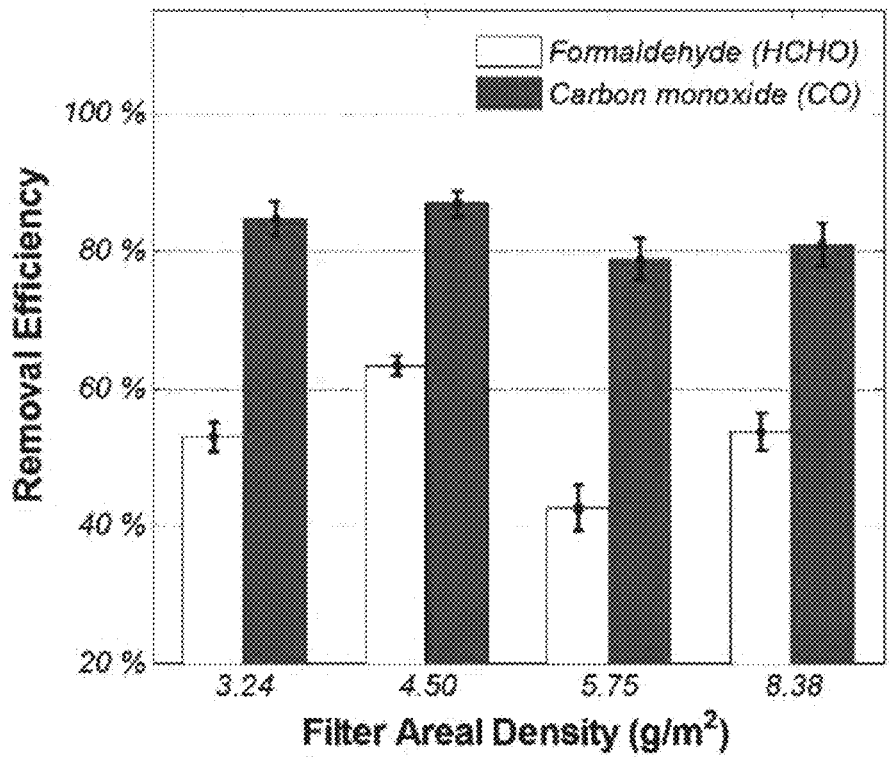

FIGS. 14a and 14b. Formaldehyde and Carbon monoxide removal efficiency for neat PVA and SPI/PVA nanofabrics: (FIG. 14a) effects of SPI concentration, and (FIG. 14b) effects of area density for SPI/PVA sample with ratio of 1:1.

Figure 15A:
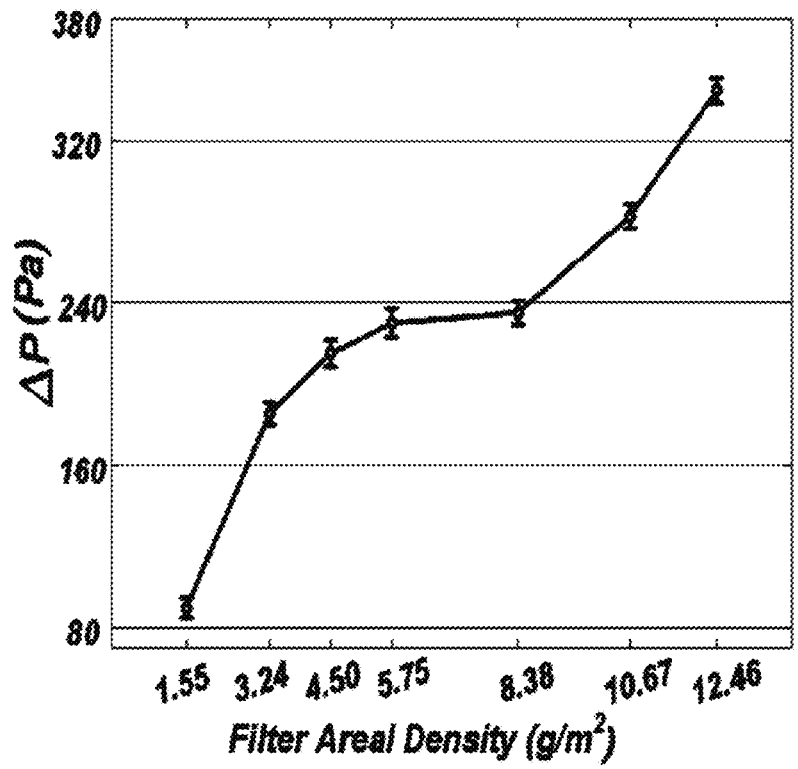
Figure 15B:
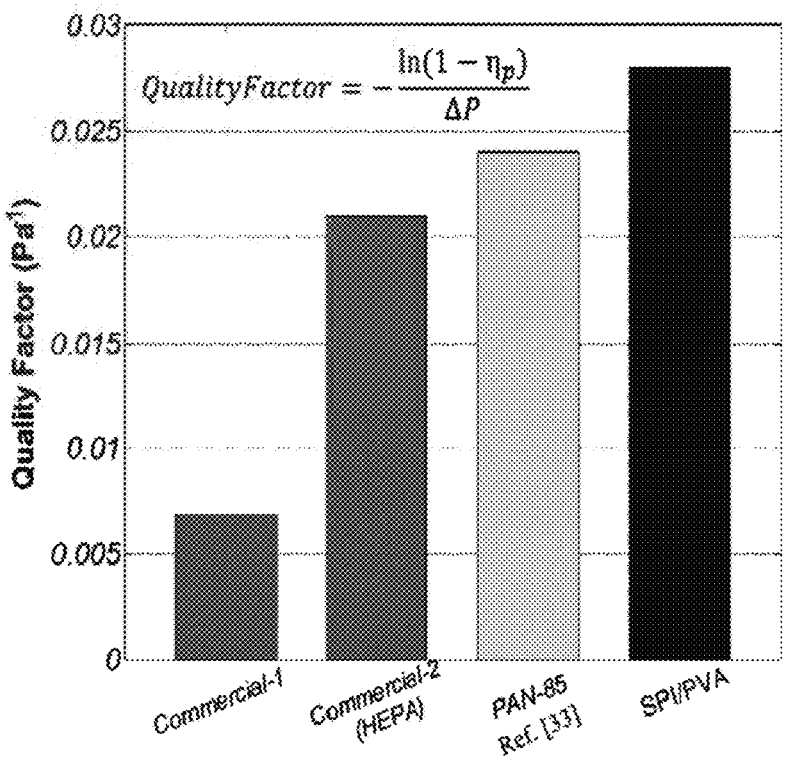

FIGS. 15a and 15b. Pressure drop and quality factor of SPI/PVA nanofabric filters. (FIG. 15a) Pressure drop (air flow resistance) for the optimized SPI/PVA air filters with different areal densities, and (FIG. 15b) Quality factor comparison among regular commercial air filter, commercial HEPA filter, transparent PAN air filter, and SPI/PVA with ratio of 1:1 and 4.50 g m$^{-2}$ for areal density.

Figure 16A:
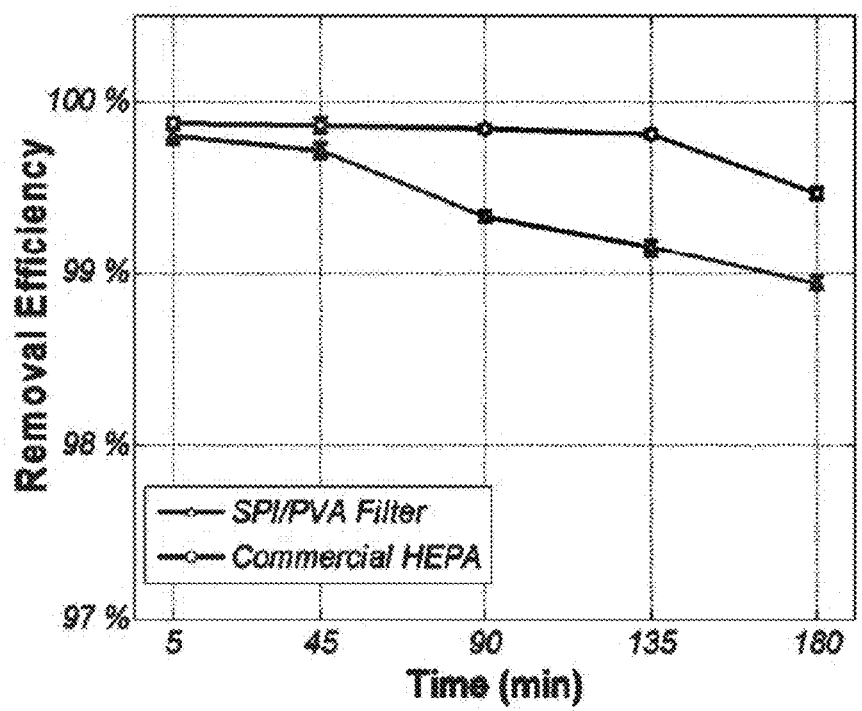
Figure 16B:
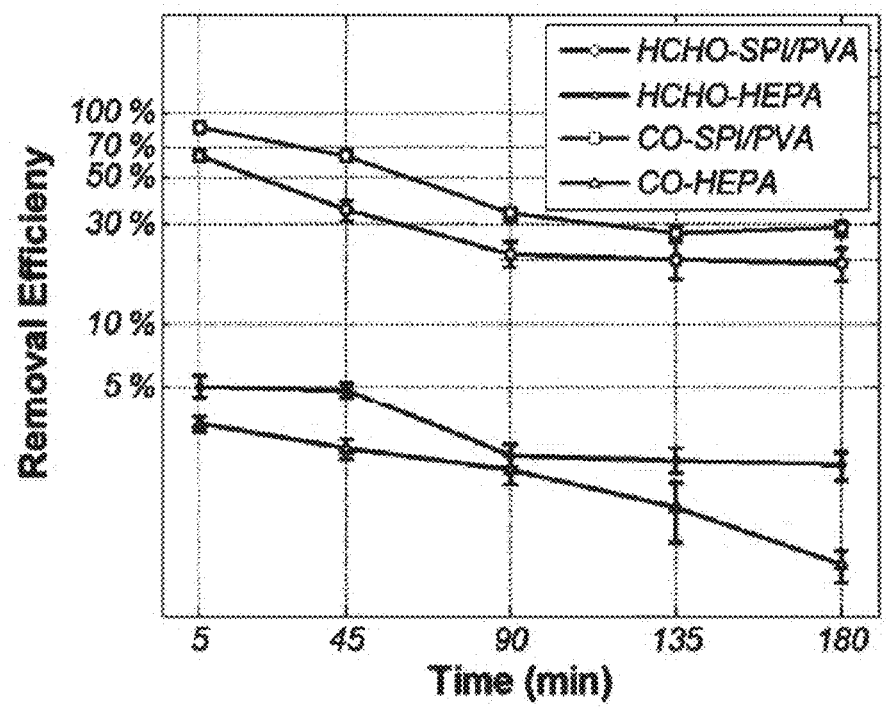
Figure 16C:
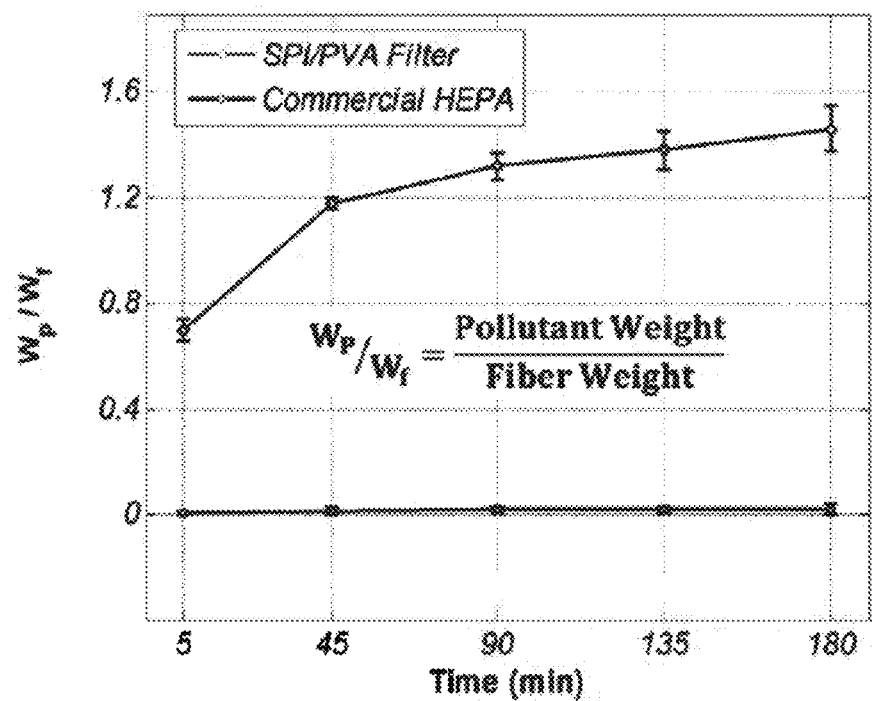

FIGS. 16a-16c. Study of the time-dependent behavior of the filtration performance for the SPI/PVA nanofabrics: FIG. 16a PM$_{2.5}$ filtration efficiency, FIG. 16b toxic chemical filtration efficiency, and FIG. 16c relative weight-gain of pollutions.

FIGS. 17a-17e. Filtration mechanism study of the PVA/ SPI nanofabric. (FIG. 17a) Simplified representation of interaction-based filtration mechanism for soy protein-based nanofabrics; (FIG. 17b) SEM image of SPI/PVA nanofabrics covered by pollutants; (FIG. 17c) FTIR characterization of cigarette smoke PM particles demonstrating the functional groups; (FIG. 17d) FTIR characterization of neat PVA and SPI/PVA nanofabrics before and after filtration. (FIG. 17e) Change of the peak intensity of functional groups/interactions responsible for the pollutant-nanofiber interactions.

Figure 18:
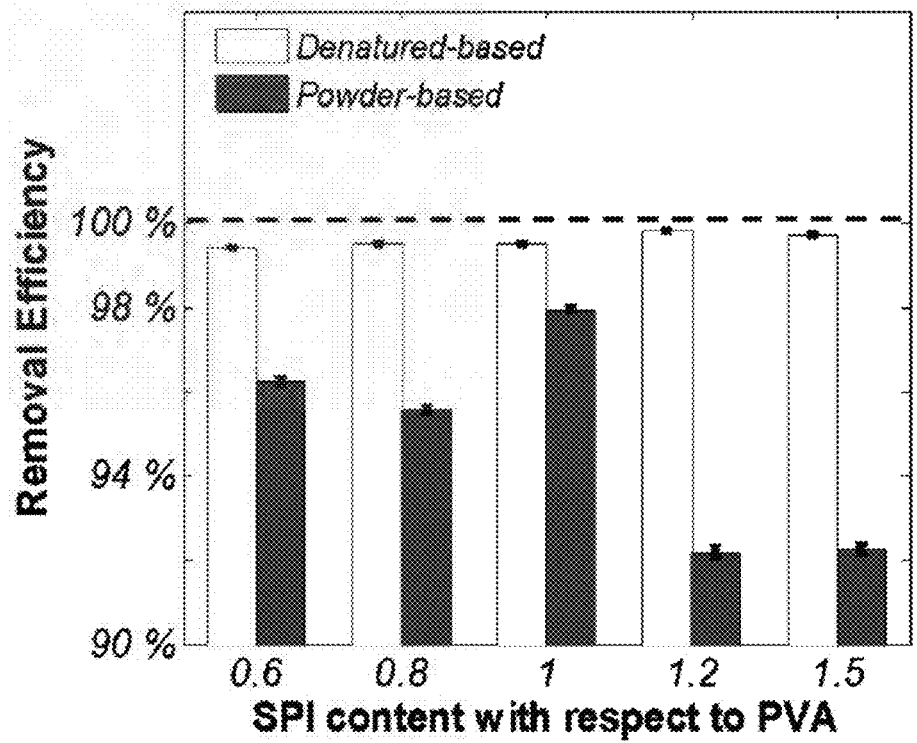

FIG. 18. Particulate removal efficiency of PM$_{2.5}$ for SPI/PVA air filter nanofabrics with different SPI content fabricated via solution-based/denatured-based and powder-based methods. From this figure, it can be found that solution-based method shows much higher removal efficiency than that of power-based method.

Figure 19A:
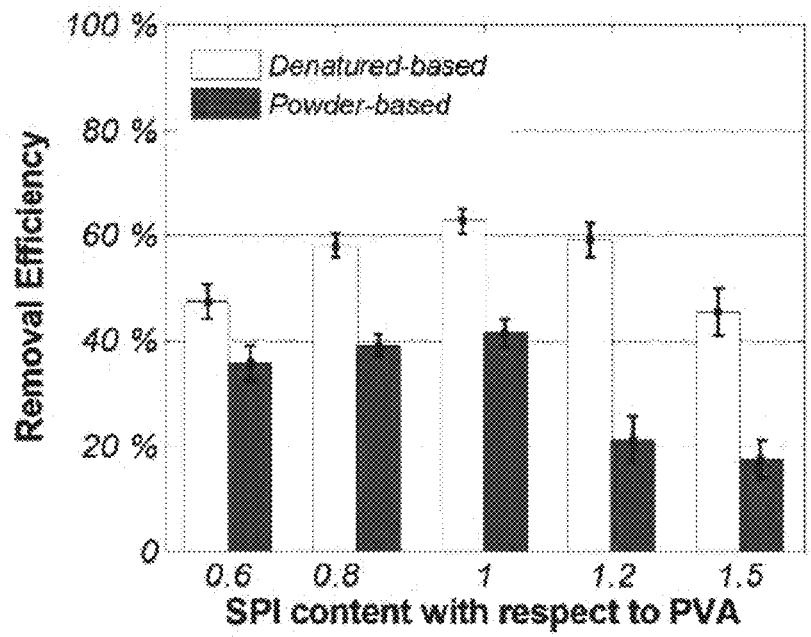
Figure 19B:
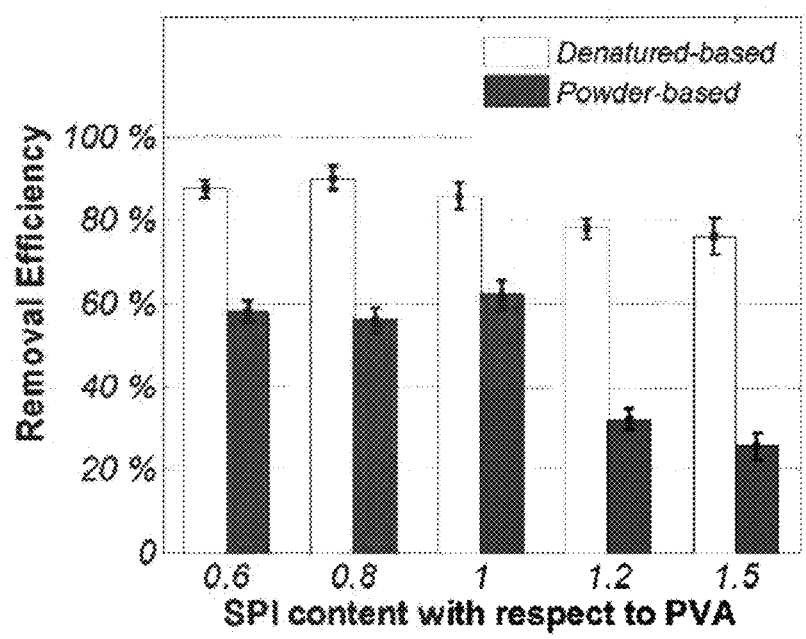
Figure 20A:
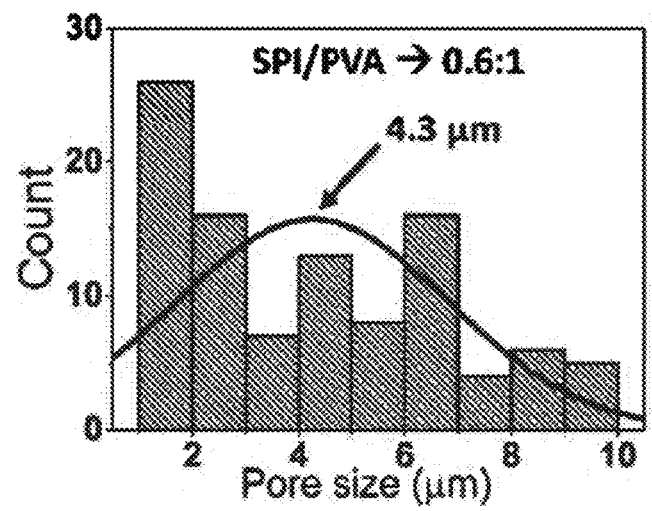
Figure 20B:
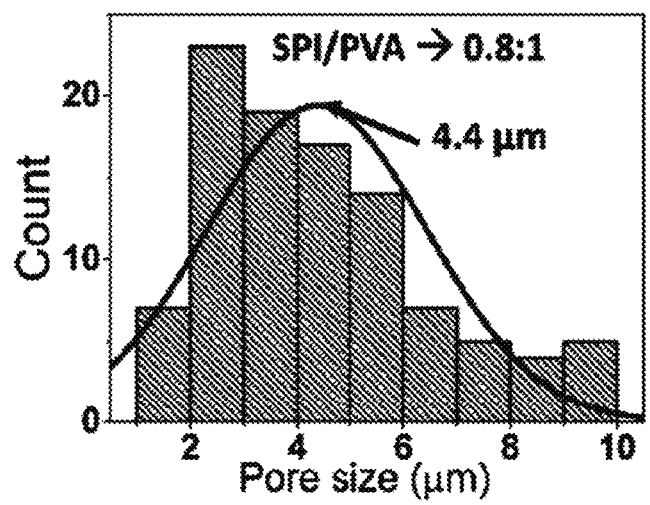
Figure 20C:
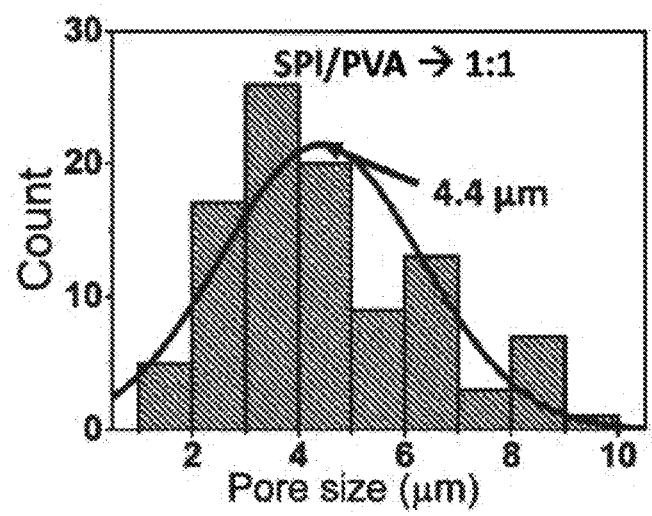
Figure 20D:
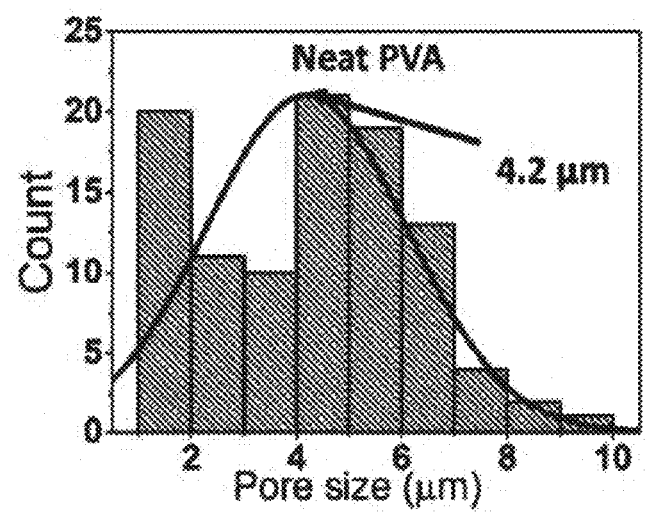
Figure 20E:
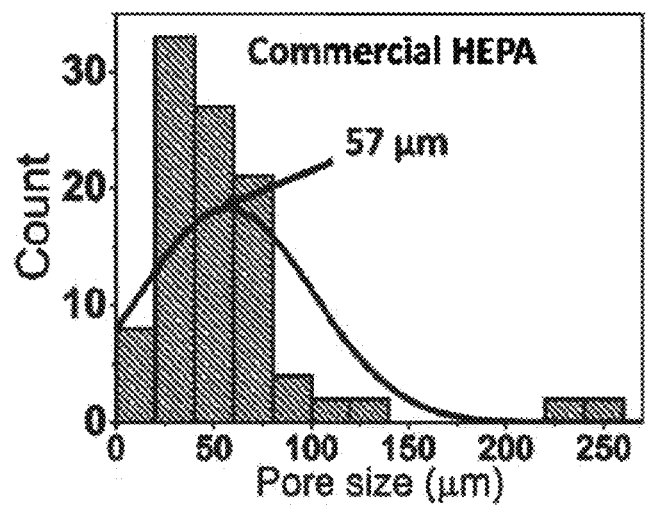
Figure 20F:
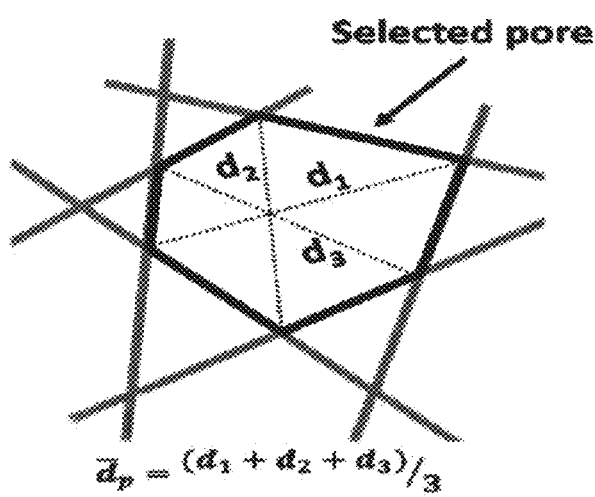
Figure 21A:
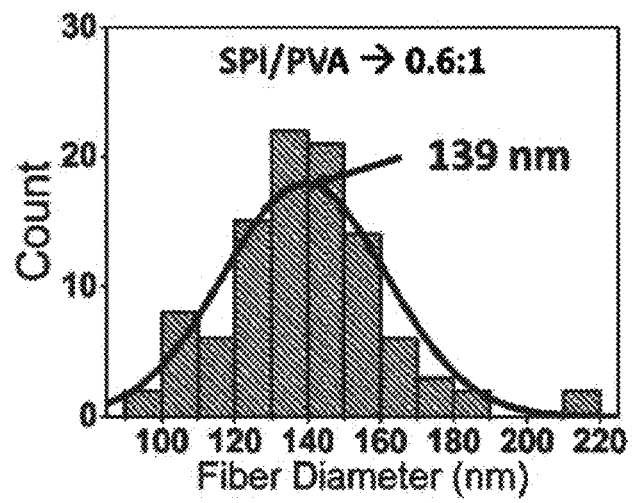
Figure 21B:
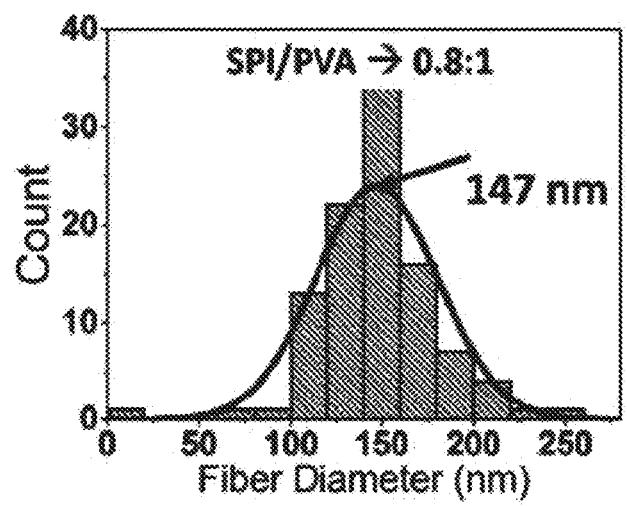
Figure 21C:
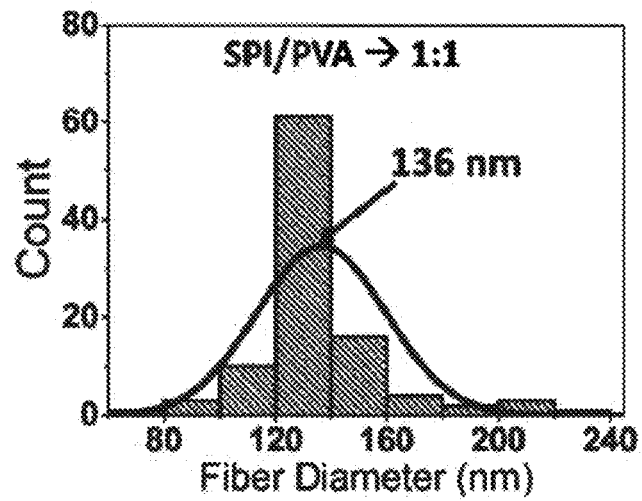
Figure 21D:
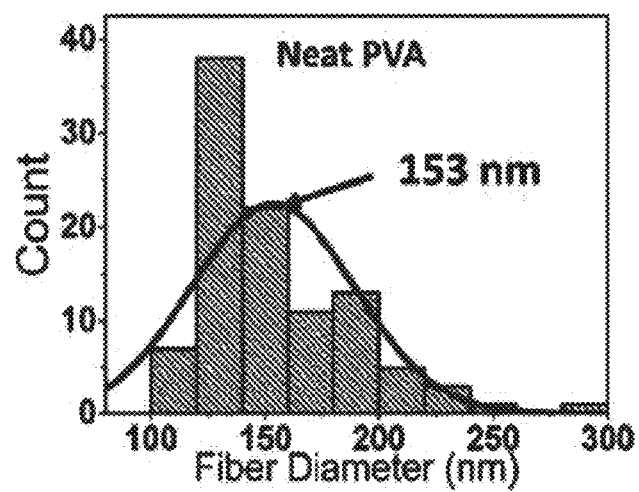
Figure 21E:
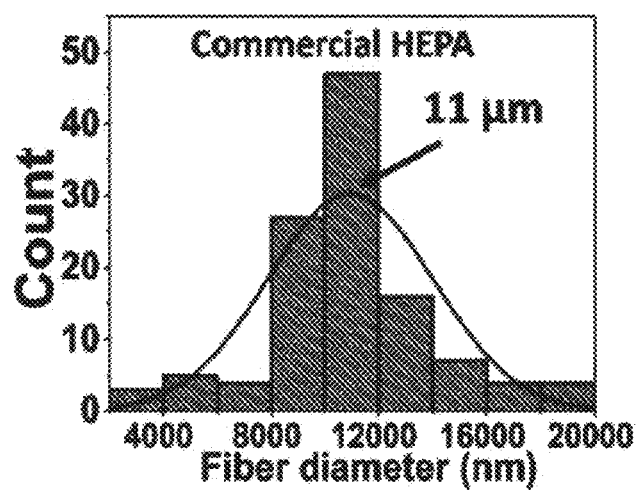

FIGS. 19a and 19b. Toxic Chemical removal efficiency of FIG. 19a formaldehyde and FIG. 19 carbon monoxide for SPI/PVA air filter nanofabrics with different SPI content fabricated via solution-based/denatured-based and powder-based methods. Similar to particulate removal efficiency, solution-based method shows much higher removal efficiency for toxic gases than that of power-based method.

FIGS. 20a-20f. Pore size and distribution of SPI/PVA nanofabrics with SPI to PVA ratio of (FIG. 20a) 0.6:1, (FIG. 20b) 0.8:1, (FIG. 20c) 1:1, along with that of (FIG. 20d) neat PVA nanofabrics, and (FIG. 20e) commercial HEPA filter, (FIG. 20f) Illustration of the way to determine the pore size (pore size=(d1+d2+d3)/3).

FIGS. 21a-21e. Distribution of the fiber diameter for SPI/PVA nanofabrics with SPI to PVA ratio of (FIG. 21a) 0.6:1, (FIG. 21b) 0.8:1, (FIG. 21c) 1:1, along with that of (FIG. 21d) neat PVA nanofabrics, and (FIG. 21e) commercial HEPA filter.

Figure 22A:
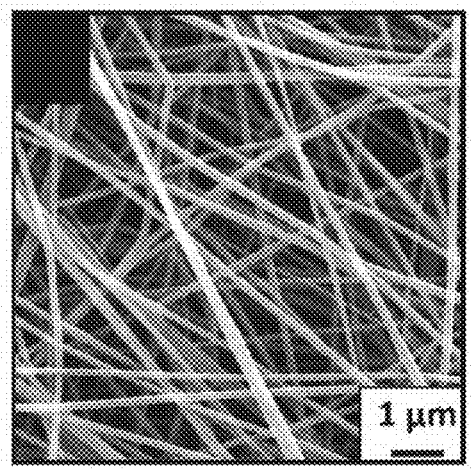
Figure 22B:
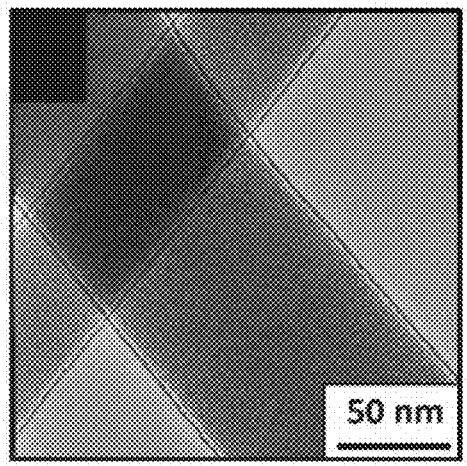
Figure 22C:
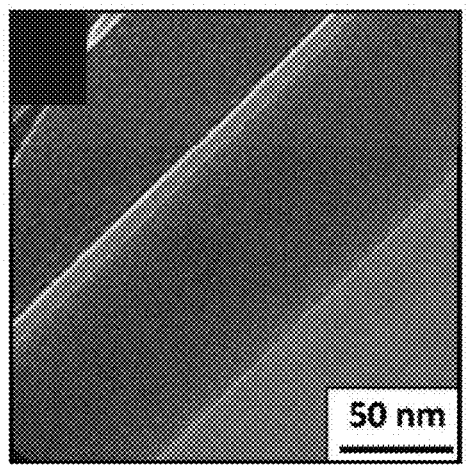
Figure 23A:
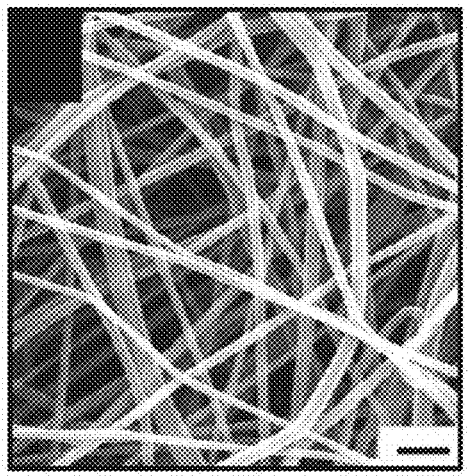
Figure 23B:
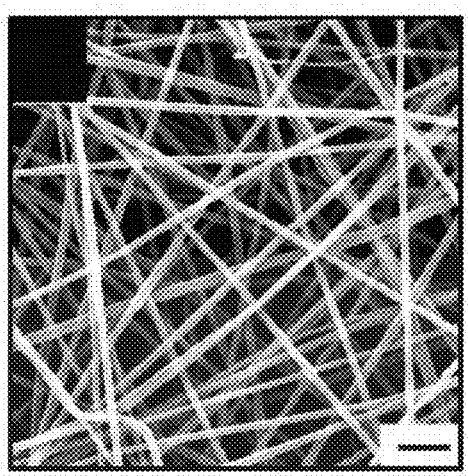
Figure 23C:
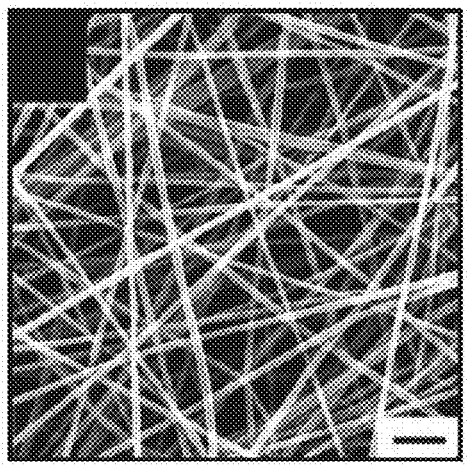
Figure 23D:
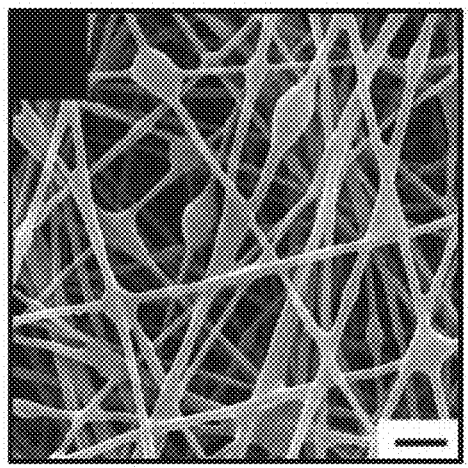
Figure 23E:
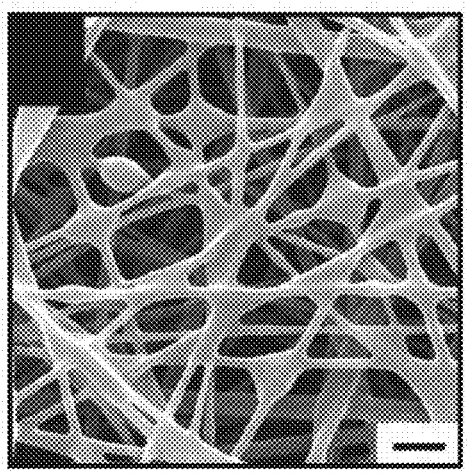
Figure 23F:
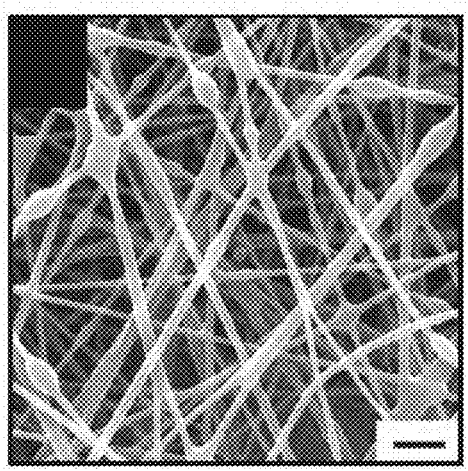

FIGS. 22a-22c. High magnification of the SPI/PVA nanofiber with SPI/PVA ratio of 1:1. (FIG. 22a) SEM and (FIG. 22b) and (FIG. 22c) TEM images. From these images, one can find that there is no SPI nanoparticles formed in the nanofiber, indicating good miscibility between denatured SPI and PVA.

FIGS. 23a-23f. SEM images of the nanofabrics before air filtration testing: (FIG. 23a), pure PVA nanofabric, (FIG. 23b) SPI/PVA with ratio of 0.8:1, (FIG. 23c) SPI/PVA with ratio of 1.5:1; SEM images of the nanofabrics after air filtration testing: (FIG. 23d), pure PVA nanofabric, (FIG. 23e) SPI/PVA with ratio of 0.8:1, (FIG. 23f) SPI/PVA with ratio of 1.5:1.

Figure 24A:
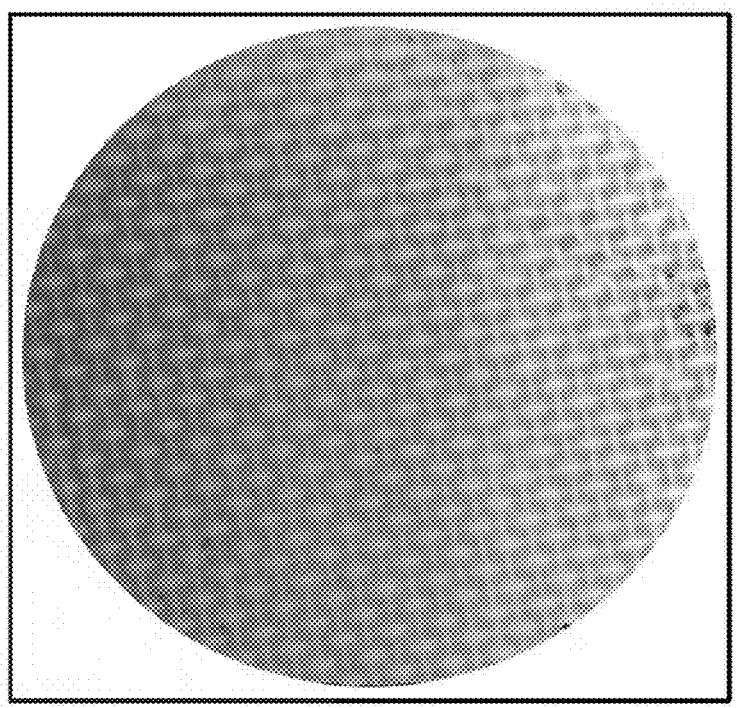
Figure 24B:
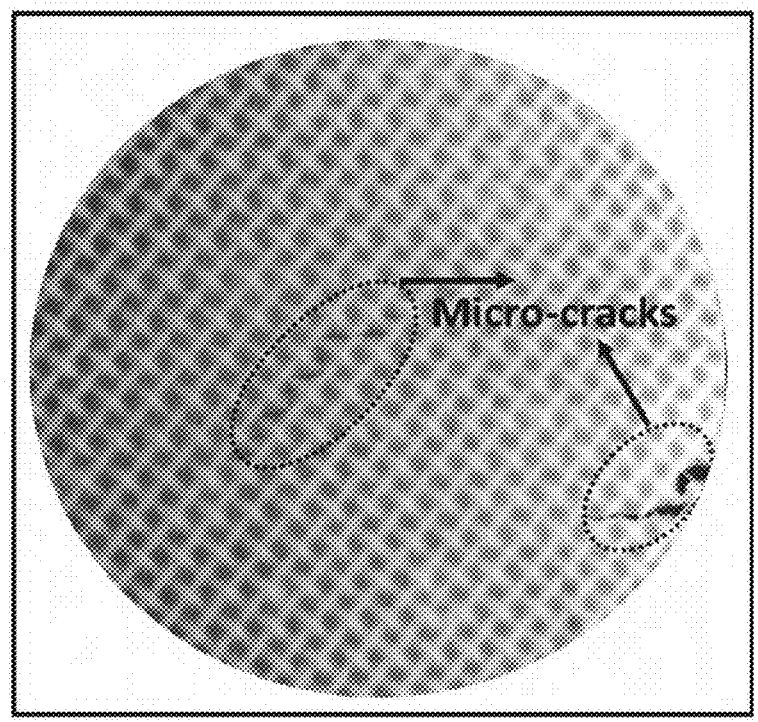

FIGS. 24a and 24b. Digital photos of SPI/PVA nanofabrics with high SPI:PVA ratio of 1.5:1. FIG. 24a before filtration testing and FIG. 24b after filtration testing. There are cracks formed after filtration testing, indicating that a high loading of SPI will deteriorate the mechanical strength and finally the filtration performance.

FIGS. 25a-25f. SEM images and inserted digital photos of (FIG. 25a) Scott® PT-T, (FIG. 25b) Scott® PT-P, (FIG. 25c) Bounty® PT. (FIG. 25d) Air flow resistance (pressure drop) of different paper towels. (FIG. 25e) Particulate removal efficiency of different paper towels vs. PM particle size. (FIG. 25f) Particulate filtration efficiency, $PM_{2.5}$ and $PM_{10-2.5}$ for the three paper towel samples.

Figure 26:
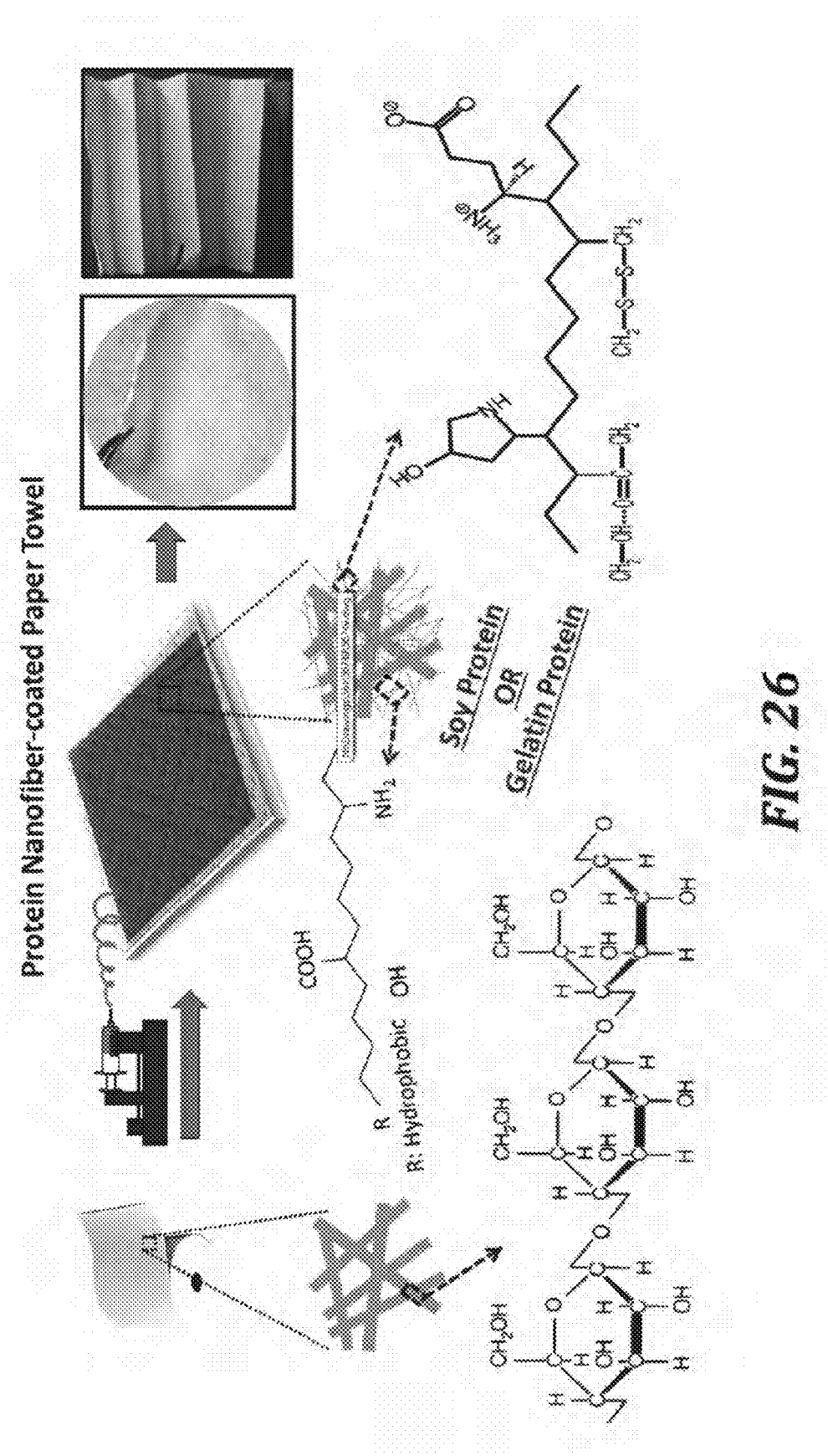

FIG. 26. Schematics of the preparation for the hybrid filters: protein nanofiber coating via electrospinning onto the paper towel substrate. The left digital image shows that the nanofiber-coating can be peeled off from the paper towel and the right digital image shows the foldable hybrid filter. The chemical structures (lower row) of the cellulose and protein possess rich functional groups.

Figure 27A:
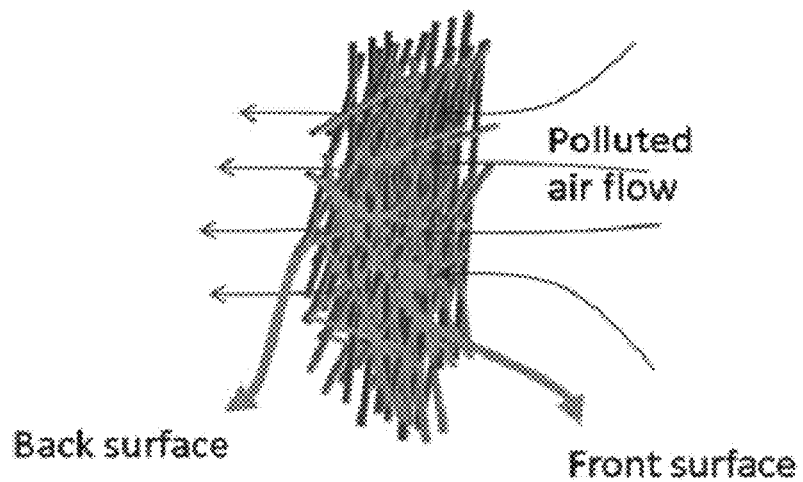
Figure 27A:
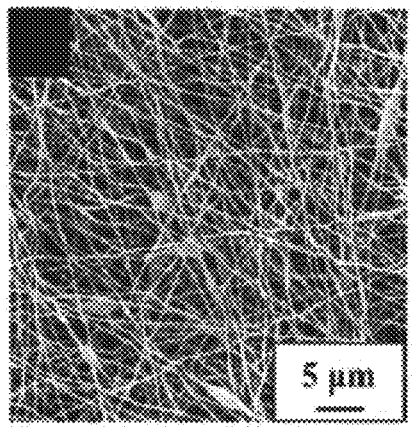
Figure 27C:
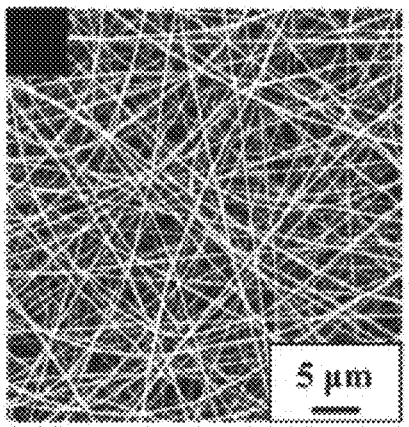
Figure 27B:
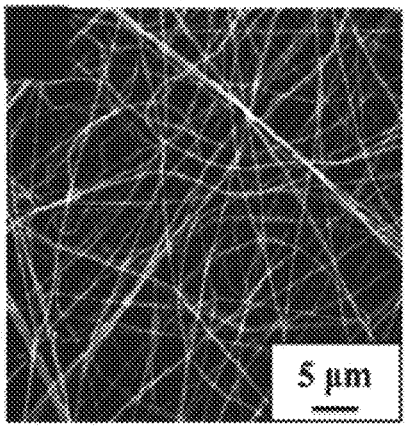
Figure 27D:
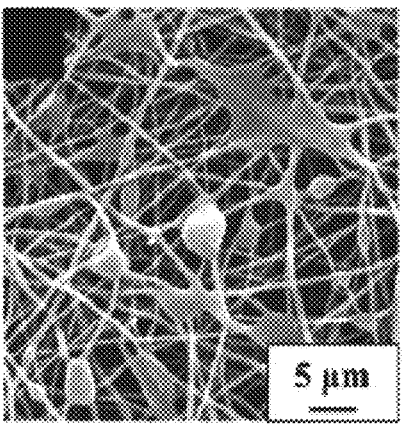
Figure 27E:
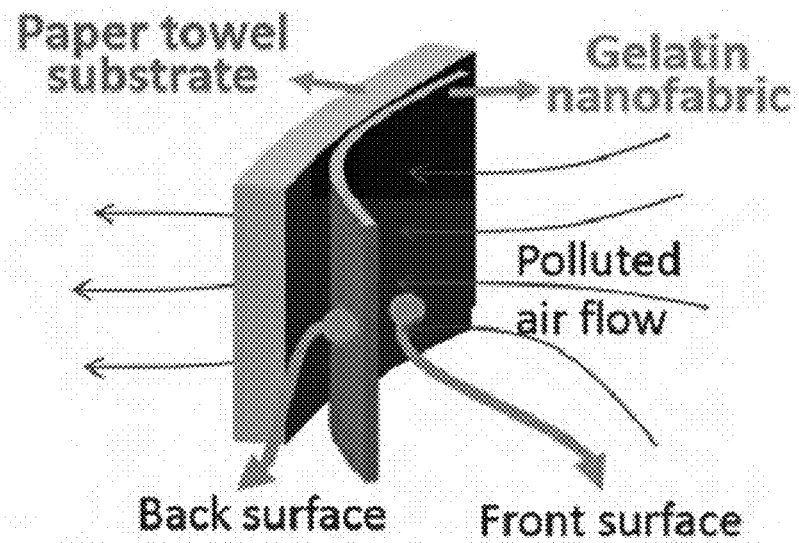
Figure 27E:
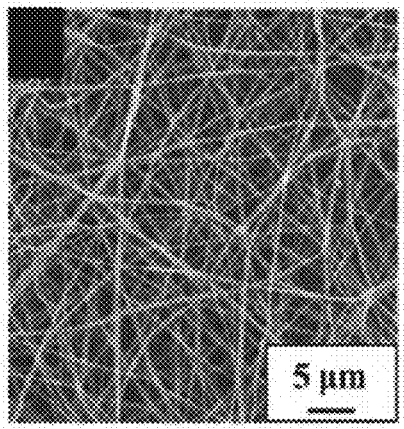
Figure 27G:
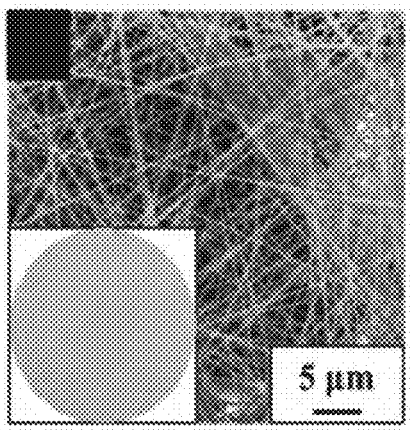
Figure 27F:
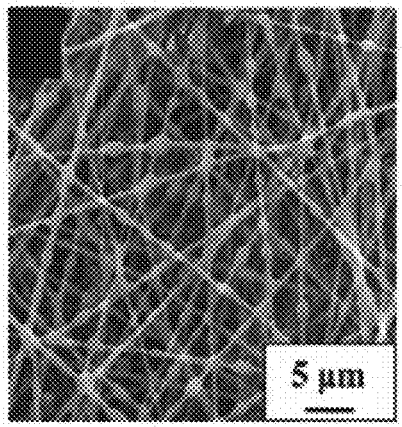
Figure 27H:
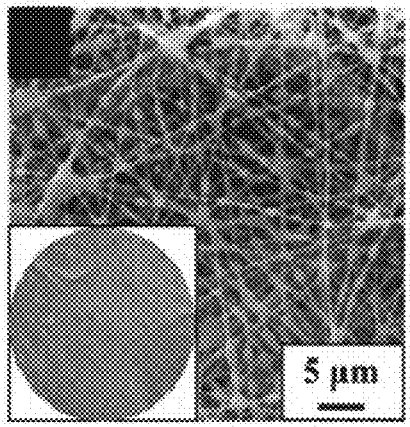

FIGS. 27a-27h. SEM images of filter samples: pure gelatin nanofabrics and hybrid samples, i.e. gelatin nanofiber-coated PT (G/PT) filter mats: FIG. 27a and FIG. 27c are the back and front surfaces of the gelatin nanofabrics sample before filtration, respectively; FIG. 27b, and FIG. 27d are theirs after filtration testing. FIG. 27e and FIG. 27e are the back and front surfaces of the hybrid samples (G/PT) before filtration tests; FIGS. 27f and 27h are theirs after filtration testing. Inserted digital photos are the air filter mats (FIG. 27g) before and (FIG. 27h) after the air filtration testing.

FIGS. 28a-28d. Particulate removal efficiency of various filter samples: (FIG. 28a) Particulate removal efficiency vs. various particle sizes (0.3-10 µm); (FIG. 28b) removal efficiency vs. small PM particle sizes (0.3-2.5 µm); (FIG. 28c) $PM_{2.5}$ removal efficiency; (FIG. 28d) effect of air flow rate on the particulate removal efficiency of the hybrid G/PT/G filter sample vs. various PM particles sizes.

Figure 29:
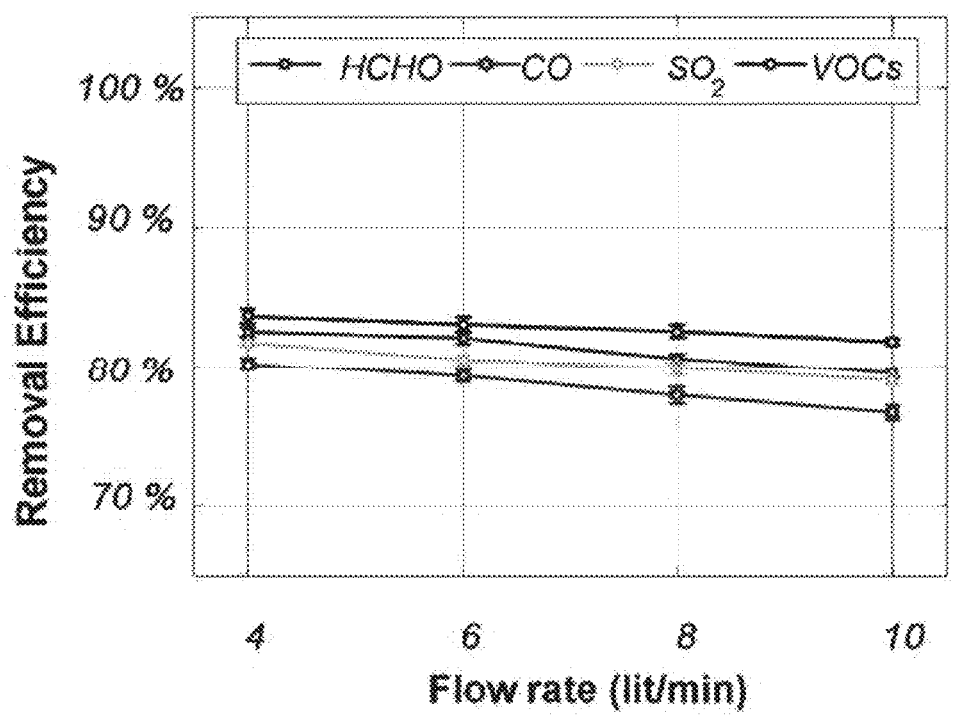

FIG. 29. Effects of air flow rate on chemical filtration efficiency of the hybrid material, G/PT/G filter sample for removal of various toxic gaseous pollutants.

Figure 30A:
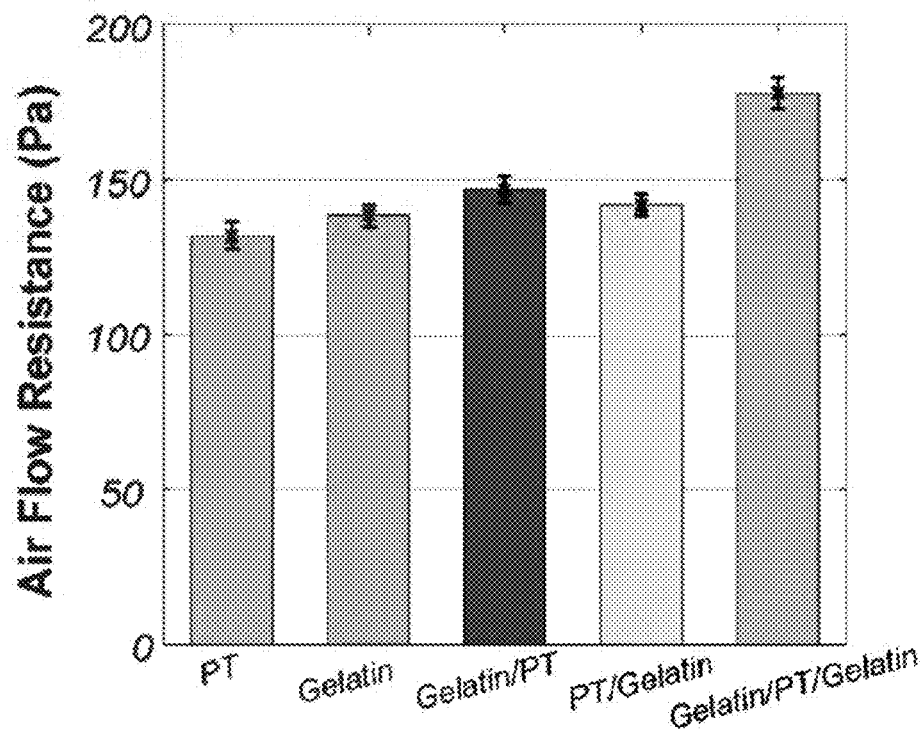
Figure 30B:
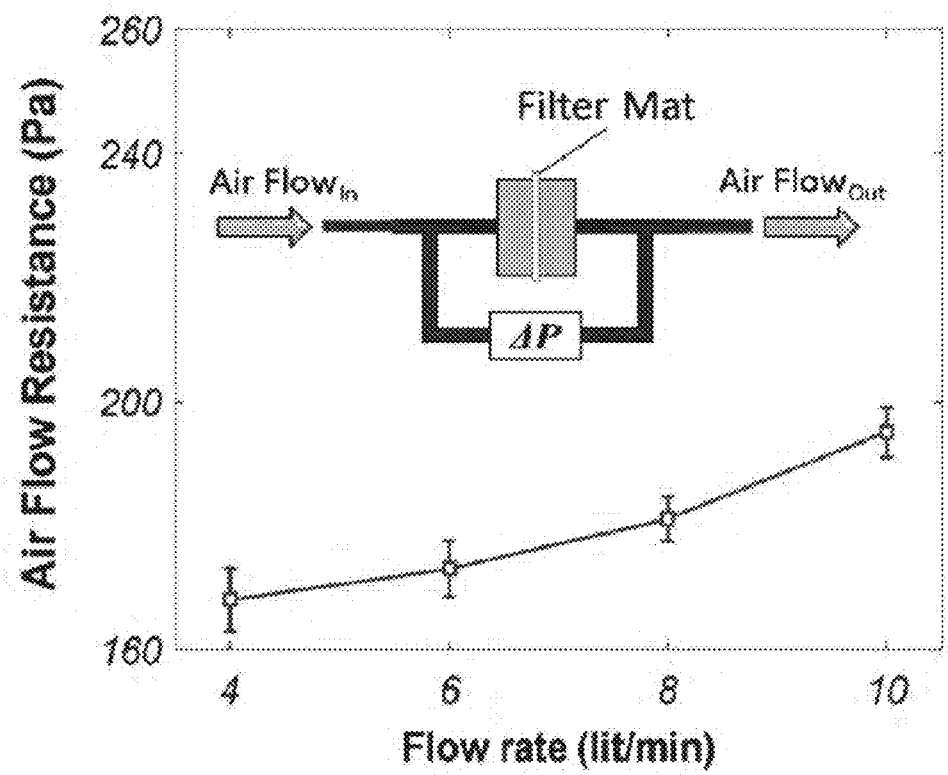

FIGS. 30a and 30b. (FIG. 30a) Air flow resistance (pressure drop) of all the filter samples: at standard air face velocity of 5 cm/s (flow rate=4 lit/min); (FIG. 30b) air flow resistance vs. flow rate of the hybrid G/PT/G filter sample; inserted image is the schematic illustration of pressure drop measurement apparatus.

Figure 31A:
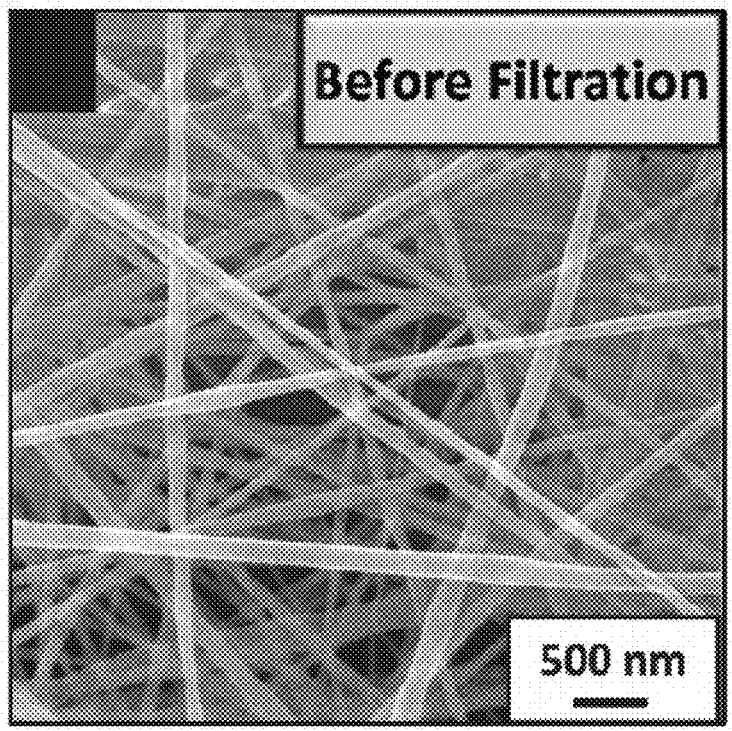
Figure 31B:
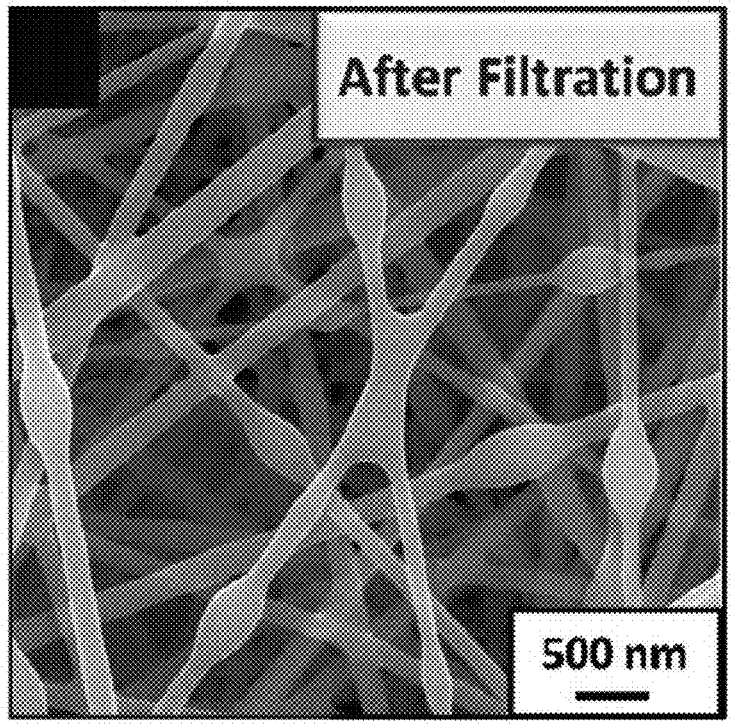

FIGS. 31a and 31b. SEM images of the hybrid SC/PT filter (FIG. 31a) before and (FIG. 31b) after filtration testing.

Figure 32A:
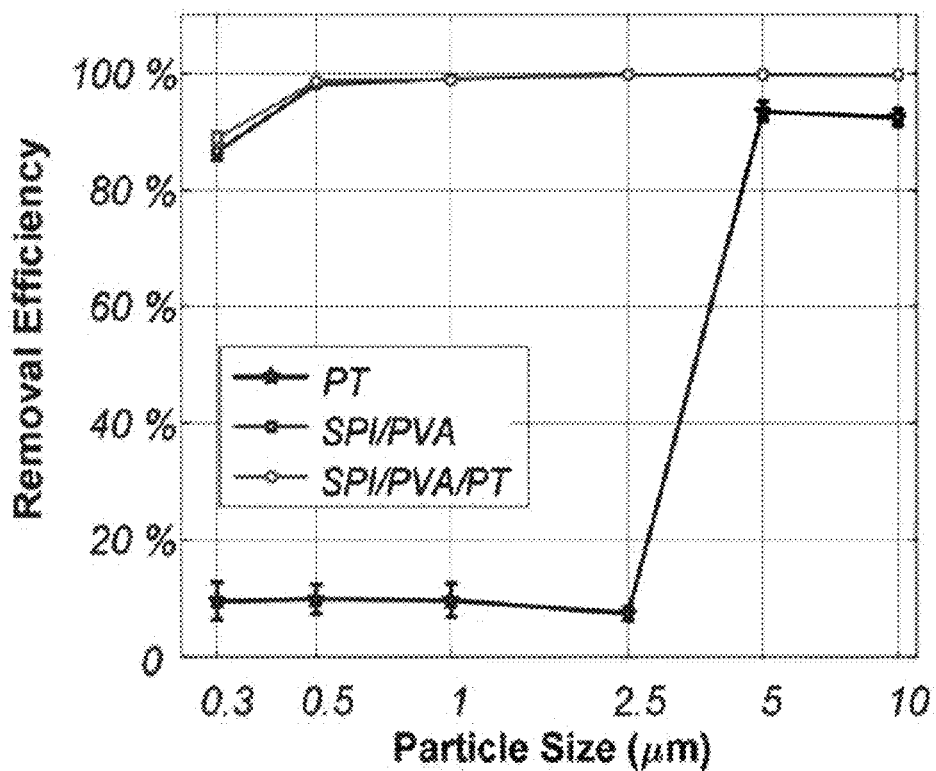
Figure 32B:
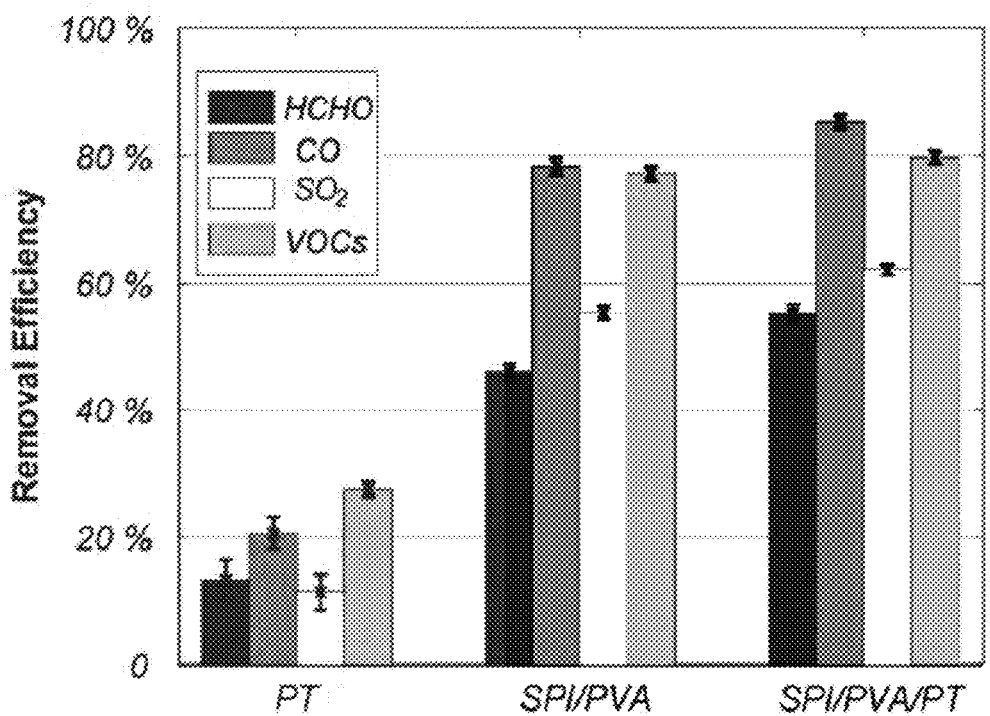

FIGS. 32a and 32b. Air filtration performance of the hybrid filter with soy protein composite (SC) nanofibers/paper towel (PT) combination: (FIG. 32a) Particulate removal efficiency vs. PM particle sizes from 0.3-10 µm and (FIG. 32b) toxic chemical removal efficiency for four gaseous toxic chemicals.

FIGS. 33a-33e. Interaction-based filtration mechanism of the hybrid protein nanofiber-coated PT filters: (FIG. 33a) schematic illustration of circulatory flow between PT substrate and nanofiber layers; (FIG. 33b) schematic illustration of interaction-based filtration mechanism for the hybrid protein nanofiber-coated PT filter mat; (FIG. 33c) schematic representation of the toxic gas filtration testing apparatus; (FIG. 33d) FTIR characterization of $SO_2$ gas before and after filtration using PT filter; (FIG. 33e) FTIR characterization of $SO_2$ gas before and after filtration using the G/PT filter.

DETAILED DESCRIPTION

Air filters formed from mats of protein-containing nanowires are provided. The nanowires are formed into a mat with pores that allow air to pass through while physically filtering particulate matter. The protein in the protein-containing nanowires also serves to chemically filter polluted air passed through the filter. Specifically, chemical functional groups from the many amino acids that comprise the protein of the protein-containing nanowire react with certain chemical pollutants (e.g., carbon monoxide and formaldehyde) in order to capture or otherwise neutralize the pollutant. Accordingly, the single nanofiber mat performs two filtering functions. Methods of filtering air using the provided air filters are also disclosed, as well as methods for making the air filters from protein-containing nanofibers.

In one aspect, an air filter is provided. In one embodiment, the air filter includes a porous nanofiber mat configured to filter particles having a diameter of about 0.1 µm or greater when air is passed through the air filter, the porous nanofiber mat comprising a plurality of protein-containing nanofibers, comprising a protein configured to bind to, and thereby filter, at least one chemical species.

The disclosed air filters provide a new filtration media that can be incorporated into any presently known or future developed air filtration systems. Examples include use as the filter in an HVAC system or a personal breathing mask.

Figure 2C:
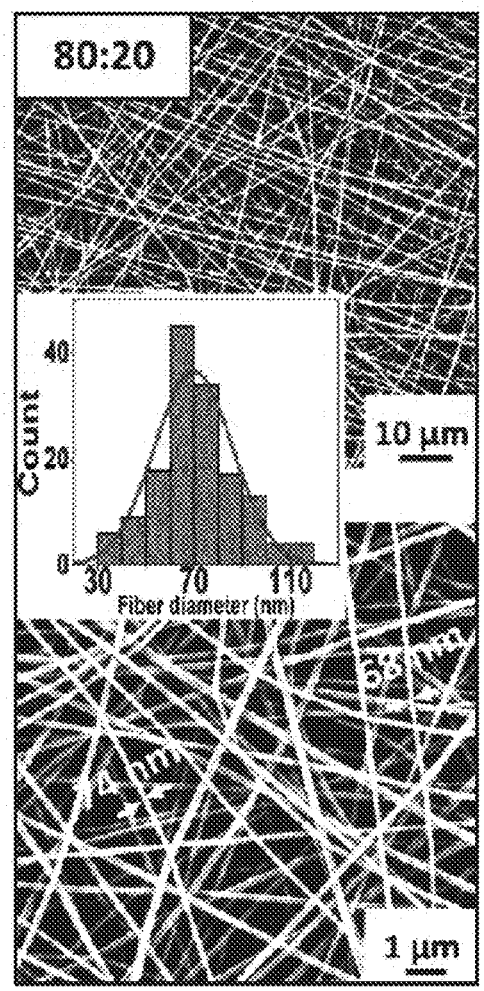
Figure 2D:
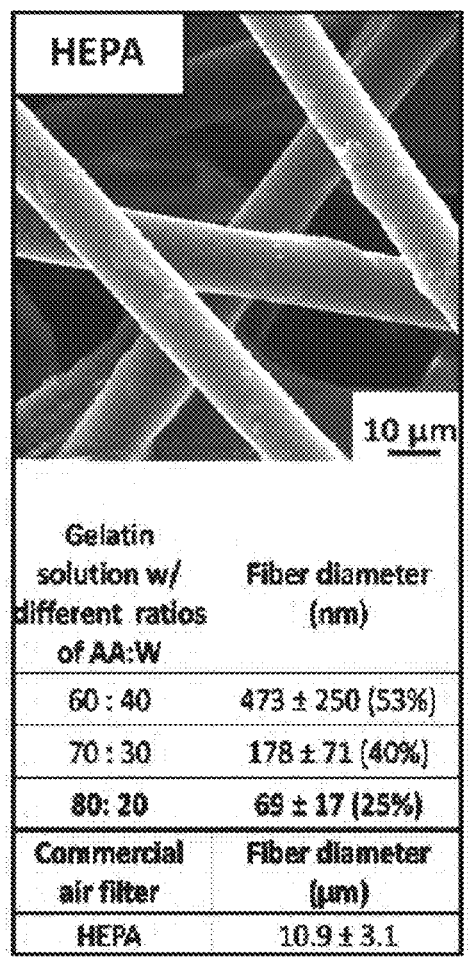

The air filters are formed from a porous nanofiber mat configured to filter particles having a diameter of about 0.1 µm or greater when air is passed through the air filter. Nanofiber mats in general could have similar or smaller pore size in comparison with micron-size fiber mats; however, the average pore size is still in micrometer regime and will not prevent air from passing through the mat and filter. In a further embodiment, the porous nanofiber mat configured to filter particles having a diameter of about 0.3 µm or greater. The size of the pores is defined based on the diameter of the nanofibers and the density of the nanofibers in the mat. The FIGURES include many micrographs of representative nanofiber mats. FIG. 2c provides an illuminating perspective of an exemplary nanofiber mat imaged at two different magnifications, such that the porous nature of the mat can be clearly seen.

As used herein, the term "porous" refers to a material containing pores. The skeletal portion of the material is often called the "matrix" or "frame." The pores are typically filled with a fluid (liquid or gas). The skeletal material is usually a solid, but structures like foams are often usefully analyzed using concept of porous media. A porous medium is often characterized by its porosity. Other properties of the medium (e.g., permeability, tensile strength, electrical conductivity) can sometimes be derived from the respective properties of its constituents (solid matrix and fluid) and the media porosity and pores structure, but such a derivation is usually complex. Even the concept of porosity is only straightforward for a poroelastic medium. The concept of porous media is used in many areas of applied science and engineering: filtration, mechanics (acoustics, geomechanics, soil mechanics, rock mechanics), engineering (petroleum engineering, bio-remediation, construction engineering), geosciences (hydrogeology, petroleum geology, geophysics), biology and biophysics, material science, etc.

Because particle filtration is one of the two primary functions of the air filter, the pore size is directly related to the efficacy of the filter's ability to filter particles.

The second function of the air filter is to filter chemical species, such as pollutants. This ability is realized by forming the nanofiber mat from a plurality of protein-containing nanofibers, comprising a protein configured to bind to, and thereby filter, at least one chemical species.

The nanofibers are protein-containing. As used herein, the term "protein-containing" refers to a nanofiber that has at least a portion of protein in its composition. In certain embodiments the entire nanofiber is formed from protein. In one embodiment the entire nanofiber is formed from a single protein. In another embodiment the entire nanofiber is formed from a composite of two or more proteins. In certain embodiments the nanofiber is formed from a composite material that includes both a protein and another, non-protein, material, such as a polymer. SPI/PVA nanofiber, disclosed below in the EXAMPLES, is an example of such a protein-containing material.

As used herein, the term "protein" refers to large biomolecules, or macromolecules, that include one or more long chains of amino acid residues. For clarity, a linear chain of amino acid residues is called a polypeptide. A protein contains at least one long polypeptide. Short polypeptides, containing less than 20-30 residues, are rarely considered to be proteins and are commonly called peptides, or sometimes oligopeptides. Proteins differ from one another primarily in their sequence of amino acids, which is dictated by the nucleotide sequence of their genes, and which usually results in protein folding into a specific three-dimensional structure that determines its activity. Short proteins can also be synthesized chemically by a family of methods known as peptide synthesis, which rely on organic synthesis techniques such as chemical ligation to produce peptides in high yield. Chemical synthesis allows for the introduction of non-natural amino acids into polypeptide chains, such as attachment of fluorescent probes to amino acid side chains. Chemical synthesis is inefficient for polypeptides longer than about 300 amino acids, and the synthesized proteins may not readily assume their native tertiary structure. Most chemical synthesis methods proceed from C-terminus to N-terminus, opposite the biological reaction.

Importantly, proteins contain chemically active groups that then provide chemical functionality to the nanofiber formed using the protein. These chemically active groups can then bind with pollutants passing through the filter, generating a chemical reaction that captures or otherwise chemically transforms the pollutant from its original state, thereby eliminating the pollutant. Such a feature is particularly desirable in locations with high chemical pollution, such as Beijing. Specific aspect of the protein-pollutant interaction are discussed in further detail below and in the EXAMPLES.

Figure 1:
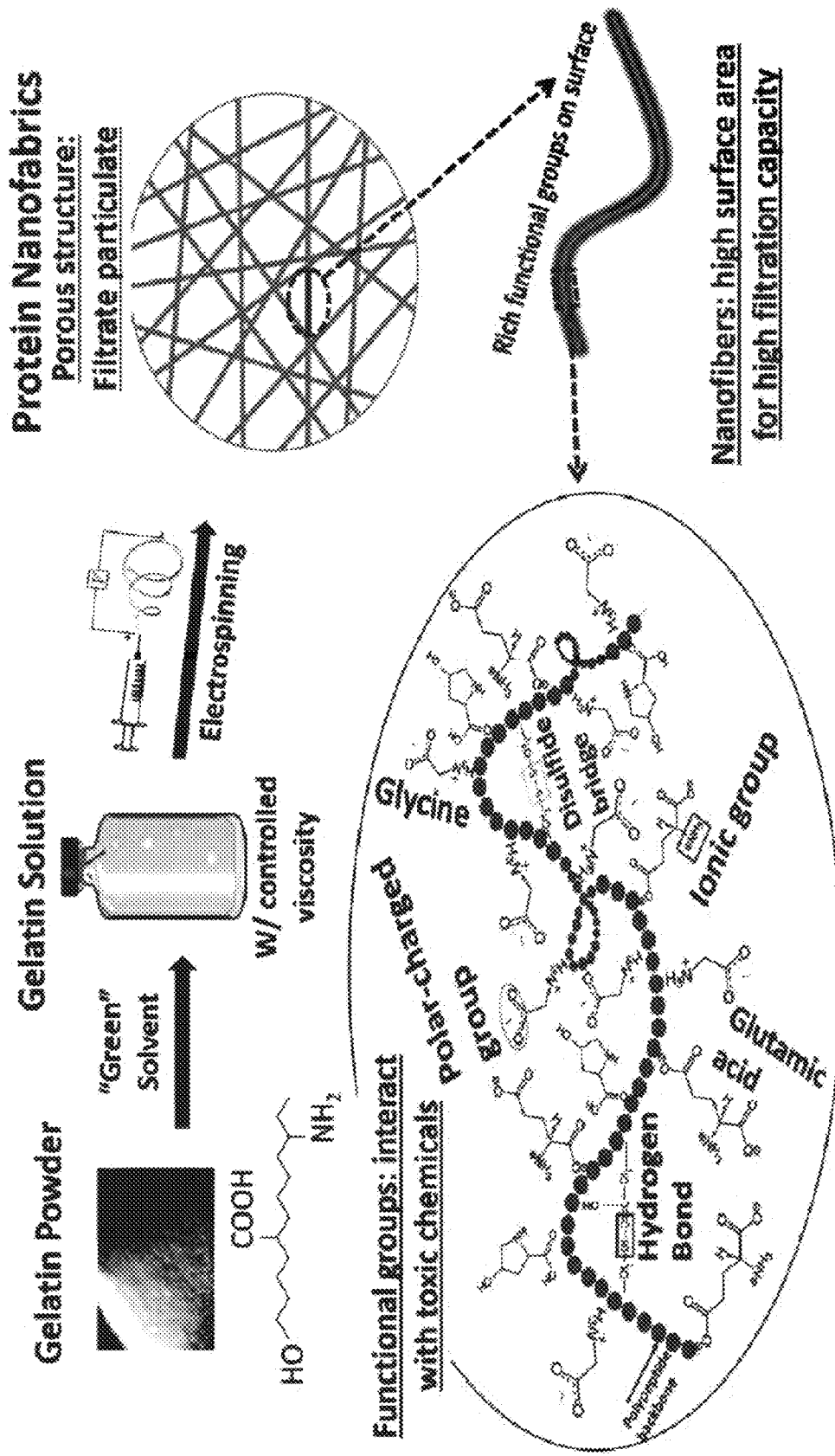
FIG. 1. Schematics of gelatin solution preparation and nanofibers fabrication via electrospinning, followed by the schematics of a single gelatin nanofiber with a functional surface due to various functional groups available in its structure. Porous structure and fiber diameter of nanofabrics contribute to particulate filtration while the rich functional groups on the fiber surface provides toxic chemical filtration property.

FIG. 1 diagrammatically illustrates the general components and operating principles of the air filter. In particular, a micro/nano-scale diagram of the nanofiber mat is illustrated ("Protein Nanofabrics"); a single nanofiber is then illustrated; finally, a molecular-scale illustration of the amino-acids forming the protein nanofiber is provided. As noted in FIG. 1, "Functional groups: interact with toxic chemicals." Therefore, by tailoring the nanofiber protein composition, and therefore the amino acid functional group composition, the nanofiber can be designed to chemically filter specific species (e.g., pollutants). Carbon monoxide and formaldehyde are two exemplary pollutants that are filtered in the EXAMPLES (e.g., FIGS. 4a and 4b).

The plurality of protein-containing nanofibers form the porous nanofiber mat that provides filtering capabilities. The mat is made of non-woven and randomly oriented nanofibers. The configuration and properties of the mat may vary based on how the nanofibers are generated and assembled to form the mat. In the exemplary fabrication method disclosed in the EXAMPLES, electrospinning, the formed nanofibers stack up on top of each other during the process and are bound together via physical entanglements.

The electrospinning technique is a fiber production method which uses electric force to draw charged threads of polymer solutions or polymer melts up to fiber diameters in the order of some ten nanometers. As the jet dries in flight, the mode of current flow changes from ohmic to convective as the charge migrates to the surface of the fiber. The jet is then elongated by a whipping process caused by electrostatic repulsion initiated at small bends in the fiber, until it is finally deposited on the grounded collector. The elongation and thinning of the fibers lead to the formation of fibers with nanometer-scale diameters. During this process the nanofibers may break and different nanofibers will stack up on top of each other to form the multi-layer nanofiber mat. It is unlikely that a nanofiber mat will be formed via electrospinning that is truly a single, extremely long, nanofiber coiled upon itself. However, if such a nanofiber mat were created, it would also be contemplated by the present disclosure.

In one embodiment, at least a portion of the plurality of protein-containing nanofibers consist essentially of protein. In this embodiment, at least some of the nanofibers forming the nanofiber mat consist essentially of protein. An exemplary "all-protein" nanofiber material is gelatin, which is described in great detail in EXAMPLE 1. In a further embodiment, all of the nanofibers of the nanofiber mat consist essentially of protein.

In one embodiment, the protein is selected from the group consisting of plant-based proteins, animal-based proteins, and synthetic proteins. Representative plant-based proteins include Soy protein isolate (SPI), Canola protein, Zein (corn protein), Seitan (wheat protein), and Gluten (wheat and meat protein).

Representative animal-based proteins include Collagen, Gelatin, Keratin, Casein (mammalian milk protein), Fibrin, Silk, Egg albumen, and wool.

A representative synthetic (artificial) proteins include artificial spider silk.

The protein can be selected based on the particular functional groups available for filtering chemical pollutants. The protein may also be selected based on its ability to form nanofibers having desirable physical characteristics, such as diameter, length, and stability. As an example, gelatin can be formed into robust nanofibers on its own (EXAMPLE 1), but SPI cannot be electrospun without forming a composite with a polymer (EXAMPLE 2). Accordingly, in certain embodiments, at least a portion of the plurality of protein-containing nanofibers are composite nanofibers comprising protein and a polymer. In one embodiment, the polymer is selected from the group consisting of poly(vinyl alcohol) PVA, poly(ethylene oxide) (PEO), poly(acrylonitrile) (PAN), and Nylon. In yet another embodiment, the polymer is selected from the group consisting of PVA and PEO.

In one embodiment, the composite nanofibers have a ratio of protein to polymer, by weight, is in the range of 0.5:1 to 2:1. In one embodiment, the composite nanofibers have a ratio of protein to polymer, by weight, about 1:1.

Turning now to the chemical filtering properties of the nanofiber mat, resulting from the protein-containing nanofibers, in one embodiment the at least one chemical species filtered is selected from the group consisting of carbon monoxide (CO), formaldehyde (HCHO), Sulfur oxides (SOx), nitrogen oxides (NOx), Ammonia (NH3), carbon dioxide (CO2), volatile organic chemicals (VOCs), Ozone (O3).

As previously noted, the protein portion can be selected to chemically filter almost any chemical pollutant. As an example, to capture polar chemicals: The protein must contain hydroxyl, carboxyl groups, and/or any type of polar group, such as an amine. Amino acids having these properties include lysine, arginine, aspartic acid, glutamic acid, cysteine, glycine, and proline. Protein examples having these groups include gelatin, soy protein, collagen, zein, and gluten.

Conversely, to capture chemicals with aldehyde groups: The protein should be rich in amine groups, such as lysine. Exemplary proteins that are rich in these groups include gelatin, soy protein, collagen, zein, and gluten]

Furthermore, the charged groups on amino acids such as lysine and arginine can filter charged pollutants, such as heavy metal ions, from air passing through a filter rich in these amino acids.

The EXAMPLES address protein chemical functionality and pollutant filtering in greater detail.

Turning now to the physical properties of the air filter, mat, and nanofibers, in one embodiment, the air filter is configured for airflow through the air filter such that the resistance to air flow is 250 Pa or less at 4 L/min air flow rate. Such a flow rate allows the air filter to operate similarly to present air filters that do not chemically filter pollutants. The present air filters can be interchanged with commercial filters and so they can be fabricated to demonstrate the desired airflow characteristics when implemented in a filtration system. In a further embodiment, the air filter is configured for airflow through the air filter such that the resistance to air flow is 250 Pa or less at 10 L/min air flow rate.

The airflow through the air filter can be defined by the air flow resistance (pressure drop ($\Delta P$)) values. Both systems showed very low resistance to flow (as an example, $\Delta P$ for gelatin air filters=201 Pa; and $\Delta P$ for SPI/PVA air filters=215 Pa).

In one embodiment, the porous nanofiber mat has a thickness in the range of 8 µm to 30 µm. The nanofiber thickness depends on the areal density of the nanofiber mat. For example, a 3.43 g/m$^2$ gelatin nanofiber filter would have a thickness of about 16 µm, while a 2 g/m$^2$ nanofiber layer would have a thickness of about 10 µm. Accordingly, in one embodiment, the porous nanofiber mat has a thickness in the range of 10 to 16 µm.

There is no limit on the physical size of the air filters (e.g., width, length, diameter if circular). The nanofiber mat can be cut into any shape and can be fabricated across a large area (on the order of square centimeters or meters). Again, the disclosed air filters are intended as replacements for any traditional air filter material and therefore can be fabricated to have a form factor similar to any of the myriad air filter shapes.

The nanofibers are particularly uniform in diameter, which makes for consistent performance between similarly manufactured nanofiber mats. In one embodiment, the plurality of protein-containing nanofibers have an average diameter of 1000 nm or smaller. In one embodiment, the plurality of protein-containing nanofibers have an average diameter of 250 nm or smaller. In one embodiment, the plurality of protein-containing nanofibers have an average diameter of 200 nm or smaller. In one embodiment, the plurality of protein-containing nanofibers have an average diameter of 150 nm or smaller. In one embodiment, the plurality of protein-containing nanofibers have an average diameter of 100 nm or smaller.

In one embodiment, the plurality of protein-containing nanofibers consist essentially of protein and have an average diameter of 100 nm or smaller. Examples of such an embodiment are the gelatin nanofiber mats disclosed in EXAMPLE 1.

In one embodiment, the plurality of protein-containing nanofibers are composite nanofibers comprising protein and a polymer and have an average diameter of 150 nm or smaller. Examples of such an embodiment are the SPI/PVA nanofiber mats disclosed in EXAMPLE 2.

The protein-containing nanofibers in the porous nanofiber mat are generally uniform in diameter size, due to the similar conditions in which they are fabricated (e.g., electrospinning). The diameter distribution is Gaussian. In one embodiment, the plurality of protein-containing nanofibers have a Gaussian diameter size distribution.

Exemplary analysis of nanofiber size distribution follow.

Average fiber diameter and its standard deviation:

Gelatin: (53 nm-87 nm) have a size distribution of 70 nm±17 nm (69% of the fibers have a diameter within this range).

SPI/PVA: (112 nm-160 nm) have a size distribution of 136 nm±24 nm (69% of the fibers have a diameter within this range).

Also, because the distribution function for all systems tested is Gaussian, we can use the confidence interval of ($3\sigma$) to show the accuracy of the 99.73% interval. Thus:

Gelatin: (0, 121) or simply: 121 or less 99.73% of the fibers have a diameter within this range.

SPI/PVA: (64, 208) 99.73% of the fibers have a diameter within this range.

Substrates for Air Filters

While air filters are free-standing mats of protein-containing nanofibers in certain embodiments, in other embodiments a substrate is used when forming the mats. In this regard, a substrate can provide mechanical support for relatively delicate nanofibers and can allow very thin mats to be formed. The substrate must allow air to flow through it at a sufficient rate. The substrate may provide its own particle filtration properties.

In certain embodiments, the air filter further includes a cellulose-fiber layer that is adjacent to or abutting the porous nanofiber mat. In such embodiments, the cellulose-fiber layer is a substrate for the nanofiber mat. EXAMPLE 3 provides extensive disclosure and testing of such cellulose-fiber ("paper towel") substrates. In one embodiment, the cellulose-fiber layer is a paper towel. Commercial and consumer paper towels can be used as substrates and different compositions of paper towels have different properties as a substrate.

In one embodiment, the cellulose fiber layer provides a mechanical support for the porous nanofiber mat and is configured to filter particles from the air passed through the air filter. The cellulose fiber layer itself can filter out the particles of as small as 0.3 µm diameter with efficiency ranging from 9% to 45%, depending on the type of paper towel, as set forth in EXAMPLE 3.

When a substrate is used, a single nanofiber mat can be applied to one side of the substrate. In further embodiments, however, a second porous nanofiber mat is disposed on the opposite side of the substrate. Accordingly, in one embodiment, when the substrate is a cellulose fiber layer, the air filter includes a first porous nanofiber mat on a first side of the cellulose fiber layer and a second porous nanofiber mat on a second side of the cellulose fiber layer, opposite the first side.

In one embodiment, the second porous nanofiber mat is adjacent (close to but not necessarily touching—could be separated by an intermediate layer) or abutting (touching) the cellulose-fiber layer on an opposite side in relation to the porous nanofiber mat.

In one embodiment, the composition and configuration of the second porous nanofiber mat are the same as the porous nanofiber mat.

In one embodiment, the composition or configuration of the second porous nanofiber mat is different than the porous nanofiber mat.

Methods of Filtering Air

In another aspect, a method of filtering air is provided. In one embodiment, the method includes passing air through an air filter as provided herein. As noted previously, the disclosed air filters formed from porous nanofiber mats are intended to replace present air filters in essentially any application. Accordingly, the method of filtering air broadly include any application of the disclosed air filters for filtering air, wherein the air includes particulate matter and chemical pollutants, both of which are filtered (at least partially) by the protein-containing nanofibers.

In one embodiment, the step of passing air comprises forcing air through the air filter. In one embodiment, the air filter is incorporated into an air filtration system. Representative air filtration systems include HVAC systems, personal masks, residential, automotive industries, hospitals filtration, etc.

Methods of Making the Porous Nanofiber Mats

In another aspect, a method of making an air filter according to the disclosed embodiments is provided. In one embodiment, the method includes electrospinning a solution comprising a solvent and a precursor to a protein-containing nanofiber. Electrospinning is a well-known technique for generating nanofibers on a substrate. Electrospinning is applied in the present embodiments to solutions that form protein-containing nanofibers. Particular examples of the methods are included in the EXAMPLES, wherein gelatin nanofiber mats are formed in EXAMPLE 1, SPI/PVA (protein/polymer composite) nanofiber mats are formed in EXAMPLE 2, and cellulose fiber substrate ("paper towel") air filters are formed in EXAMPLE 3.

An exemplary method of making a gelatin nanofiber mat via electrospinning is as follows:

Gelatin powder is dissolved in 80% (v/v) aqueous acetic acid at 65° C. to achieve a 18 wt % gelatin solution The gelatin solution was loaded in a syringe with a 21-gauge blunt-tip needle An operating voltage of 18-20 kV was employed for the electrospinning and was controlled by a high voltage power source The distance between needle and sample collector was fixed to be 10 cm and an average flow rate of 0.6 ml/h was utilized Commercial aluminum mesh with wire diameter of 0.011 inch and mesh size of 18×16 was grounded to collect the gelatin fibers.

An exemplary SPI/PVA nanofiber mat fabrication method is as follows:

Soy protein isolate was thermally denatured in mixed solvent (volume ratio, acetic acid:DI water=80:20) with a concentration of 8.5 wt % at 85° C. for 4 h using magnetic stirring (400 rpm)

Poly(vinyl alcohol) was dissolved separately in the same solvent with a concentration of 8.5 wt % at 60° C. for 2 h using magnetic stirring (400 rpm)

The denatured SPI was loaded as a solution into the PVA solution with different ratios and mixed with PVA solution for 24 h using a spin mixer The SPI/PVA nanocomposite solution was loaded in a syringe with a 21-gauge blunt tip needle A voltage of 16-21 kV was applied for electrospinning and was controlled by a high voltage power source.

The distance between needle and sample collector was fixed to 10 cm and average flow rate of 0.6 ml h−1 was utilized Commercial aluminum mesh with wire diameter of 0.011 inch and mesh pore size of 1 mm×1 mm was grounded to collect the fibers.

An exemplary protein nanofiber-coated paper towel filter mat fabrication method is as follows:

Gelatin and SPI/PVA solution are prepared following the steps shown above

A paper towel substrate is fixed on a conductive copper mesh collector and the nanofibers are deposited on the paper towel substrate with desired fiber areal density The operating voltage, spinning flow rate, and needle-to-collector distance are adjusted based on the solution (gelatin or SPI/PVA).

As used herein, the term "about" indicates that the subject number can be modified by plus or minus 5% and still fall within the scope of the disclosed embodiment.

The following EXAMPLES are included for the purpose of illustrating, not limiting, the disclosed embodiments.

Example 1: Gelatin Nanofiber Filters

Particulate and chemical pollutants are ubiquitous in polluted air. However, current air filters using traditional polymers can only remove particles from the polluted air without incorporating additional active materials. To efficiently filter both particulates and chemical pollutants, development of environmentally friendly air filter materials is in critical need. In this study, gelatin is employed as an example to study the potential of natural proteins as high-performance air-filtering material. Based on optimized composition of a "green" solvent, uniform gelatin nanofiber mats with small diameters were fabricated via electrospinning approach. It is found that the resulting nanofabrics possess extremely high removal efficiencies for both particle matter (with a broad range of size from 0.1 μm to 10 μm) and various toxic chemicals (e.g. HCHO and CO). Moreover, these efficiencies are realized from the protein nanofabrics with a much lower areal density (3.43 g/m$^2$) compared with that of commercial air filters (e.g. 164 g/m$^2$ for high efficiency particulate air filter (HEPA)). This study reveals that nanofabrics of natural proteins hold great potential for application in "green" and multi-functional air filtering materials.

1. Introduction

Air pollution has been a great concern in big cities recently. The release of chemicals, particulate and biological materials into air can lead to various diseases or discomfort to humans and other living organisms, alongside their impacts on the environment. The combination of particles and chemical pollutants can make the polluted air even more harmful. Particle Matter (PM) is usually categorized into two groups, $PM_{2.5}$ and $PM_{10-2.5}$ which denote particles with aerodynamic diameters smaller than 2.5 μm and between 2.5-10 μm, respectively. According to the 2009 and 2012 World Bank report, more than 60% of Americans live in air quality levels that are potentially detrimental to health. Recent studies have reported a more serious PM pollution problem in developing countries. A high degree of air pollution was responsible for numerous premature deaths. $PM_{2.5}$ particles are the critical particulate pollution to be filtered due to their ability to penetrate into human lungs and bronchi. Indoor air quality has become an increasing issue as well. More and more buildings incorporate air filtration protection in their heating, ventilation, and air conditioning systems, but a significant amount of energy is required to maintain the air exchange process due to a high air-resistance (pressure drop) of the air-filters. Therefore, air filters with high-efficiency of removing particles and chemicals simultaneously are in critical need.

Understanding of the composition of polluted-air is critical for the development of air-filtering materials. In general, the composition of pollutants in polluted-air is extremely complicated due to the complexity of the sources of pollution. PM particles can be produced from variety of sources, such as fuel combustion in vehicles, industrial factory plants, cigarette smoke, dust, etc. These PM particles behave distinctly due to their diverse chemical composition. Most $PM_{2.5}$ particles are composed of organic compounds such as carbon-derived matters (e.g. carbon dioxide and carbon monoxide), inorganic compounds (e.g. sulfur dioxide ($SO_2^{2-}$), sulfate ($SO_4^{2-}$), silicon dioxide ($SiO_2$), and nitrate ($NO^{3-}$), etc.), and biological threats (e.g. bacteria and viruses). These particles are very stable in air and have lifetimes between hours to weeks due to their very small sizes. They can scatter visible light and reduce visibility because of the similarity between their particle size and visible light wavelengths. In addition to PM particles, polluted air includes a wide variety of chemical gases such as carbon monoxide (CO), nitrogen dioxide ($NO_2$), methane ($CH_4$), benzene, dioxin, ozone, etc. A large number of chemicals in polluted air are classified as volatile organic compounds (VOCs) which are primarily emitted by petrochemical and allied industries. VOCs can undergo different kinds of photochemical reactions in the atmosphere and cause various environmental hazards. In gas phase carcinogenic or otherwise toxic VOCs present a danger to humans. Since the polluted air is usually composed of pollutants with complicated compositions and physicochemical properties, multi-functional air filtering materials that are able to generate various types of interactions with the pollutions are of great interest for air-filtration applications.

Air filters are the most commonly used devices to remove pollutants from the air. They have been widely used in different areas, e.g. automotive industries, residential, general commercial, and even hospitals, general surgeries and so on. The filtration function is mainly realized via physical and PM size-based capturing mechanisms. There are four primary mechanisms for filtration based on the size of the pollutant particles. Sieving is one of the most important mechanisms and is only effective for particles with sizes larger than the pore size of the filter. For particles with sizes smaller than the pore size of the filter, inertial impaction, interception, and diffusion are the dominant mechanisms for filtration. In specific, interception occurs when small particles flow with the air stream and come into contact with the fiber surface. The attractive interactions between the small particles and fibers play a critical role for this mechanism. The diffusion mechanism is effective for even smaller particles with aerodynamic size smaller than 100 nm. For these particles, Brownian motion dominates movement and capturing occurs via random collision. Traditionally, air filters are made of porous films, such as non-woven fibrous mats with randomly oriented micron-size fibers. These types of air-filtering materials have several disadvantages as explained below. First, the fibers are made of chemically synthesized or petroleum based materials, such as polypropylene and fiberglass. These conventional materials provide very limited chemical functionality, resulting in insufficient interactions with pollutants. Secondly, disposing of used air filters made of these materials can cause further environmental pollution as most of them are not environmentally friendly. Finally, microfiber-based air filtering materials possess limited surface area, which further deteriorate the filtration performance.

To address the above issues related to conventional air-filter materials, nanofiber mats have been of great interest recently. Nanofiber mats possess several advantages as explained below. Firstly, nanofibers will tend to absorb substance from the environment due to a high surface energy, which enhances the interactions between fibers and pollutants. Secondly, nanofibers can significantly increase the surface area of filter materials. In other words, nanofibers provide more active sites for trapping pollutants. As a result, nanofiber mats can realize high filtration efficiency for PM while possessing low-pressure drop or air resistance, which is critical for their practical application. As a result, nanofabrics of polymers rich in functional groups represent a promising solution for high-performance air-filtering materials. In particular, biomaterials, such as natural proteins, are promising candidates as high-performance air filtering materials. It is well known that proteins are rich in functional groups, that is, the R-groups on the amino acids. These functional groups make proteins an ideal material for air filtering applications. For example, Chitosan has been mixed with poly(ethylene oxide) and fabricated into nanofibers as an air filter material. The cationic nature of chitosan was used to achieve more than 70% removal of heavy metal ions and aerosol particles from the air. Other biomaterials were also studied as air filter materials, however, they were usually mixed with conventional polymers to fabricate nanofibers. As a result, the potential of pure protein nanofabrics as high-performance air filtering materials has never been studied based on the author's knowledge.

In this study, the potential of pure protein nanofabrics for air filtering application is investigated. It is believed that the combination of nanomaterials with natural proteins can lead to a powerful nanofabric with the ability to trap various kinds of pollutants, including particulate and toxic gas. In particular, gelatin is employed as an example for that. Gelatin protein is derived from thermal denaturation of collagen, the most abundant protein in human and animal bodies. Fabrication of gelatin nanofibers has been proved very successful and they are usually reported as scaffolds for food, energy, pharmaceutical, environmental, and medical applications, except as air filtering material. Here, to study gelatin nanofabrics for air filtration purposes, the fabrication of gelatin nanofibers is further improved. Firstly, instead of using toxic solvents (e.g. 2,2,2-trifluoroethanol (TFE) or 1,1,1,3,3,3-hexaflouro-2-propanol (HFIP)) which are usually used for the electrospinning of gelatin, a non-toxic solvent (mixture of acetic acid and water) is employed. Secondly, the diameter of the gelatin nanofibers is further reduced to be around 70 nm, which is smaller than the typical values (ca. 100 nm) for gelatin nanofibers.

2. Materials and Methods 2.1. Raw Materials and Solution Preparation.

Gelatin powder (Type A) produced from porcine skin was supplied from Sigma-Aldrich (MO, USA). Acetic acid (99.9% purity) was purchased from J.T.Baker® (PA, USA). Gelatin was dissolved in mixed solvent (volume ratio, acetic acid:DI water=80:20) with a concentration of 18 wt % at 65° C. The mixed solvent was used to achieve a good electrospinning of the gelatin solution. With that ratio between water and acetic acid, it was found that a homogenous yellow solution and stable electrospinning of the solution can be achieved.

2.2. Preparation of Protein Filter Nanofabrics.

Protein nanofabrics were prepared by electrospinning techniques. The gelatin solution was loaded in a syringe (Monojet™ Kendall) with a 21-gauge blunt-tip needle. An operating voltage of 18-20 kV was employed for the electrospinning and was controlled by a high voltage power source (ES50P-5W, Gamma High Voltage Research). A mono-inject syringe pump (KD Scientific, KDS-100) was utilized to pump the gelatin solution. Commercial aluminum mesh with wire diameter of 0.011 inch and mesh size of 18×16 was grounded to collect the gelatin fibers. The distance between needle and sample collector was fixed to be 10 cm and an average flow rate of 0.6 ml/h was utilized.

2.3. Polluted-Air Samples Preparation and Air-Filtration Testing.

Cigarette smoke and the product of burning plant materials were used as the sources of pollution to prepare polluted-air samples. It has been estimated that cigarette smoke includes PM particles with a broad range of sizes (0.01 to 10 μm), and more than 7000 different chemicals, hundreds of which are toxic. The most dangerous chemicals of interest for filtration are carcinogens, such as formaldehyde (HCHO), carbon monoxide (CO), ammonia ($NH_3$), hydrogen cyanide (HCN) and toxic metal ions (chromium ($Cr^{3+}$, $Cr^{6+}$), cadmium ($Cd^{2+}$), lead ($Pb^{2+}$). The product of burning plant materials also consists of similar types of pollutants with varying concentrations. Since the original polluted-air samples were so concentrated with PM and chemicals, they were diluted in a gas bag to a hazardous level which can be measured by the analyzer. The diluted polluted-air with detectable levels of pollution was used as the final polluted-air sample for air-filtration testing. Before the air-filtration testing, the initial concentrations of PM with different particle sizes (0.3-10 μm) and toxic chemicals (HCHO and CO) in the air samples were measured by a particle counter (CEM, DT-9881). To perform the air-filtration testing, the pressure difference of both sides of air filter was controlled and measured by a manometer (UEi, EM201-B) with a standard air flow velocity of 5 cm/s to investigate the air flow resistance of the air filter material. In all the measurements, a circular filter sample with diameter of 37 mm was placed in a home-made sample holder. The filtered air was collected by another clean gas bag which was vacuumed in advance. When the air-filtration testing ended at different filtering time, the concentrations of the PM and toxic chemicals inside the clean gas bag with filtered air were measured and recorded. Via the equation (1), one can determine the removal efficiency $\eta_p$.

$$\eta_p = (C_p - C_c)/C_p \quad (1)$$

where $C_p$ is the concentration of the pollution in the polluted-air sample before air filtration testing, and $C_c$ is the concentration of the pollution in the filtered air sample.

2.4. Characterizations.

To study how the particle pollutions were removed by the protein nanofabrics, SEM (FEI SEM Quanta 200F) was employed to investigate the morphology of the protein nanofabrics before and after air filtration testing. The samples were sputter-coated with 10 nm gold nanolayer in thickness using Technics Hummer V sputter coater. In order to study the possible interactions between the protein nanofabrics and pollutants, FTIR (Nicolet, Thermo Scientific) absorption spectra was employed. To distinguish the interactions between nanofibers and pollutants from the interactions inside the fabric or polluted-air themselves, the FTIR spectrum of three kinds of samples were recorded and compared. These samples include polluted-air, clean protein nanofabrics before and after filtration. All the measurement was repeated at least 3 times and good repeatability was found for these samples.

3. Results and Discussion

Gelatin Nanofabrics/Nanofiber Mats.

The target of this work is to study the potential of gelatin nanofabrics as high-performance air filtering material with two levels of air filtering functions: (1) removing particles, such as dust, pollen, with particle sizes in a broad range from 0.1 to 100 μm; (2) removing toxic or obnoxious gases, such as formaldehyde and carbon monoxide in tobacco smoke. It is known that gelatin molecules possess a broad range of functional groups in their multi-level structures. The characteristics of these chemical structures provide capability for interaction with multiple species of polar molecules, which lead to a great potential to capture many chemicals. Specifically, gelatin consists of glycine (21.4%), proline (12.4%), hydroxyproline (11.9%), and glutamic acid (10.0%) in its amino acid profile. The amino acids bring gelatin various functional groups (such as carboxylic and hydroxyl, charged groups, and many other polar/nonpolar functional groups). These functional groups can act as active sites generating numerous interactions with pollutants, including hydrogen bonding, ionic bonding, and charge-charge interactions and so on. Combined with electrospinning technique, gelatin nanofibers can be fabricated (FIG. 1). Electrospinning is an effective method for making uniform nanofibers with high aspect ratio, and high pore interconnectivity with size ranging from micron to nanometer scale.

First of all, an appropriate solvent, in particular a non-toxic solvent, needs to be selected for preparing the gelatin solution effective for making nanofibers via electrospinning. Many studies have been reported on the fabrication of gelatin fibers by using toxic solvents (TFE, HFIP), which yielded average fiber diameter ranges from 100-600 nm. In this study, gelatin nanofabrics were fabricated by employing aqueous acetic acid (AA) as a "green" solvent. In order to achieve efficient molecular dissolution of gelatin, good electrospinability and, as the result, uniform filter mat with nanoscale fiber diameter, the solvent composition must be adjusted. More importantly, the uniformity of the nanofibers in the mat along with smaller fiber diameters can result in high surface area for capturing more pollutants, which enables the filter to achieve high filtration efficiencies. Therefore, the effect of AA-to-water ratio on the resulting nanofiber diameters and their distribution was studied. The mixture solvent with optimized composition was determined for spinning out uniform gelatin nanofiber mats. The microstructures of gelatin nanofibers prepared in different ratios of the solvent and the fiber morphology of a commercial HEPA filter were compared using scanning electron microscopy (SEM) images (FIGS. 2a-2d). It can be seen that by increasing the ratio of AA to water in the solvent from 60:40 to 80:20, the size of nanofibers was reduced from ca. 470 to ca. 70 nm. Moreover, the nanofiber uniformity was improved significantly: the relative deviation of the nanofibers reduced from 53% to 25% (see fiber diameter distributions and inserted table showing the statistic results in FIGS. 2a-2d). These results show that by using the mixed solvent with the AA-to-water ratio of 80:20, uniform gelatin filter mats with the nanofiber diameter of 70 nm were successfully fabricated, which is smaller than the reported studies showing the fiber diameter of few hundred nanometers. Reduction in the nanofiber diameter can significantly improve the air filtration capabilities for both particulate and toxic chemicals due to their high active surface areas. In general, nanofibers with high surface-to-volume ratio and surface activity will have high particle removal efficiency via interception, diffusion, and other mechanisms while retaining very low resistance to air flow which results in low pressure drop. At the same time, due to the high density of functional groups along the gelatin nanofibers, the nanofiber mats are expected to possess multiple filtering functions: toxic chemical and particulate filtration. The following air filtering performance studies were focused on the gelatin filter nanofibers produced using the optimal solvent.

Particulate Filtration.

Figure 3A:
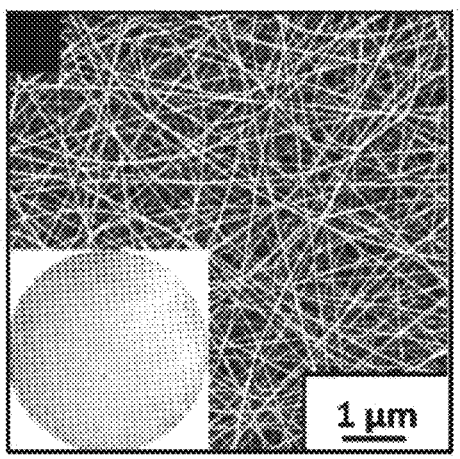
FIGS. 3a-3h.
Figure 3B:
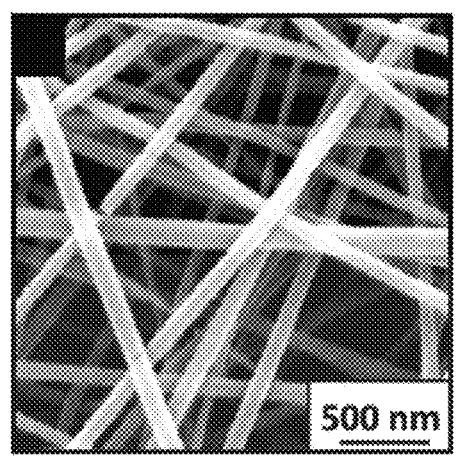
Figure 3C:
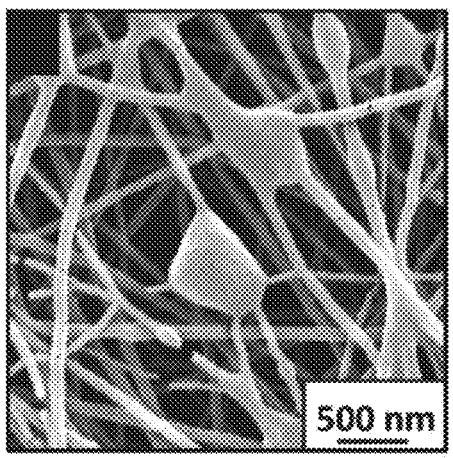
Figure 3D:
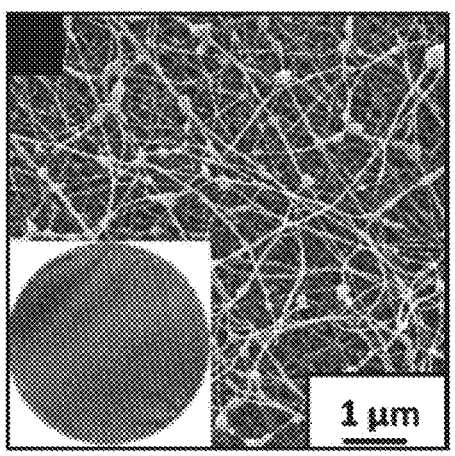
Figure 3E:
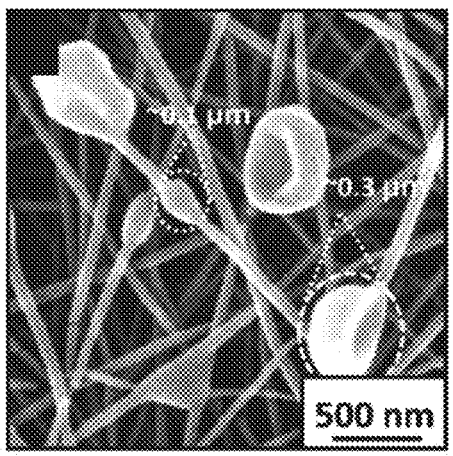
Figure 3F:
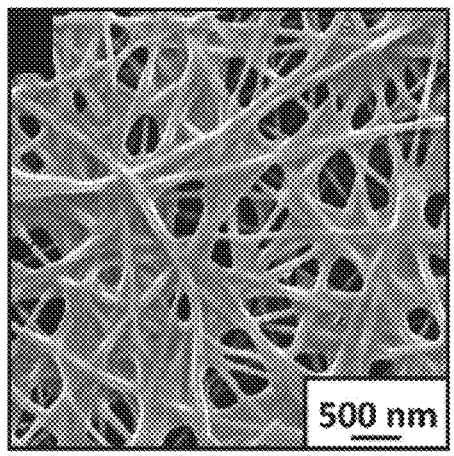
Figure 3G:
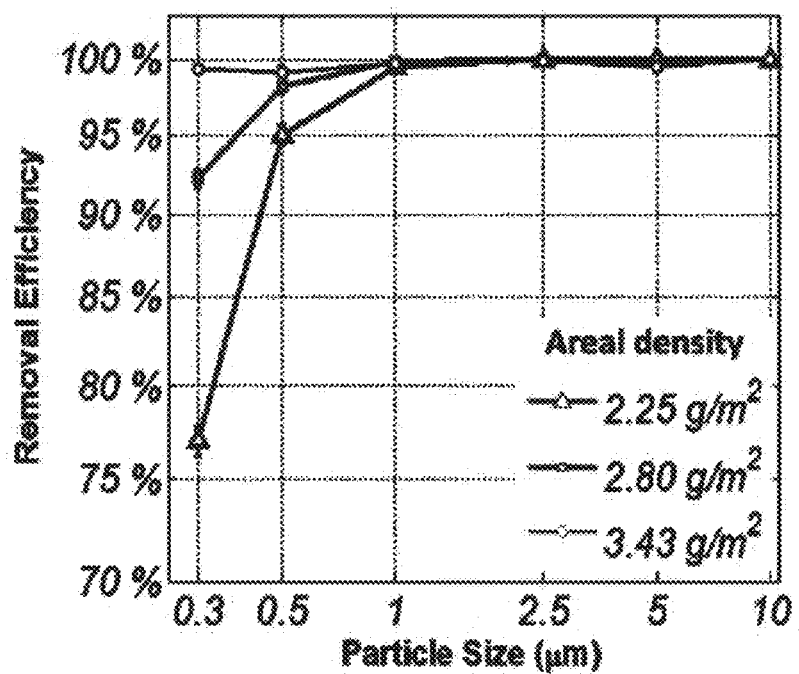
Figure 3H:
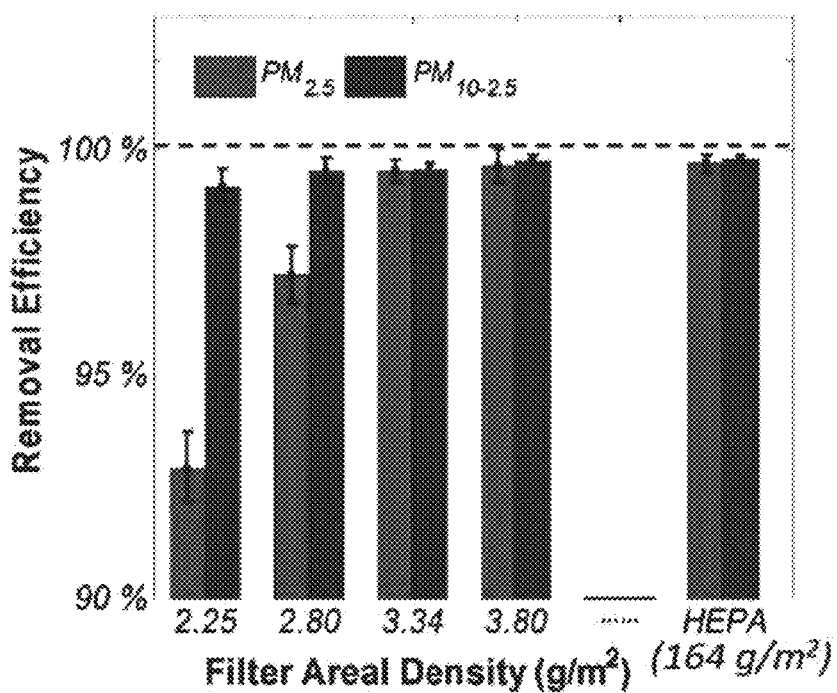
Figure 7A:
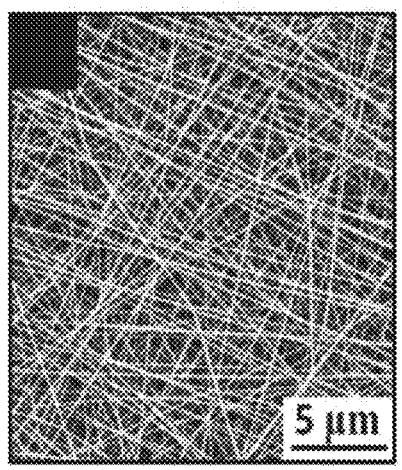
Figure 7B:
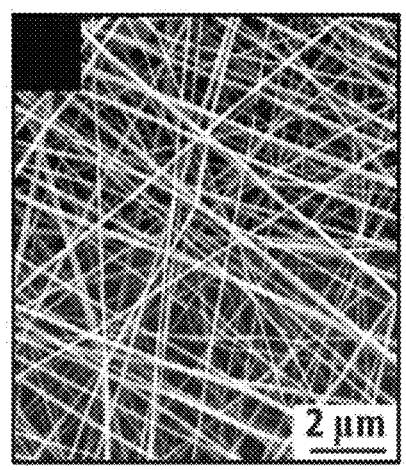
Figure 7C:
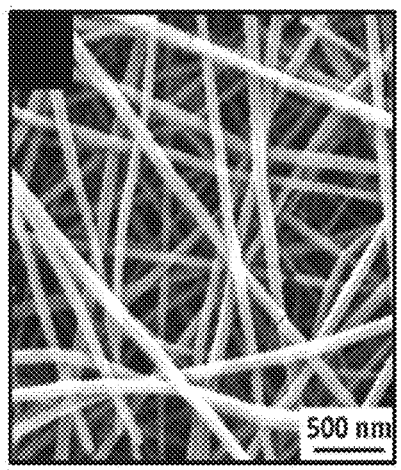
Figure 7D:
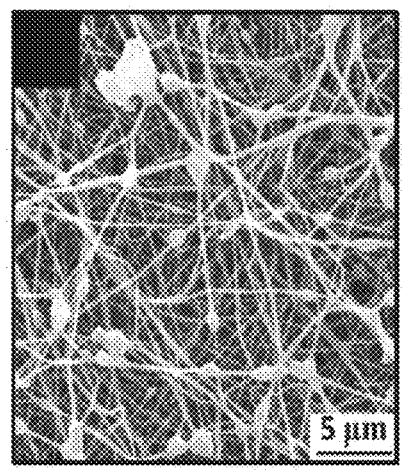
Figure 7E:
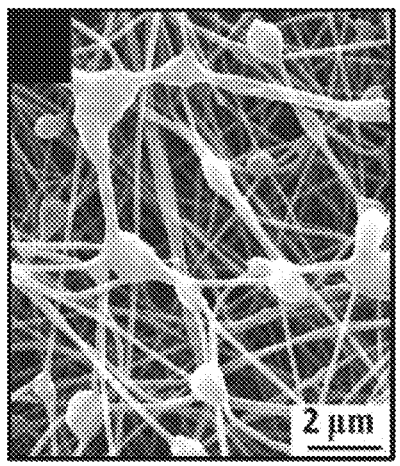
Figure 7F:
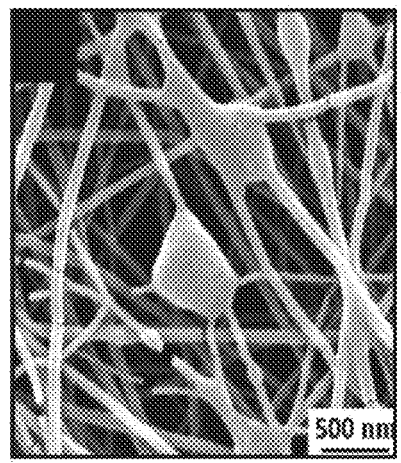

First, the morphology of gelatin nanofibers were studied via SEM and the results are shown by FIGS. 3a-f. In specific, FIGS. 3a and 3d (also see FIG. 7a-c, which are the SEM images of the nanofabrics before air filtration testing, that is, the morphology of as-spun pure gelatin nanofabrics. FIGS. 3b and 3d-3f (also see FIGS. 7d-7f are the SEM images of the nanofabrics after air filtration testing. The digital photos inserted in the SEM images are the nano-filter before and after filtration. The obvious color change from white to yellowish indicates that the nano-filter has absorbed lots of pollutants. Further, the SEM images confirm this point as one can observe lots of particles have been trapped on the surface of gelatin nanofibers. The notable change in color should also be related to the absorption of some toxic gases, which will be discussed later. Moreover, the particulate air filtration efficiency results are shown in FIGS. 3g and 3h. It is found that, for the gelatin nanofabrics, the removal efficiency is dependent on the PM size as well as the areal density of the nanofabrics (shown in FIG. 3g). It can be found that with a high areal density (e.g. greater than ca. 3.43 g/m$^2$), the gelatin nanofabrics showed almost similar removal efficiency of above 99.20% for PM with sizes from 0.3 to 10 μm. In particular, the removal efficiency for the most penetrating particle size (MPPS) of 0.3 μm particles was significantly improved from 77.10 to 99.32% by increasing the areal density of the nanofabrics from 2.25 to 3.43 g/m$^2$. PM particles with size around 0.3 μm ($PM_{0.3}$) are known as the hardest to capture and a high-performance air filter should give rise to an efficiency above 95% for $PM_{0.3}$. The results indicate that the areal density of the nanofabrics is critical for the removal efficiency of small particles, but not large particles. This result can be explained as the difference in the mechanisms for filtering large particles (sieving) and small particles (smaller than the pore size). Specifically, large particles were removed by size effects, while small particles were trapped via the strong interactions between particles and nanofibers. The removal efficiency for $PM_{2.5}$ and $PM_{10-2.5}$ via nanofabrics with different areal density is shown in FIG. 3h. In particular, the areal density of 3.43 g/m$^2$ is close to an optimal (minimum) value to achieve the highest removal efficiency of both $PM_{2.5}$ (99.51±0.23%) and $PM_{10-2.5}$ (99.63±0.11%). For the filters with areal densities higher than 3.43 g/m$^2$, the removal efficiency of both $PM_{2.5}$ and $PM_{10-2.5}$ was almost constant. The gelatin nanofabrics are promising air filtering materials with removing efficiency for $PM_{2.5}$ higher than 95%, the standard suggested for high-efficiency air filters. More significantly, the gelatin nanofabrics can achieve the high efficiency for PM by a much lower area density (ca. 3.43 g/m$^2$) as compared with the most successful commercial one (HEPA, 164 g/m$^2$). The high removal efficiency for PM is likely contributed by the combination of "nano-size" effects and the surface properties of gelatin nanofibers. The diversity of functional groups on the nanofiber surface can provide strong interactions with the pollutants, which is critical for the removing of PM with sizes much smaller than the pore size of the nanofabrics and of toxic gases as will be discussed later.

Toxic Gases Filtration.

Figure 4A:
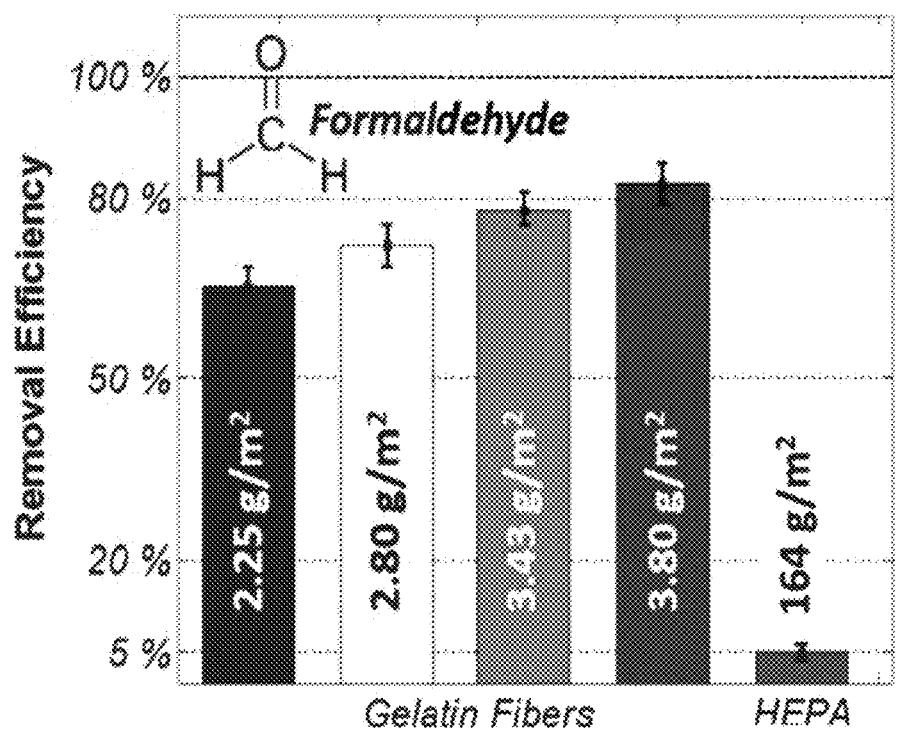
Figure 4B:
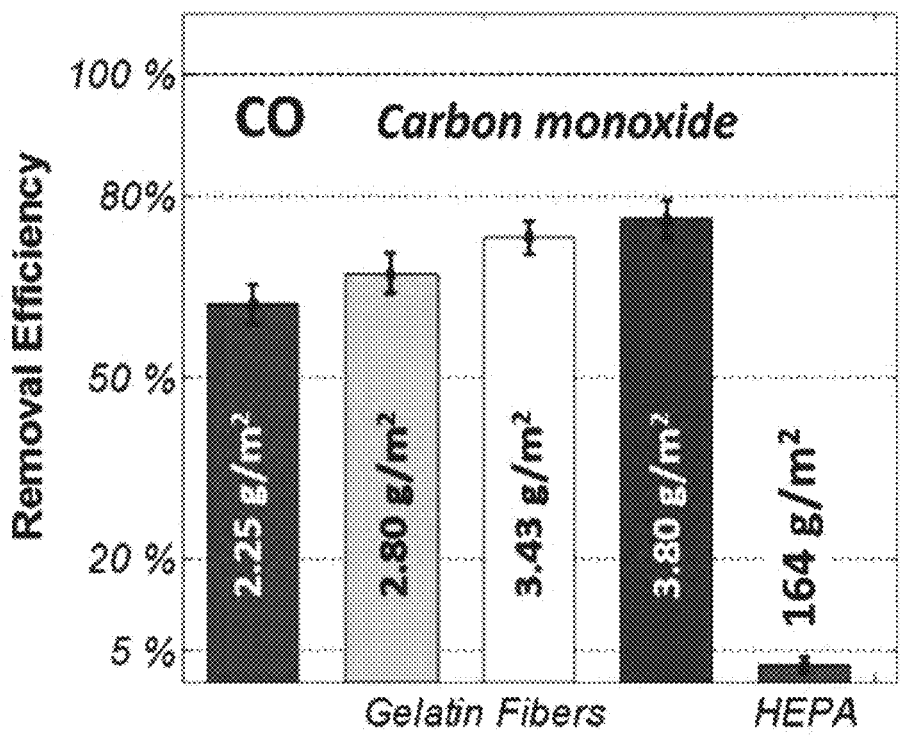

Removing of toxic chemicals via air filters with high efficiency is challenging since they are small molecules with sizes much smaller than that of particles. Conventional ways to remove toxic gases are using absorptive particles with high specific surface area, such as activated carbon. For the gelatin nanofabrics, two kinds of toxic chemicals, formaldehyde (HCHO) and carbon monoxide (CO) which can be detected by the analyzer, were chosen as examples to test the chemical removal capability. FIG. 4a shows the chemical removal efficiency of formaldehyde for gelatin nanofabrics with different areal densities compared with that of commercial HEPA filter. It can be seen that the chemical capturing efficiency of formaldehyde increases from 65.0% to 83.0% by increasing the areal density of the filter from 2.25 to 3.80 g/m$^2$. Moreover, the removal efficiency of carbon monoxide as shown in FIG. 4b increased from 62.3% to 76.1% for gelatin nanofabrics with the same change in areal density. In comparison, for the commercial HEPA filter, one of the most successful air filter used today, the chemical removal efficiencies of formaldehyde and carbon monoxide molecules are less than 5 and 3%, respectively. The high chemical removal efficiency indicates that the combination of nanofabrics with functional polymers is the key to remove toxic chemicals which cannot be removed by size-based mechanisms. Therefore, protein nanofibers provide a promising solution for multi-functional air filtering materials.

Pressure Drop and Figure of Merit (Quality Factor).

Figure 4C:
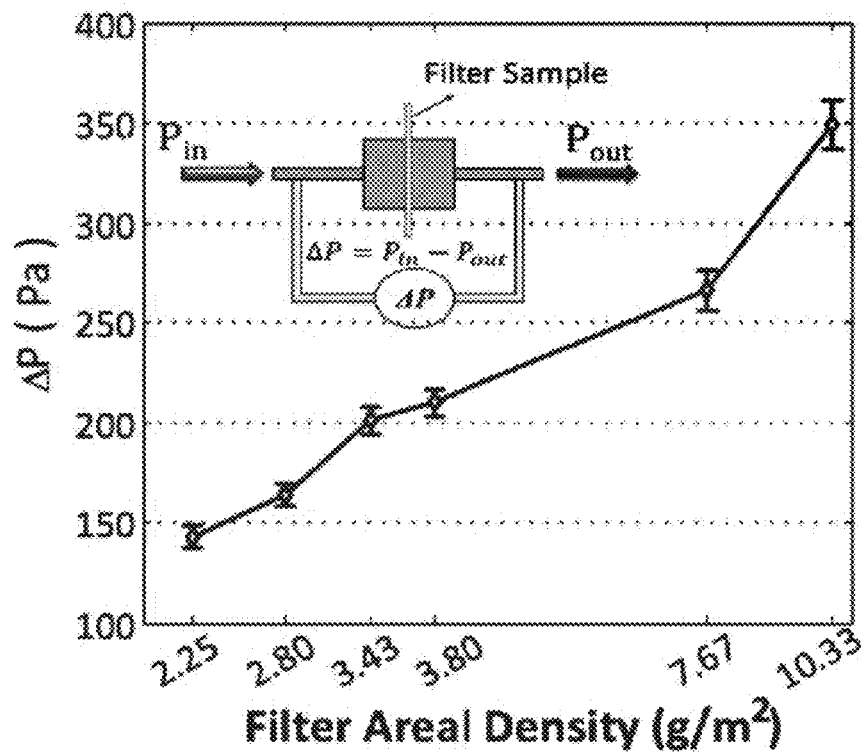
Figure 4D:
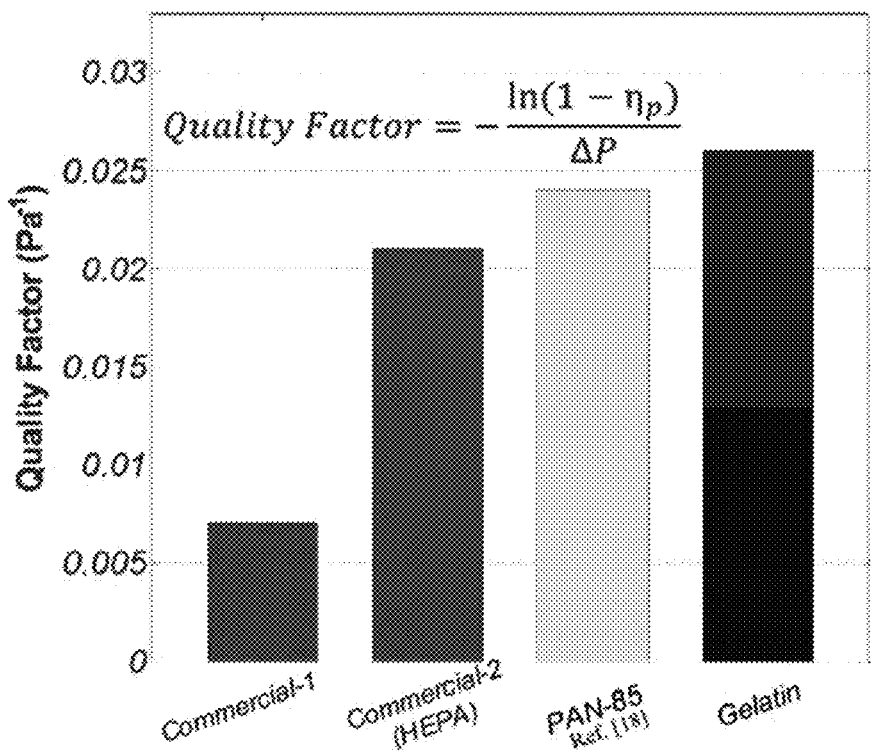

In addition to the particulate and chemical removal efficiency, air flow resistance (pressure drop) is another critical parameter describing the performance of an air filter (schematic of pressure drop measurement setup is inserted in FIG. 4c). High pressure drop downstream of an air filter will consume a large amount of energy due to the pumping required to provide a sufficient air flow, which makes the air filter energy consuming. The suggested range for pressure drop (ΔP) set by DOE is less than 1.3 in.$H_2O$ (approximately 320 Pa). The effect of areal density on pressure drop of the gelatin filters was investigated using standard 5 cm/s air face velocity. FIG. 4c shows that the air flow resistance of the filters increases with the areal density. Quantitative analysis demonstrated that the pressure drop of the gelatin nanofabrics with the lowest areal density (2.25 g/m$^2$) was ca. 143 Pa and increased to approximately 201 Pa for the filter with the highest particulate/chemical efficiency (3.43 g/m$^2$). These pressure drop values meet the requirement of a high-efficiency filter. The pressure drop along with removal efficiency allow us to determine the optimal areal density of the gelatin nanofabrics for achieving a good balance between high removal efficiency of pollutants (PM and toxic chemicals) and pressure drop, which is critical for practical applications. For the gelatin nanofabrics when the areal density is higher than ca. 3.43 g/m$^2$, such as 3.80 and 7.67 g/m$^2$, the removal efficiency is improved by less than 0.5% (see FIG. 3h), while the pressure drop increases by more than 74% (see FIG. 4c). Thus, 3.43 g/m$^2$ should be close to the optimal areal density for the gelatin nanofabrics. To comprehensively describe the filtration performance, the pressure drop and removal efficiency is combined into one parameter, the quality factor (QF), also known as figure of merit (FOM), which can be calculated using Equation (2).

$$QF = -\ln(1-\eta_p)/\Delta P \quad (2)$$

where $\eta_p$ is the removal efficiency and $\Delta P$ is the corresponding pressure drop. QF is a representative of the ratio between removal efficiency and the air flow pressure drop. This quantitative factor indicates that a good air filter should provide a high removal efficiency and a low pressure drop; hence, a higher QF means a better filtration performance of an air filtering material. FIG. 4d shows the comparison of figure of merit of the gelatin filter fabrics with commercial air filters and poly(acrylonitrile) (PAN-85) nano-filters as reported recently. It can be found that the gelatin nanofabrics with 3.43 g/m² areal density possess the highest quality factor (0.026 Pa⁻¹) among them. The quality factor for gelatin nanofabrics was calculated at 30 minutes of filtration testing and 5 cm/s. It is noted that the figure of merit of an air filter (including the removal efficiency and pressure drop) is never constant and will change with time of using in practice.

Stages of Filtration Process.

For air filtering materials, analysis of the pollutant absorption process is critical for understanding the long-term filtration performance. For the multi-functional gelatin air filtering material, the pollutant absorption process was tracked quantitatively via calculation of the pollutant weight-percentage gain and pollutant weight absorption rate over time using Equation (3) and (4).

$$W_p = (W_t - W_f)/W_f \quad (3)$$

$$W_{p\_rate} = \Delta W_{pollutant}/\Delta t \quad (4)$$

where $W_p$ is the pollutant weight percentage gain, $W_t$ is the weight of the air filter after filtration of time t, $W_f$ is the weight of the pure air filter before filtration test, $W_{p\_rate}$ is the pollutant weight absorption rate, and $\Delta W_{pollutant}$ is the absolute weight of the pollutants absorbed between each time interval. Results are compared with those of the commercial HEPA filter in FIGS. 5a and 5b.

At the early stages of filtration (first 30 minutes to 1 hour), particles migrate and merge to form bigger, spherical aggregates. Moreover, the particle weight percentage gain reaches 53% of the nanofabrics' weight and sharply increases after 1 hour of testing to 106% while the HEPA filter only showed an increase from 1% to 1.3% due to its very high areal density (shown in FIG. 5a). With the increase of filtering time (after 2 hours), more particles were trapped by the nanofibers. The accumulation of particles is also coupled with complex deformation/transformation processes due to possible physicochemical interactions. This process has also been reported in the recent study on transparent PAN air filters. The phenomenon results in a decrease of clear filter area. In this stage, the particle weight percentage gain for gelatin nanofabrics increased moderately to 130%, while the absorption rate of pollutants decreased significantly (shown in FIG. 5b), which can prove the hypothesis mentioned above. By further increasing the filtration time, the particle weight percentage gain of the filter reached a plateau region (gelatin nanofabrics and commercial HEPA filter reached to 150% and 2.3% pollutant weight percentage gain, respectively) and the pollutant absorption rate was decreased even more significantly for both filters. However, the pollutant absorption rate of gelatin nanofabrics was higher than that of commercial HEPA filter due the functional and active surface of gelatin nanofabrics which enable it to absorb more particles and chemicals within a shorter time period. The pollutant absorption phenomenon is critical for practical applications as it is related to the long-term performance or the life-time of the air filter material. Also see FIGS. 9a-9c for SEM images showing the evolution of surface morphology of gelatin nanofabrics during filtration of smoke.

Filtration Mechanism Analysis.

Figure 6A:
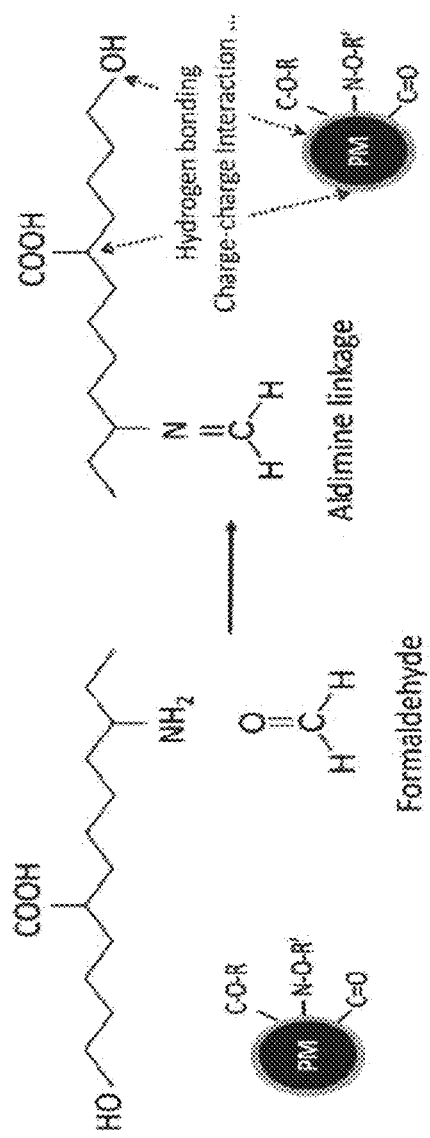
Figure 6B:
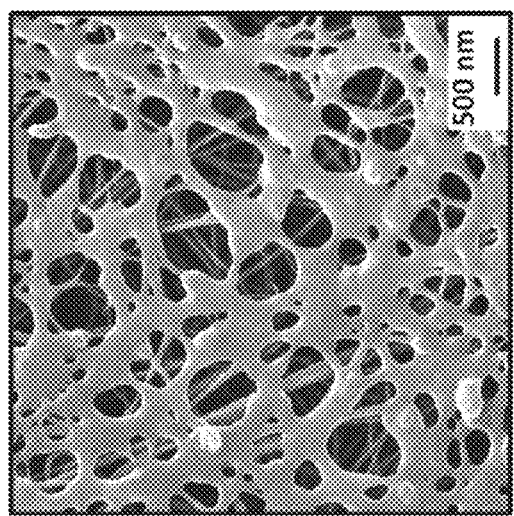
Figure 6C:
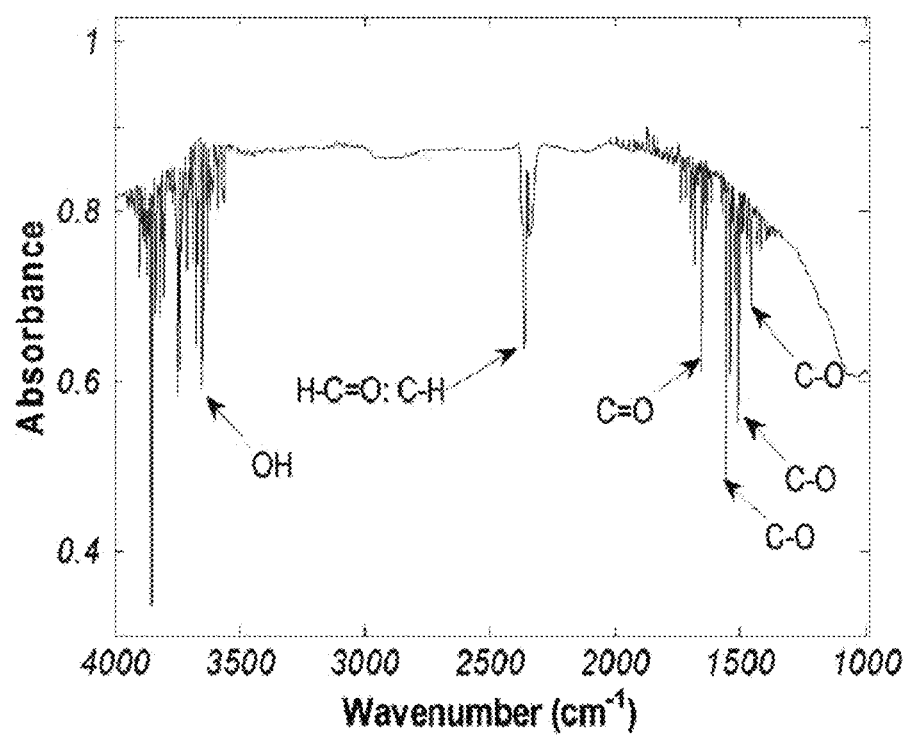
Figure 6D:
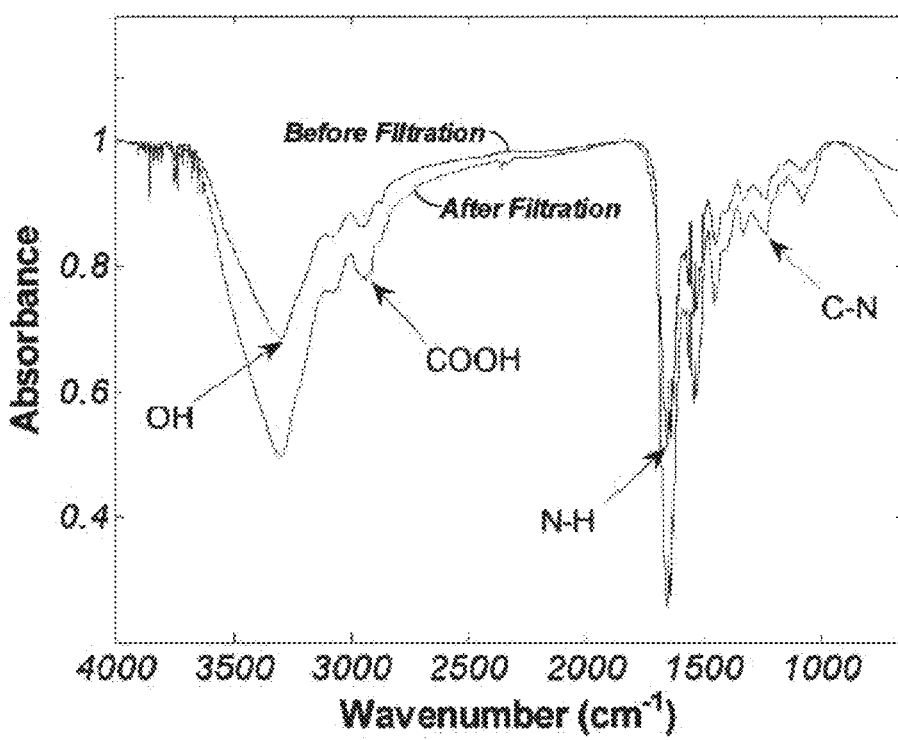
Figure 6E:
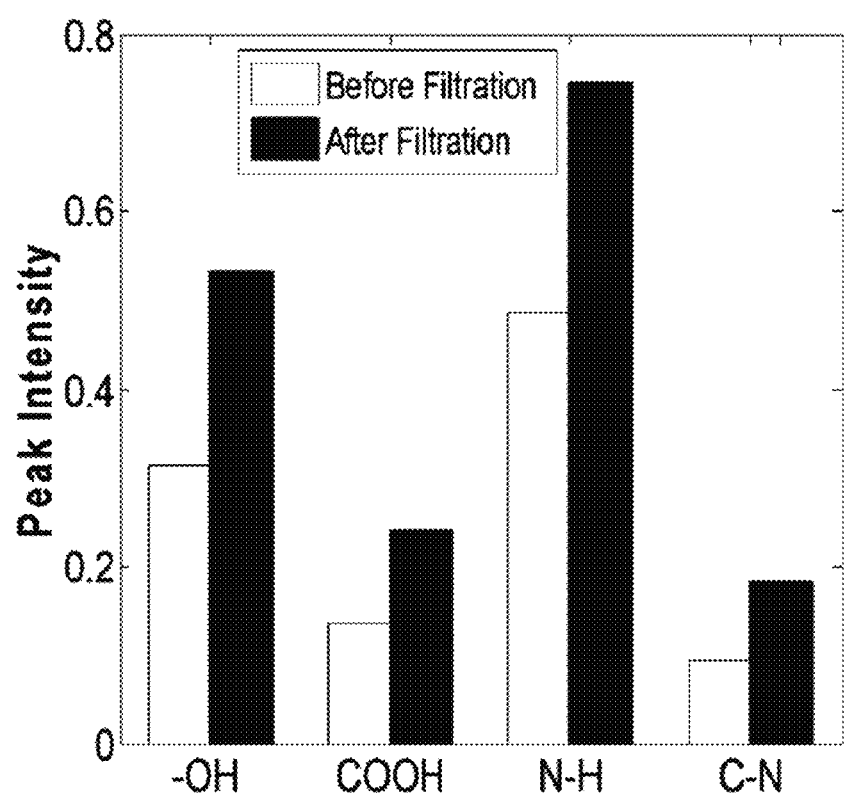

To further analyze the performance of the gelatin nanofabrics, the filtration mechanisms were studied based on examining the surface chemistry of pollutants and gelatin nanofabrics before and after filtration. As mentioned above, numerous functional groups exist in the structure of gelatin. These functional groups can strongly interact with various pollutants in the air and enable the filter to remove the pollutants (toxic chemicals and solid particles) via an interaction-based mechanism besides existing size-based primary mechanisms. FIG. 6a depicts a simplified gelatin molecule (filter) along with PM, and formaldehyde as examples of solid and gaseous pollutants. It can be seen that the aldehyde group can undergo addition reactions with amine groups in gelatin (provided by amino acids such as lysine) forming aldimine linkages. This reaction elicits a change in filter color from white to a yellow color. PM particles and other pollutants with different compositions can interact with the gelatin nanofabrics through hydrogen bonding, charge-charge interactions etc. FIG. 6b shows an SEM image of gelatin nanofilter after the capture of pollutants via a combination of interaction-based and size-based mechanisms. This schematic indicates a new interaction-based mechanism of filtration for gelatin nanofabrics besides the primary four size-based mechanisms. To further understand the possible interactions between the gelatin nanofabrics and the pollutants (solid particles and toxic chemicals), Fourier Transform Infrared Spectroscopy (FTIR) and dielectric constant measurement (see FIGS. 8a and 8b) were used to identify the functional groups from the pure gelatin nanofabrics, polluted air, and nanofabrics with trapped pollutants. The FTIR spectra of the pollutant in the polluted-air sample is shown in FIG. 6c. The specific peaks of the functional groups in the cigarette smoke are around 3,638, 2,357, 1,659, 1,552, 1,501, and 1,458 cm⁻¹ which indicate the existence of O—H, C—H(aldehyde), C═O, and C—O (last three peaks) groups, respectively. All of these groups in polluted-air sample may interact with the groups on the surface of gelatin nanofibers. The comparison of the FTIR spectra for the gelatin nanofibers before and after filtration is shown in FIG. 6d. It can be found that there is no new peak formed after filtration. However, there is a significant change in the intensity at specific groups and interactions, including hydroxyl, carboxyl, and amine functional groups (see FIG. 6e). These results can be explained by positing that the types of interactions between the pollutants in the smoke and gelatin fibers are similar to those inherently existing in gelatin nanofabrics. Therefore, the dramatic increase in the peak intensity of these functional groups after filtration testing should be the result of the interactions between gelatin nanofabrics and the pollutants, such as hydrogen bonding, ionic bonding, charge-charge interactions, etc.

The dielectric measurements (FIG. 8a) demonstrated that the commercial HEPA filter, which has no active functional groups in its structure, showed a constant dielectric constant which means, as expected, it is an isolating material. In contrary, gelatin nanofabrics showed higher dielectric values at lower frequencies which means that the gelatin fibers do not have an isolating behavior. In addition, fluctuations in the permittivity values (FIG. 8b) of a material at low frequencies are mostly representative of the rotation and the respond of active functional groups with the electric field to some extent. These results showed a huge amount of fluctuations at lower frequencies for gelatin nanofibers while there was not any changes for commercial HEPA filter that is made of an isolating material. Dielectric test results, as well as FTIR results that have been mentioned previously, proved the existence of many active functional sites to interact with particles and chemicals present in polluted air that resulted in high removal efficiency for both $PM_{2.5}$ and toxic chemicals (HCHO and CO) with very low areal density compared with commercial HEPA filter.

Conclusion

In summary, the gelatin protein was studied as an example to demonstrate the potential of natural proteins to serve as environmentally friendly and high-performance air-filtering materials. Uniform gelatin nanofiber mats with very small diameters were fabricated by employing a "green" solvent with optimized composition. It has been found that the gelatin nanofiber mats with a controlled uniformity and small fiber diameters possess extremely high particulate removal efficiencies of more than 99.3% and 99.6% for PM0.3 and $PM_{2.5}$, respectively. These results indicate that the gelatin nanofibers with a much lower areal density (e.g. 3.43 $g/m^2$) can efficiently remove a broad range of PM particles similar to one of the most efficient particulate air filters, HEPA with areal density of 164 $g/m^2$. More significantly, the combination of the inherent surface chemistry of gelatin nanofibers (i.e., various functional groups on the fiber surface) and nanofiber technology enables gelatin-protein nanofibers to have high interaction capability with toxic chemicals present in the air. Particularly, the gelatin nanofabrics possess excellent efficiency of absorbing toxic chemicals (e.g. ca. 80% for HCHO; 76% for CO), which has never been realized in any air filters with a single material composition. The mechanisms responsible for such simultaneous high capturing capabilities of particulate and toxic chemical were analyzed. It is believed that the interaction-based filtration mechanism besides the existing size-based primary mechanisms result in these functions. This study indicates that protein nanofabrics are promising "green" air-filtering materials for next generation air filtration systems.

Example 2: Soy-Protein Based Nanofiber Filters

Proteins are well-known by their numerous active functional groups along the polypeptide chain. The variety of functional groups of proteins provides a great potential for proteins to interact with airborne pollutants with varying surface properties. In this work, soy protein, a type of abundant plant protein, has been employed for the first time to fabricate multifunctional air filtration materials. To take advantage of the functional groups of soy protein for air filtration application, the soy protein is first well denatured to unfold the polypeptide chains and then fabricated into nanofibers with the help of poly(vinyl alcohol). It is found that the resultant nanofabrics show high filtration efficiency for not only airborne particulates with a broad range of size, but also various toxic gaseous chemicals (e.g. formaldehyde and carbon monoxide as demonstrated here), which has not been realized by conventional air filtering materials. This study indicates that protein-based nanofabrics are promising nanomaterials for multifunctional air-filtration Introduction Air pollution has been a growing concern and the cleaning of polluted air becomes more and more challenging mainly due to a complicated composition of the pollutions, containing particulate matter (PM) with various sizes, chemical vapors, and bacteria/virus and so on. These complicated air pollutants present discomfort and serious impact to human health and other living organisms. Most of the particle pollutions are made of organic compounds, such as carbon derived species (e.g. $CO_2$ and CO) as well as sulfur and nitrogen based inorganic compounds (e.g. $SO_2^{2-}$, $SO_4^{2-}$, $NO_3^-$, etc.). Additionally, there are also various toxic gaseous molecules, such as nitrogen dioxide ($NO_2$), methane ($CH_4$), carbon monoxide (CO), formaldehyde (HCHO), and in general volatile organic compounds (VOCs). These pollutants produced from different sources (such as petrochemical and allied industries) can participate in various photochemical reactions in the atmosphere and create huge amount of environmental hazards. At the same time, these particles and chemicals can form various derivant pollutants which can easily penetrate into human lung and bronchi and cause numerous premature deaths. Therefore, the demand for high-efficiency air filtering materials that are able to simultaneously capture hazardous particles and chemical gases is dramatically increasing.

Conventionally, synthetic polymers have been employed as the air filtering material and fabricated into different configuration, such as porous films and non-woven fibrous mats. For non-woven mats, they are usually made of randomly oriented micron-size fibers of plastics, such as polyethylene and polypropylene. Usually, these traditional air filter mats can only capture particles via four different size-based mechanisms, including sieving, inertial impaction, interception, and diffusion. These four mechanisms work together in capturing pollutant particles according to their sizes. Clearly, these porous fabrics of conventional plastic micron-size fibers are not effective for removing chemical gases due to their inert surface and/or limited surface area. To remove chemical molecules and odors, other filtration materials, such as activated carbon (charcoal), have to be used. As a result, in order to achieve high efficiency for both particulate and chemical pollutions, the air filters have to combine different layers with different removing functionalities (such as the combination of activated carbon filter with conventional air filter). This strategy will dramatically increase the air resistance or pressure drop and so, the energy consuming of the air filter. Therefore, developing a single material with multi-functional filtration properties is significant for the development of cost-effective and high-efficient air-filters.

Soy protein (SP), one of the most abundant and low-cost plant proteins, has been widely studied as a type of biomaterial with different applications, including antibacterial, active food packaging, adhesives, tissue engineering, drug delivery, and so on. These significant applications of SP indicate that SP is a high-performance biomaterial with multi-functionality. In particular, the ionizable groups, such as glutamic acid, lysine, histidine etc., have been found critical for antibacterial properties. Also, it was reported that the ionizable groups in soy protein can create active sites to capture bacteria. Since charged fibers were reported to be very effective for capturing various types of pollutants, existence of these ionizable groups in soy protein indicates a great potential to capture charged pollutions. In fact, it is known that, in addition to these ionizable groups, soy protein possesses lots of other functional groups, including polar, nonpolar, hydrophobic and hydrophilic ones. These functional groups, such as hydroxyl (—OH), carboxyl (—COOH), amine (—$NH_2$ and —$NH_3^+$), methyl ($CH_3$) etc., make soy protein a very attractive material with ability to interact with various particles or chemicals. To demonstrate this great potential, in this study, soy protein is first denatured and then fabricated into nanofibers with the help of poly(vinyl alcohol). The denaturation combined with the nanofiber morphology can greatly increase the density of active sites available for interacting with pollutions. The results reveal that SP-based nanofabric can show high removing efficiency in both particulate and chemical pollutions, which, based on the authors' knowledge, has never been realized by a single material before.

Materials and Methods

Raw Materials and Solution Preparation.

Soy protein isolate powder with >90% protein content was supplied from ADM Foods & Wellness, Decature, Ill. Poly(vinyl alcohol) (PVA; Mn=75,000 g/mol) granules were obtained from Sigma-Aldrich St. Louis, Mo. Acetic acid (99.9% purity) was purchased from J.T.Baker® (PA, USA). Two main procedures were explored in this study to produce the nanocomposite fibrous mats, a powder-based procedure and a solution-based procedure. It was found experimentally that samples prepared via the solution-based procedure consistently outperformed the samples prepared via the powder-based procedure. The powder-procedure sample preparation and the particulate and chemical filtration (see FIGS. 18 and 19a, 19b) data are described below. Due to the issues that occurred during implementation of a powder-based procedure, the solution-based procedure was chosen for the studies presented in this work. For the solution-based method, soy protein isolate was thermally denatured in mixed solvent (volume ratio, acetic acid:DI water=80:20) with a concentration of 8.5 wt % at 85° C. for 4 h using magnetic stirring (400 rpm). Poly(vinyl alcohol) was dissolved separately in the same solvent with a concentration of 8.5 wt % at 60° C. for 2 h using magnetic stirring (400 rpm). Then the denatured SPI was loaded as a solution into the PVA solution with different ratios and mixed with PVA solution for 24 h using a spin mixer.

Preparation of Soy Protein-Based Filter Nanofabrics.

The soy protein-based nanofibers were fabricated by electrospinning technique. The SPI/PVA nanocomposite solution was loaded in a syringe (Monojet™ Kendall) with a 21-gauge blunt tip needle. A voltage of 16-21 kV was applied for electrospinning and was controlled by a high voltage power source (ES50P-5W, Gamma High Voltage Research). A mono-inject syringe pump (KD Scientific, KDS-100) was utilized to pump the SPI/PVA solution. Commercial aluminum mesh with wire diameter of 0.011 inch and mesh size of 18 mm×16 mm was grounded to collect the fibers. The distance between needle and sample collector was fixed to 10 cm and average flow rate of 0.6 ml $h^{-1}$ was utilized. Moreover, the needle position (horizontal and vertical) was adjusted continuously during electrospinning to achieve uniform fiber mat with controlled nanofiber diameter and different areal densities.

Pollution Generation and Air Filtering Testing.

Two different source of pollution were utilized to prepare polluted air samples. The first one was cigarette smoke and the other source of pollution was the air product of burning plant materials. It has been established that cigarette smoke consists of PM with size from 0.01 to 10 µm, and approximately 7000 different chemicals, where hundreds are toxic such as formaldehyde (HCHO) and carbon monoxide (CO). Samples produced from burning plant materials also included broad range of PM particles and high concentrations of HCHO and CO. The polluted air samples were diluted in a plastic gas-bag to a hazardous and measurable level for the analyzer due to very high initial pollutant concentration. A particle counter (CEM, DT-9881) was used to measure the PM (different particle sizes from 0.3-10 µm) and toxic chemicals (HCHO and CO) concentration of the polluted air samples. Also, the air flow resistance (the pressure difference of both sides of air filter) was controlled and measured by a monometer (UEi, EM201-B) with a standard air flow velocity of 5 cm $s^{-1}$. A circular filter sample with diameter of 37 mm was placed in a home-made sample holder to perform air filtration testing for all the measurements. The air downstream of the filter was collected by a clean vacuum gas-bag. Similar measurements were conducted for the collected filtered air downstream of the filter. The testing procedure was performed on four filters fabricated independently (with similar areal density) from the same solution for each type of samples to replicate the results. Again equation (1) from Example 1 is used to determine the removal efficiency η.

Characterization.

Scanning electron microscopy (SEM, FEI SEM Quanta 200F) was utilized to investigate the change in SPI particle size after denaturation process as well as morphology of the nanofabrics before and after air filtration. All the samples were sputter-coated with gold nanolayer (10 nm in thickness) using (Technics Hummer V) sputter coater. To further study the denaturation of SPI, transmission electron microscopy (TEM, FEI Tecnai G2 20 Twin) was used to investigate the particle size. In order to study the interface interactions between pollutants and nanofabrics, Fourier transform infrared spectroscopy (FTIR, Nicolet Thermo Scientific) absorption spectra was employed. To distinguish the interactions between nanofibers and pollutants from the interactions inside the fabric or polluted-air themselves, the FTIR spectrum of include polluted-air, clean protein nanofabrics before and after filtration were compared. All the measurement was repeated for 3 times.

Results and Discussions

Denaturation of Soy Protein.

Figure 10A:
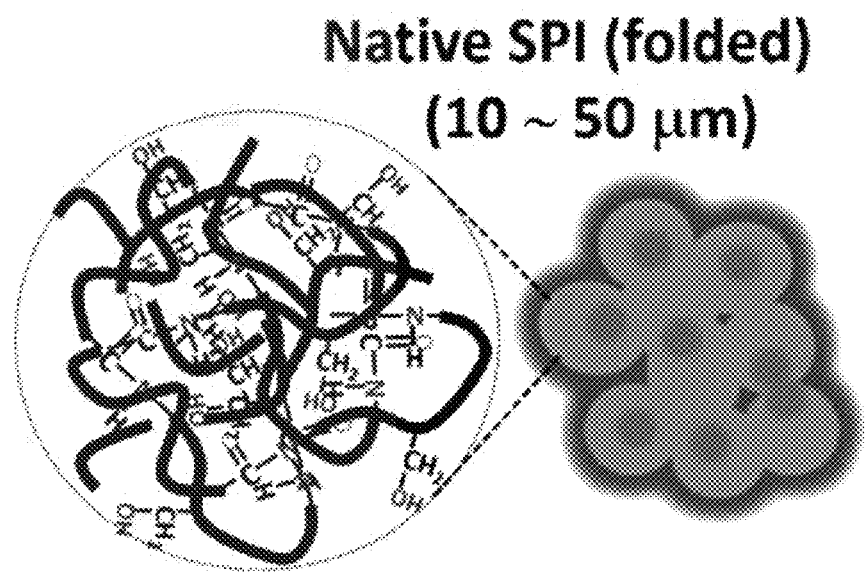
Figure 10B:
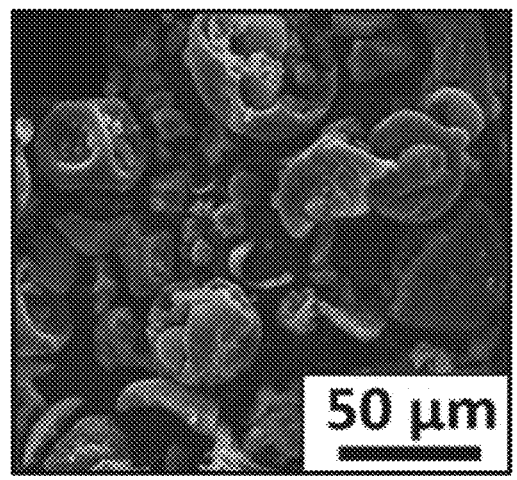
Figure 10C:
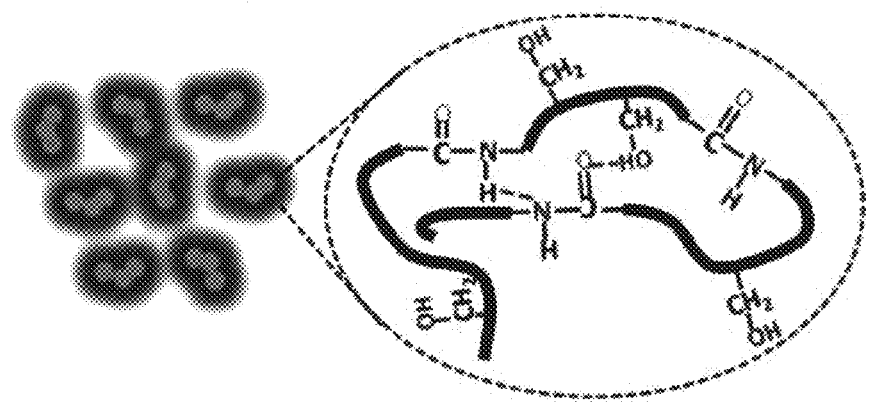
Figure 10D:
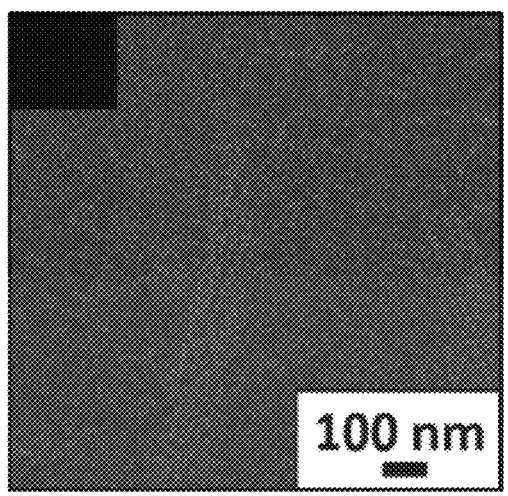
Figure 10E:
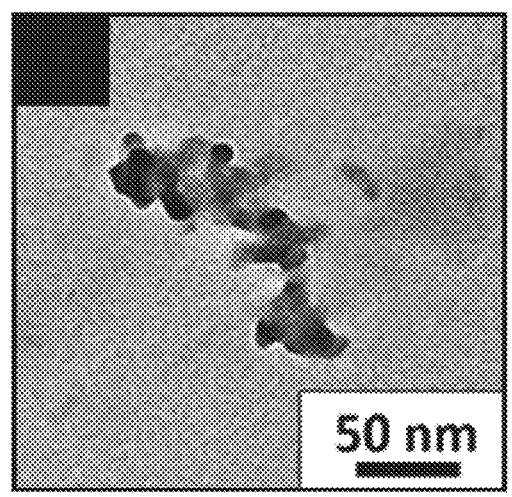

In order to explore the potential of soy protein isolate (SPI) for air filtration application, the protein was first denatured to unfold the in-built protein structures. As illustrated in FIG. 10a, pristine soy protein takes the form of micro-size powders with diameter around 50 µm (see FIG. 10b). It is well-known that natural proteins usually have four different levels of structure, including primary, secondary, tertiary and quaternary structures. For simplicity, the raw material, pristine SPI, can be viewed as a big particle hold by numerous intermolecular interactions contributed by 18 types of amino acids in the protein chains. Therefore, the denaturation process can destroy the in-built high level structures (secondary, tertiary and quaternary) of the big SPI particles and finally unfold the soy protein chains as illustrated in FIG. 10c. In order to study the effect of denaturation process on SPI morphology, scanning electron microscopy (SEM) and transmission electron microscopy (TEM) were utilized. The SEM and TEM images of the denatured SPI particles and after denaturation are shown by FIGS. 10d and 10e, respectively. One can find that the denaturation can result in a significant reduction in particle sizes from about 50 µm to less than 30 nm. The huge reduction in the particle size indicates that more functional groups along the SPI chain will be exposed to the surface, which is critical for air filtration application. At the same time, a well-denatured SPI is also important for the electrospinning process as well as the quality control of the nanofibers, since it is one of the perquisites for achieving good homogeneity for both the SP/PVA solution and the final nanofibers.

Morphology of SP/PVA Nanofabrics.

Figure 11A:
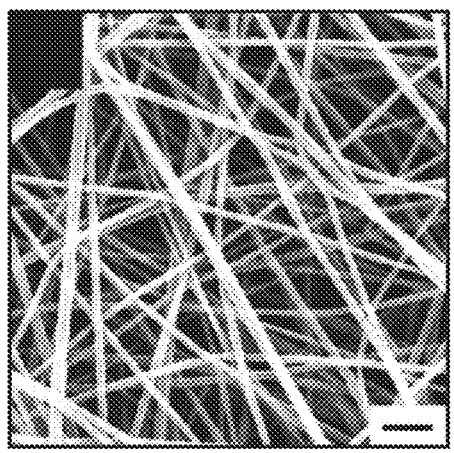

As described in the experimental part, cigarette smoke was used as a sample of polluted air. Cigarette smoke includes a very complicated combination of various particles, toxic chemical molecules and even heavy metal ions as introduced in Experimental part. This mixture of various particles and hazardous chemical molecules makes cigarette smoke a good sample for the evaluation of the filtration performance of the SP/PVA nanofabric. SEM was utilized to investigate the morphological characteristics of the nanofibrous filter mats with different SPI concentration and similar areal density (4.50 g m$^{-2}$). FIGS. 11a and 11c and e show the SEM images of the SPI/PVA nanofabrics with different SPI/PVA ratio before the air filtration testing. From the SEM images, it can be found that all the SPI/PVA ratios give rise to similar fiber diameter in the range of 100 to 200 nm (see FIG. 11g and FIGS. 21a-21e for size distribution). It is noted that the pores are irregular in nature for the nanofabrics, which makes it difficult to determine the pore geometry. As a result, the pore size was estimated by ImageJ and the size distribution of these samples was found similar, ca. 4 μm, as shown in FIG. 11h (also see FIGS. 20a-20f). To characterize the distribution of the denatured SPI in the SPI/PVA nanofiber, high magnification of the nanofiber was used to characterize the morphology structure of a single SPI/PVA nanofiber (see the TEM images in FIGS. 21a-21e). Based on the images, one can find that there is no SPI nanoparticles inside the nanofiber or on the nanofiber surface, indicating a good miscibility between denatured SPI and PVA, which is consistent with other studies. In spite of this fact, it is still believed that there are SPI molecules on the nanofiber surface due to the following reasons: (1) the air filtration performance for SPI/PVA nanofabrics which will be introduced later is much better than pure PVA nanofabrics, indicating that the surface of PVA nanofiber is very different from PVA/SPI nanofiber; (2) The TEM images (see FIGS. 22a-22c) show that there is no core-shell structure for SPI/PVA nanofiber, indicating SPI is homogeneously distributed in the nanofiber and lots of SPI molecules exist on the surface since a high loading of SPI was used for the nanofiber.

Figure 11B:
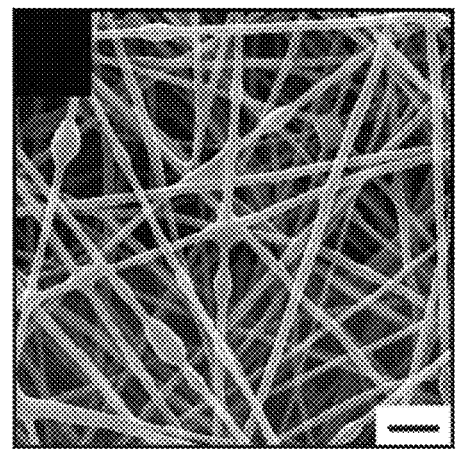
Figure 11C:
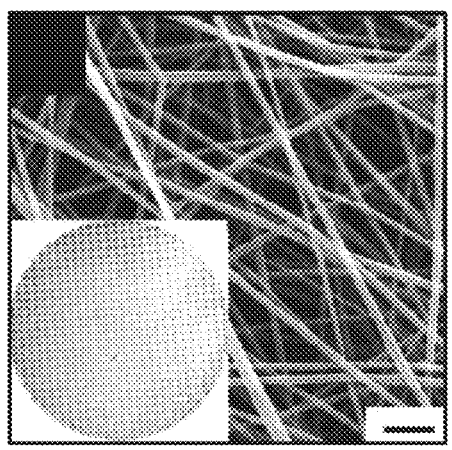
Figure 11D:
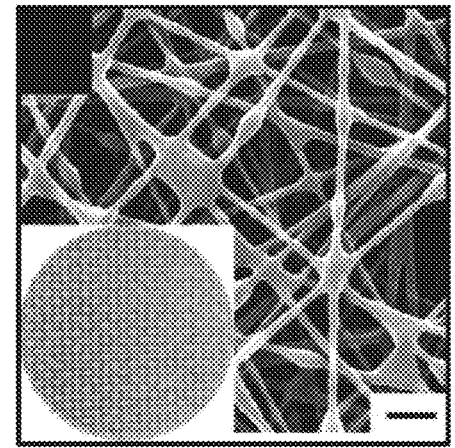
Figure 11E:
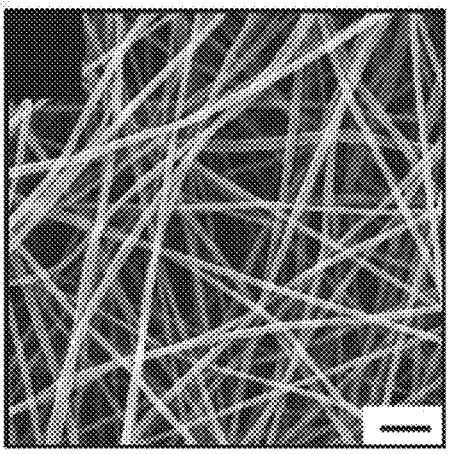
Figure 11F:
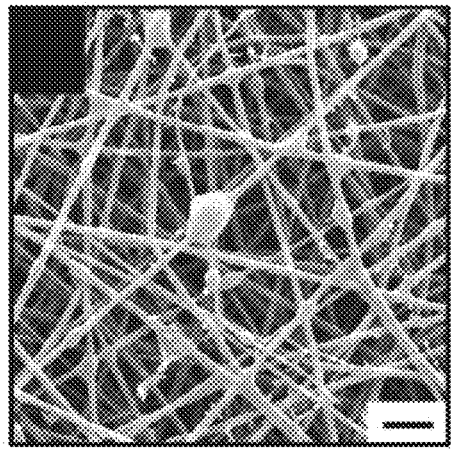
Figure 11G:
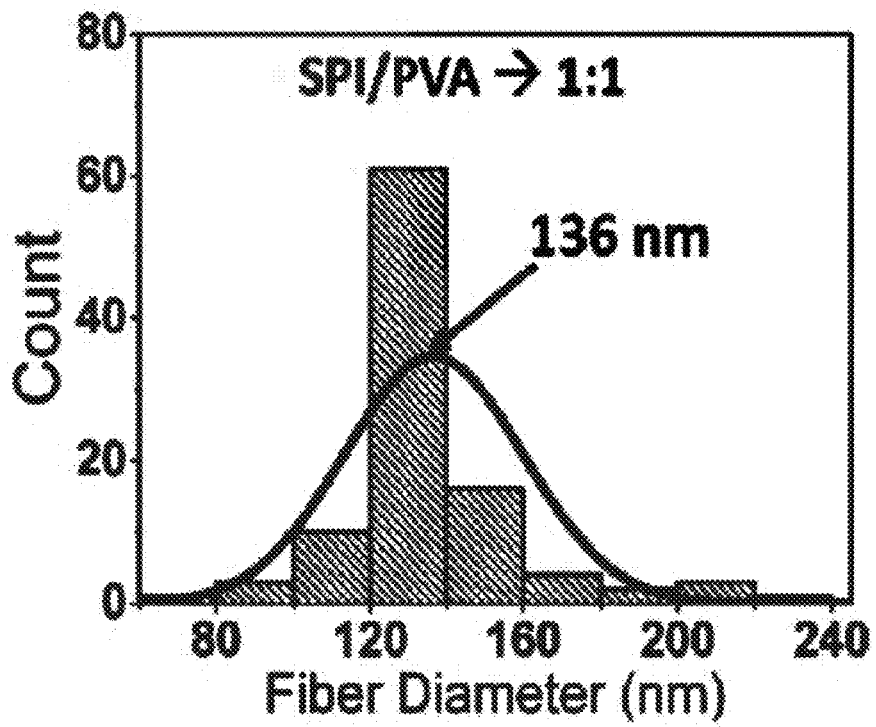
Figure 11H:
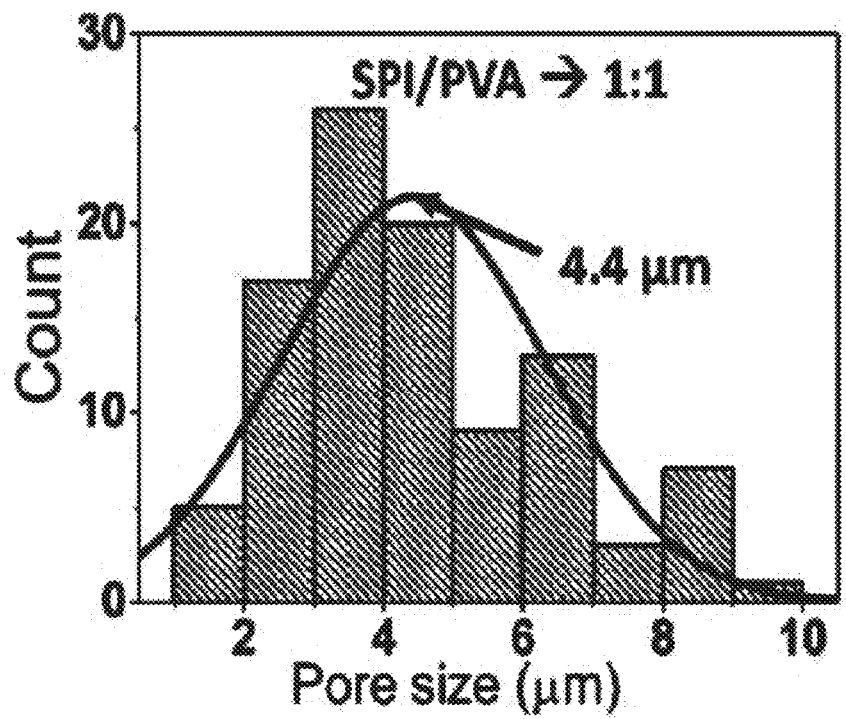

FIGS. 11b, 11d and 11f are the SEM images of the nanofabrics with different SPI/PVA ratio after air filtration testing. The digital photos inserted in FIG. 11c and FIG. 11d display a dramatic color change from white color (clean filter before air filtration) to yellow/orange color (used filter after air filtration), indicating that the SPI/PVA nanofabrics captured lots of pollutions. Although the morphology of the as-spun nanofibers with different SPI concentrations is almost similar, the SEM images after filtration show that the soy protein-based filter mat can capture more particles after exposing to the same polluted air for the same time (see FIGS. 11b and 11d). More SEM images of the nanofabrics of SPI/PVA with other ratios can found in FIGS. 23a-23f. It was found that the sample with SPI/PVA ratio around 1:1 captured more particles than the rest of the samples, which indicates an optimal loading of SPI for good air filtration performance. The existence of an optimal SPI loading is mainly due to the fact that the air filtration performance is determined by two factors related to SPI loading at the same time: the mechanical strength and surface activity of the nanofabrics, which will be further discussed in the air filtration performance studies later.

Air Filtration Performance

In order to test the filtering capabilities of the protein-based nanofiber mats, we performed both efficiency test (η %) and the pressure drop test (ΔP). For a standard high efficiency filter, the PM$_{2.5}$ efficiency is suggested to be 95-100%, and with regards to a HEPA filter, the requirements state that it must fulfill a removal efficiency of 99.97% for the most penetrating particle size (MPPS) of 0.3 μm with a maximum pressure drop of 1.3 in H$_2$O gauge (~325 Pa) at an air face velocity of 5 cm s$^{-1}$, as suggested by the US Department of Energy (DOE).

Removal of Particulate Pollutants.

For this study, we first focused on the effect of SPI concentration on the morphology of the nanofabrics as previously shown in FIGS. 11a-11h. The filtration efficiency for both PM$_{2.5}$ and PM$_{10-2.5}$ of these samples was then tested. In order to compare the performance, all these samples were prepared with similar areal density (ca. 4.5 g m$^{-2}$). As shown in FIG. 12, the removal efficiency for small particles (PM$_{2.5}$, that is, particles with size less than 2.5 μm) and big particles (PM$_{10-2.5}$) are compared for SPI/PVA nanofabrics with different SPI/PVA ratios. Based on FIG. 12, it can be found that the removal efficiency of PM$_{10-2.5}$ (particles with sizes between 2.5 and 10 μm) stays in the same range of around 99.90-99.99%, regardless of the SPI loading. This result indicates that large particles are mostly captured through sized-based physical mechanisms of filtration. However, for PM$_{2.5}$, the removal efficiency as displayed in FIG. 12 is dependent on the SPI/PVA ratio and lies in the range of 99.40-99.80%. In particular, the neat PVA nanofabric mats show a PM$_{2.5}$ removal efficiency of 99.45%, while the SPI/PVA nanofabrics with 1:1 ratio leads to a higher efficiency of 99.80% for PM$_{2.5}$. It is noted that an improvement by 0.4% is significant since the efficiency is approaching the limit, 100%. The above result reveals that contribution of SPI is critical for improving the removal efficiency for small particles with size less than the pore size (ca. 4 μm). This result also indicates that the small particles were removed via the interaction-based mechanism with the critical contribution from the multiple functional groups in the SPI structure, instead of the sized-based mechanisms. This conjecture will be further confirmed by the filtration performance of toxic chemicals as will be discussed later.

From FIG. 12, it can also be found that the sample with PVA/SPI ratio around 1:1 gives rise to the best air-filtration performance in terms of removing PM$_{2.5}$. This result can be explained as follow. The filtration performance of the composite nanofabric is dependent on not only the PVA/SPI ratio, but also the mechanical strength of the nanofabrics. In our study, it was found that, when the SPI/PVA is higher than 1:1, the PVA/SPI nanofiber becomes brittle, which leads to formation of micro-cracks or large pores in the nanofabrics after the electrospinning or during the filtration testing (see FIGS. 24a and 24b), which is consistent with other studies. As a result, there should be an optimal loading for SPI to achieve a good balance between mechanical strength and surface activity. In brief, the structure and mechanical weakness of PVA/SPI nanofiber with higher SPI/PVA ratio (higher than 1:1) are the main reasons for the efficiency drop. Therefore, in the following studies, all the samples will use a PVA/SPI ratio of 1:1.

In addition to the SPI/PVA ratio, another critical parameter affecting the air filtration performance is the area density of the nanofabrics. In FIG. 13a, the removal efficiency for pollutant particles with different sizes are compared among the nanofabric samples with different areal densities. From these results, it can be observed that, for particles with size larger than ca. 1 μm, the removal efficiency does not change significantly with the increasing of areal density. However, for particles with size less than 1 μm, the removal efficiency is highly dependent on the areal density until it reaches ca. 4.50 g m$^{-2}$, where the removal efficiency has reached its maximum point. With regards to very small particles of PM$_{0.3}$, an improvement in removal efficiency from 86.40% to 98.70% is achieved when the areal density increases from 1.55 g m$^{-2}$ to 4.50 g m$^{-2}$. However, no significant increase in removal efficiency for the $PM_{0.3}$ can be found when the area density is above the 4.50 g m$^{-2}$. These results show that increasing the areal density of the nanofabrics can remarkably improve the removal efficiency of small particles but not larger particles. This phenomenon can be explained as following. Firstly, it is probably determined by an interaction-based mechanism for particles that have smaller size than the pore size of the nanofabrics. Secondly, a higher areal density of nanofabrics will increase the contact possibility between small particles and the nanofabrics, as well as the chance to capture more small particles. FIG. 13b further displays how the areal density affects the removal efficiency for $PM_{2.5}$ and $PM_{10-2.5}$. From this figure, it can be found that the area density doesn't affect much the removal efficiency for $PM_{10-2.5}$, but affect significantly on that for $PM_{2.5}$, which is similar to the situation for $PM_{0.3}$ as introduced previously. It is also found that, above areal density of 4.50 g m$^{-2}$, there is no significant improvement in the removal efficiency of $PM_{2.5}$. However, below 4.50 g m$^2$, $PM_{2.5}$ removal efficiency increases with the increasing of areal density. Therefore, it can be concluded that an appropriate areal density of protein nanofabrics is important to achieve high removal efficiency for small particles. The high removal efficiency for small particles is most likely due to the "nano-size" effects and "active" surface properties of the protein-based nanofiber, which can help to trap very small particles with size below the pore size of the nanofabrics.

Removal of Toxic Chemicals.

In addition to a high efficiency for removing PM with different sizes, the protein-based nanofabrics also show excellent removal efficiency for toxic chemicals. In this study, we chose formaldehyde (HCHO) and carbon monoxide (CO) molecules to test the chemical removal performance of the protein-based nanofabrics. HCHO and CO are the cancer-causing and poisonous gases that exist in cigarette smoke. FIG. 14a summarizes the chemical removal efficiencies of HCHO and CO for the samples with different SPI/PVA ratios. For the HCHO removal efficiency, this figure demonstrates that the overall range of HCHO removal efficiency is between 30.0% and 62.50%. In particular, the neat PVA nanofabric shows a much lower HCHO removal efficiency (ca. 31.23%) than SPI/PVA nanofabrics (ca. 62.50% for the sample with SPI/PVA ratio of 1:1), indicating that the SPI plays a critical role in removing chemical gases. For CO removal efficiency, all the nanofabrics, including pure PVA, show good filtration performance and higher than that of removing HCHO, i.e. the removal efficiency for SPI/PVA samples ranges from 76.90% to 90.90% and, for pure PVA sample, it is 55.67%, which is much lower than that of SPI/PVA samples. Similar to the particulate removal efficiency, there is also an optimal ratio for PVA/SPI which gives rise to the best air filtration performance in terms of removing particulates and toxic chemicals. As a comparison, the removal efficiency for HCHO and CO by commercial HEPA filters which have no functional groups along their fibers was also tested. As shown in FIG. 14a, the removal efficiency for HCHO and CO are less than 5% and 3%, respectively, even though they have a much higher areal density of 164 g m$^{-2}$. Since toxic gases are molecules with sizes much smaller than particles in the polluted air, it is believed that the removal of toxic chemicals is governed by an interaction-based filtration mechanism that is contributed by soy protein structure, which will be analyzed later.

The effects of areal density on the chemical removal efficiency for HCHO and CO are shown in FIG. 14b. The results show that the removal efficiency for toxic gases doesn't change significantly with the increasing of areal density of the nanofabrics. For removal efficiency of HCHO, it fluctuates between 42.50% and 62.50% and, between 78.90% and 85.70% for CO. This result may suggest that the removing of toxic gases is a very slow process and the change of the area density doesn't lead to a big difference in the time for the absorbing of toxic gases. From the above results, one can conclude that the combination of nanofiber mats with the functional SPI on the surface provides a promising solution for multi-functional air-filtering materials.

Pressure Drop and Quality Factor.

Beside particulate and chemical removal efficiency, pressure drop or air flow resistance of an air filter is another parameter related to the filtration performance. As suggested by US DOE, the pressure drop should be less than ca. 325 Pa at an air face velocity of 5 cm s$^{-1}$. FIG. 15a shows a quantitative study on how the air flow resistance change with the areal density of the sample with SPI/PVA ratio of 1:1. It is shown that the pressure drop generally increases nonlinearly with the areal density, which may be related to a complicated change in the porous structures of the nanofabrics when more and more layers of nanofibers are added. Taking into account the particulate removal efficiency (see FIG. 12) and the pressure drop (see FIG. 15a), an optimized areal density has been experimentally determined to be around 4.50 g m$^{-2}$. It is noted that the optimal areal density should also be related to the size of the nanofibers as well as the porous structures of the nanofabrics, which is beyond the scope of this study. In order to correlate the pressure drop and removal efficiency for evaluating the overall performance of the SPI-PVA nanofabrics, quality factor (QF), that is, the figure of merit (FOM), has been calculated for the filtering materials studied in this work. QF is representative of the ratio between the particulate removal efficiency of the air filter and the pressure drop due to air flow across the filter. The QF parameter represents a comprehensive evaluation of the air filtering performance. For a good air filter, it should give rise to a high QF number, which means the air filter can achieve high removal efficiency with low pressure drop or air resistance. A QF comparison between different types of air filtering materials and the SPI/PVA nanofabrics is shown in FIG. 15b. Two types of commercial air filters along with the reported, PAN-85 air filter, are shown in this figure for comparison. It demonstrates that the optimized PVA/SPI nanofabric possesses the highest QF (ca. 0.027) amongst these different types of air filtering materials, which indicates that the protein-based nanofabric possesses the best filtration performance.

The time-dependent behavior of the filtration performance for the SPI/PVA nanofabrics was also studied. Time-dependent behavior is related to the long-term performance of an air filter material. For the protein-based nanofabrics, the time-dependent air filtration performance was studied via investigating how the removal efficiency and weight-gain of pollutions depend on the using time. For simplicity, the optimized SPI/PVA nanofabric was employed to compare with other counterparts. The samples were exposed to a highly polluted air from cigarette smoke for about 180 min. After each time interval of 45 minutes, the particulate and chemical removing efficiency, the weight-gain of pollutions were recorded. (1) Time-dependent behavior for particulate removal efficiency. As shown in FIG. 16a, the particulate removal efficiency for both SPI/PVA nanofabrics and commercial HEPA decreases with testing time. It can be found that the $PM_{2.5}$ removal efficiency for SPI/PVA decreases slightly faster than that for commercial HEPA. This is because that the commercial HEPA has a much higher areal density (ca. 160 g/m²) than our SPI/PVA nanofabric (4.5 g/m²). (2) FIG. 16*b* displays the toxic chemical removal efficiency vs. testing time. For the protein nanofabric sample, the HCHO removal efficiency drops steadily from 63.28% to 34.78% after 45 minutes of testing time. While the CO removal efficiency drops from a high value of 85.78% to 62.53% after 45 minutes, and further to 33.33% after 90 minutes of testing. In comparison, for the commercial HEPA filter, the chemical removing efficiencies for both HCHO and CO are below 5% and decrease to be less than 3% after about 180 min. of testing. This decreasing behavior of the removal efficiency is mainly due to the fact that less and less active sites on the nanofiber surface will be available for pollutions absorption as the filtration going.

To further demonstrate the advantages of the SPI/PVA nanofabrics in removing pollutions, the weight-gain of captured pollutions was recorded after each time interval. It is shown that the total weight of the captured pollutions increases from 3.5 mg to 7.3 mg after 180 minutes of testing. However, the commercial HEPA filter shows only a slight weight increase from 2 mg to 3.8 mg after the same testing time. To better demonstrate this advantage of the protein-based nanofabrics, a ratio defined as $W_p/W_f$ ($W_p$, the weight-gain of captured pollutants, $W_f$, the weight of the filter before testing) is employed here to describe the ability to capture pollutions. It can be found from FIG. 16*c* that the ratio $W_p/W_f$ for PVA/SPI nanofabric increases from 0.72 to 1.5 when the testing time increases from 5 min. to 180 min. In contrast, the $W_p/W_f$ ratio for HEPA filter increases from only 0.01 to 0.02 for the same time interval. A high $W_p/W_f$ ratio indicates a strong ability to capture pollutants. The value of 1.5 for $W_p/W_f$ reveals that the SPI/PVA nanofiber can capture an amount of pollutions with a weight even much higher than the weight of the filter material itself. This behavior is similar to spider web which has really low weight but can capture huge particles. The above results indicate that the protein-based nanofabrics can simultaneously improve the removal efficiency for both particulate and toxic gases and long-term performance due to an enhanced capturing mechanism for both particles and toxic gases.

Filtration Mechanism.

Figure 17A:
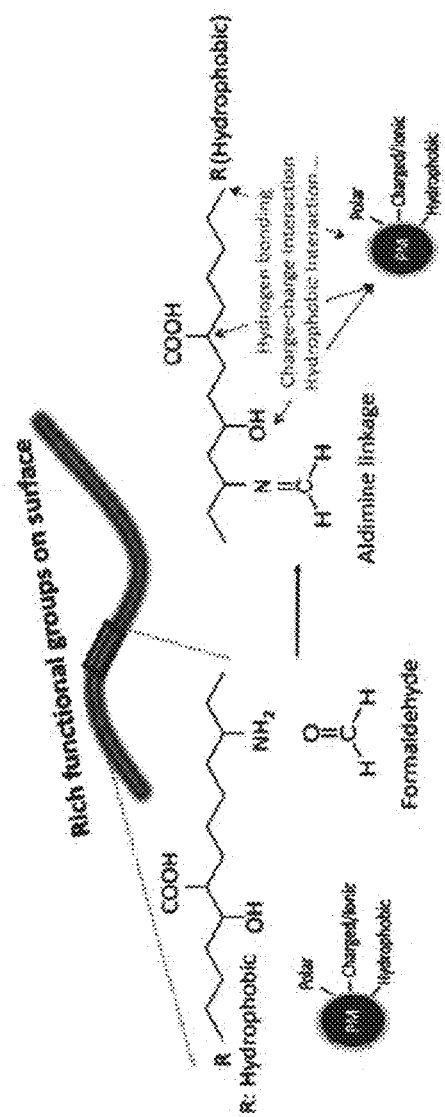
Figure 17B:
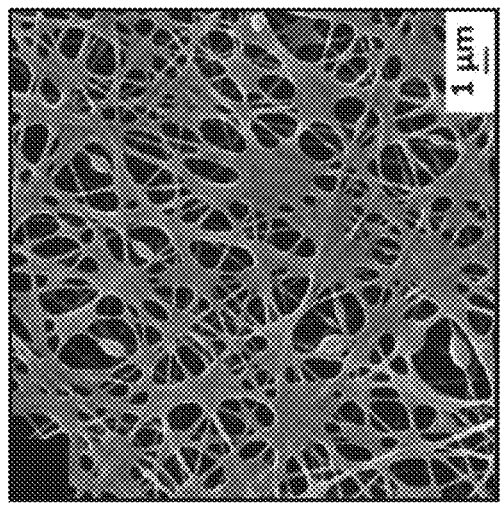

To further understand the unique performance of the SPI/PVA nanofabrics, an interaction-based capturing mechanism is proposed based on examining the chemical characteristics of both the cigarette smoke pollutants and the nanofabrics before and after filtration test. Conventionally, the removal efficiency for particles is mainly dependent on the morphology of the filter mats due to the four primary sized-based filtration mechanisms. Nanofibers compared with micron-size fibers possess larger surface area and higher surface energy which can dramatically improve the interaction with the PM particles and enhance the efficiency. Moreover, as it is mentioned before, SPI possess numerous functional groups which can interact with different types of particles and toxic chemicals in the polluted air. The strong interactions between PVA/SPI nanofabrics and pollutions (see FIG. 17*a*) will enhance the capturing capabilities for both toxic chemicals and solid particles. A simplified schematic illustration of the possible interactions among PVA, SPI molecule, PM particle, and formaldehyde (as examples of different pollutants in the air) is shown in FIG. 17*a*. FIG. 17*b* is the SEM image showing SPI/PVA nanofabrics strongly interacting with pollutions after filtration test. It can be found that the aldehyde groups existing in formaldehyde can interact with both carboxylic and amine groups of the soy protein. This interaction can result in formation of aldimine bonds which is the main reason for the color change of the filter to yellowish after the filtration test (see the insert photos in FIGS. 11*c*-11*d*). Moreover, solid particles and other toxic chemicals with different compositions can undergo various types of interactions including charge-charge interaction, polar-polar, hydrogen bonding and etc. This schematic demonstrates an enhanced mechanism based on strong fiber-pollutants interactions.

Figure 17C:
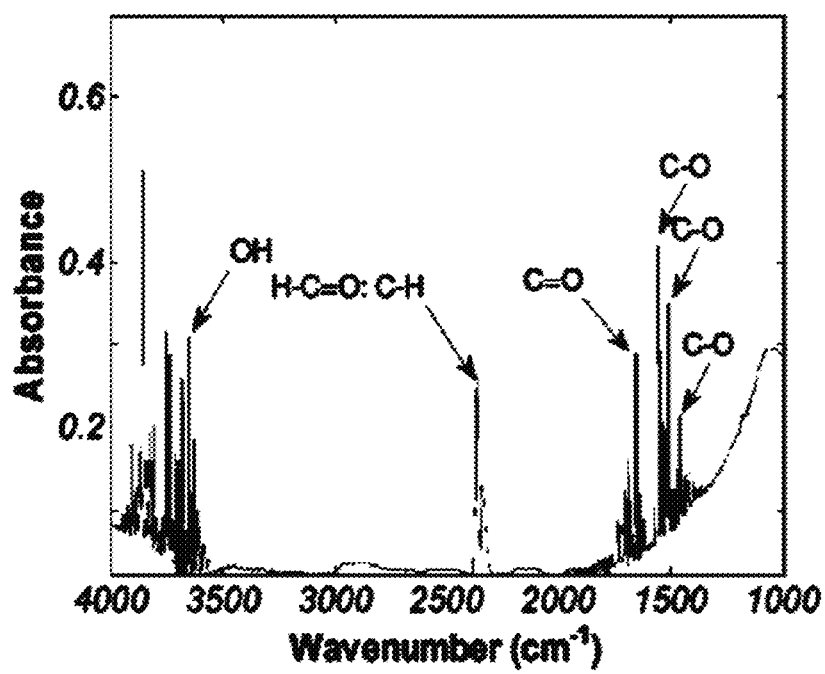
Figure 17D:
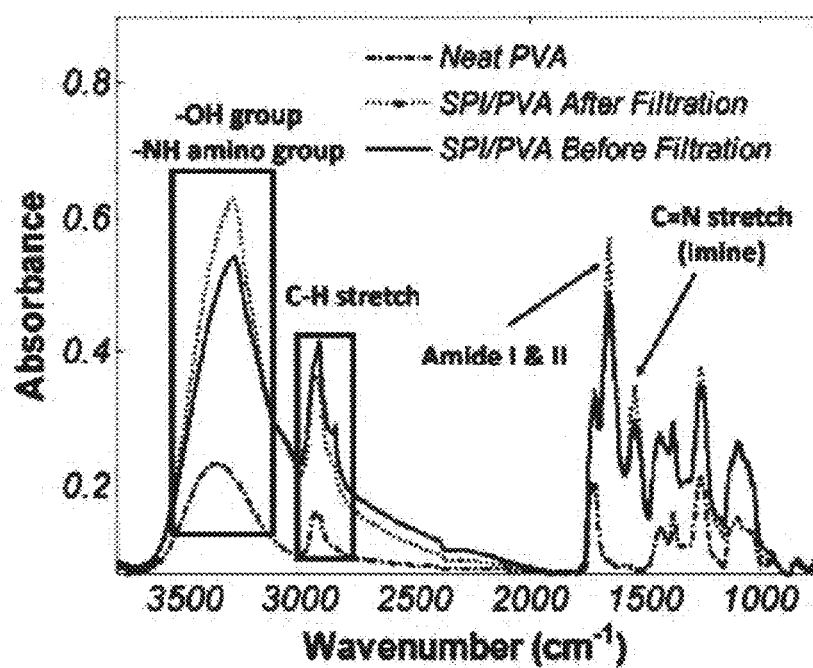
Figure 17E:
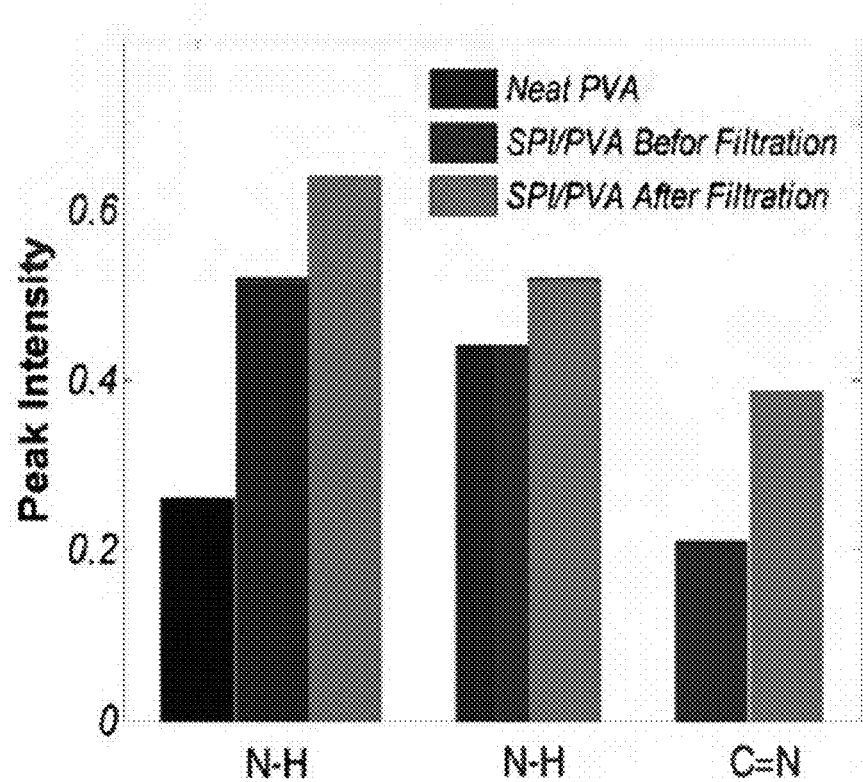

To further characterize the interactions between pollutants and protein-based nanofibers, Fourier transform infrared spectroscopy (FTIR) was employed to investigate the functional groups existing in the polluted-air, clean SPI/PVA nanofabrics, and nanofibers with captured pollutants. The FTIR spectra of the cigarette smoke is shown in FIG. 17*c*. The main peaks are around 3,649, 2,360, 1,653, 1,558, 1,506, and 1,456 cm⁻¹, which indicate the existence of O—H, C—H:H—C═O (formaldehyde), C═O, and C—O (last three peaks) groups, respectively. These groups in polluted-air can strongly interact with the functional groups existing on the surface of nanofibers. By comparison of the FTIR spectra of neat PVA and SPI/PVA nanofibers (see FIG. 17*d*), one can easily identify the SPI in the nanofibers via amide groups. Although there is no new peak generated between SPI/PVA nanofabrics and pollutions, a significant change in the intensity of specific groups/interactions (e.g. O—H, COOH, N—H and C—N functional groups) was observed and the change of peak intensity is summarized in FIG. 17*e*. The reason why no new peak was generated after the filtration testing is possibly that the interactions between pollutants and the SPI/PVA nanofabric are covered by those interactions existing in the protein. As a result, one can only observe an increase in the peak intensity, instead of new peaks, after filtration.

Conclusions

In summary, this study demonstrates a high-performance multi-functional air filtration nanofabric materials produced from protein/polymer composites. The combination of abundant plant protein with porous nanofabrics provides a promising solution to "green" and high-efficient nanomaterials for air filtration applications. The protein-based nanofabric shows high removal efficiency for both types of pollutants: particles with a broad size range and toxic gases with various characteristics, which has never been reported from a single air-fiber material. The soy protein is employed as an example to develop sustainable and environmental friendly nanomaterial for air filtering applications. This study indicates that the amino acids of proteins can significantly enhance the interactions between nanofabrics and pollutions, which is especially critical to capture the particles with size much smaller than the that of the pores and gases molecules. Moreover, the protein-based nanofabrics are able to improve the removal efficiency of air pollutions while decrease the air flow resistance, both of which are the most crucial factors for practical applications. In short, this study indicates that protein-based nanofabric is a promising green nanomaterial with great potential to deal with complicated pollutions in the air due to an enhanced-interaction mechanism.

Additional Information

Additional data and figures for the filter pore size and distribution, digital images of protein-based nanofabrics, filtration performance of the samples prepared by powder-based procedure, SEM images before and after filtration test, particulate and chemical removal efficiencies of filters with different protein loadings are disclosed below and in FIGS. 18-24.

Powder-Based Method for Sample Preparation:

Regarding the powder-based procedure, PVA powder was dissolved in 80% (v/v) aqueous acetic acid at 60° C. for 2 hr under magnetic stirring conditions (400 rpm). After the PVA had been fully dissolved in the solvent, SPI powder was added in various loadings to the PVA solution and subjected to the same magnetic stirring conditions at 85° C. for 24 hr in order to denature SPI in presence of the dissolved PVA. The powder-based procedure samples displayed significantly decreased electrospinability. There was also an issue of the amount of SPI loading permissible in the powder-based samples where above a 1:1 for SPI to PVA ratio, the powder-based procedure failed to produce samples that would survive during the performance testing due to the brittleness of the fiber mat. Considering the disadvantages of power-based method, we finally choose a solution-based or denatured-based method as described in the experimental part of the manuscript.

Example 3: Hybrid of Natural Protein Nanofibers with Cellulose Fibers for High Performance Air Filtration Application 1. Introduction Air pollution has become a major environmental concern due to the huge amount of pollutants produced from vast human activities. It contains numerous combinations of pollutants such as particle matter (PM) of various sizes, chemical mixtures, biological hazards, and etc. Moreover, creation of unexpected chemical compounds due to the photochemical reactions in the polluted air, makes it more and more puzzling to clean the air. These complicated mixtures have posed excessive threats to public health. PM contains small solid particles and liquid droplets with different sizes. Regarding the size, particulate pollutants can be categorized by $PM_{2.5}$ and $PM_{10-2.5}$, indicating particle sizes below 2.5 and between 2.5 and 10 respectively. $PM_{2.5}$ is mainly one of the major pollutants in many developing countries. These particles are commonly composed of organic (e.g. carbon derivatives species such as carbon oxides) and inorganic (e.g. nitrates, sulfates, silicates, etc.) compounds which can seriously influence the air quality, public health, climate change, air visibility and so on. In addition, polluted air includes numerous types of toxic gaseous molecules, such as sulfur oxides ($SO_x$), nitrogen oxides ($NO_x$), carbon oxides (CO and $CO_2$), formaldehyde (HCHO), methane ($CH_4$), and a mixture of other volatile organic compounds (VOCs). These chemicals can undergo various photochemical reactions which may lead to the creation of unexpected hazardous pollutants. Biological hazards including bacteria, viruses, mites, pollen and etc. can trigger many allergic reactions and infectious illnesses such as influenza, measles and chicken pox. Because of the intensive effects of these pollutants on the environment and human health, providing an effective protection, particularly toward improving the indoor air quality, is urgently needed.

Filtration membranes are commonly used to remove the pollutants from the air and improve the quality of the air. Some attempts have been made for enhancing the outdoor personal protection, and improving the indoor air quality. An ideal air filter should have a high removal efficiency of pollutants yet maintaining low resistance to the air flow. Conventional air filters are usually made of micron-size fibers of synthetic plastics such as polyethylene and polypropylene. These air filters are ineffective for removing the toxic gaseous chemicals from the air due to the lack of active functional groups in the structure of the raw materials. These materials are only effective for capturing particulate pollutants based on the four primary physical and size-based filtration mechanisms, including sieving, interception, impaction, and diffusion. In our previous work, we have found that the natural protein-based nanofabrics can provide multifunctional air filtration capabilities with very high affinity to various pollutants. These protein-based nanofabrics showed extremely high removal efficiencies for both solid particles with different sizes and various toxic gaseous chemicals while maintaining a very low resistance to air. These capabilities make it possible to use thin layers of the protein-based nanofabrics on a substrate to develop high efficiency air filtering materials for practical filtration applications.

Cellulose is the most abundant polymer in nature with low price and high biodegradability. It can be derived from a variety of sources, such as woods, annual plants, microbes, and so on. Cellulose is a linear polysaccharide made of β(1→4) D-glucose units that contains many functional groups such as methylol, hydroxyl, and etc. The elementary fibrous structure of cellulose leads to the specific strength and high performance properties, including high mechanical strength as well as flexibility. Cellulose has been studied extensively as wastewater treatment filtration membranes, films, hydrogels and aerogels, and energy harvesting. In addition, natural proteins, such as gelatin and soy protein, are ones of the most abundant biopolymers. It is well-known that proteins are rich in functional groups including numerous amino acids in their chemical structure. They can strongly interact with various pollutants, both solid particles and toxic gaseous chemicals, via numerous types of interactions. Therefore, the functional groups make proteins an ideal material for air filtering applications.

In this work, our goal is to achieve high efficiency and multifunctional "green" air filters. To this end, we prepared a hybrid structure that is made of a thin layer of protein-based nanofibers (either gelatin or soy protein-based material) and porous cellulose fiber mat as the substrate layer. Paper towels are cost effective porous materials made of cellulose fibers. We assumed that cellulose-based paper towels can contribute to the air filtration performance due to the porous network in their fibrous structures. We also hypothesized that paper towel cannot only capture the particulate pollutants via primary physical filtration mechanisms, but also the active functional groups in the structure of cellulose may interact with pollutants including toxic gaseous chemicals in the air. The protein-based nanofiber layer (either pure gelatin (G) or soy protein-based composite (SC)) was deposited on the paper towel substrate. It is noted that the nanofibers have many advantages over the micrometer fibers, such as extremely high surface area and surface energy. These characteristics may significantly increase capability of capturing more pollutant substances from the air. The morphology and filtration performance of the hybrid air filtering materials as well as their component materials were studied. Finally, the mechanisms the hybrid air filtering materials for their high filtration efficiency of simultaneously capturing particulate pollutants and toxic gaseous chemicals were analyzed.

2. Materials and Methods 2.1. Raw Materials and Gelatin Solution Preparation

Three types of cellulose-based paper towels (Scott® PT-T (textured), Scott® PT-P (plain), and Bounty® PT) with different surface morphology/texture were provided. Gelatin powder (type A, from porcine skin, Sigma Aldrich) was purchased. Soy protein isolate (SPI) powder with >90% protein content was supplied from ADM Foods & Wellness, Decatur, Ill. Granules of poly(vinyl alcohol) (PVA; Mn=75000 g/mol) were obtained from Sigma-Aldrich, St. Louis, Mo. Glacial acetic acid (AcOH, purity=99.9%) was purchased from J.T.Baker® (PA, USA). Gelatin solution was prepared in a mixture solvent (AcOH:DI water=80:20, volume ratio) following out previous study to achieve a homogenous yellow solution for electro spinning.

2.2. Preparation of Protein Nanofiber-Coated Paper Towel Filter Mats

Gelatin nanofibers were fabricated via facile electrospinning technique. A mono-inject syringe pump (KDS-100, KD Scientific), a plastic syringe (Monojet™ Kendall) and a 21-gauge blunt tip needle were used to pump of the gelatin solution. An operating voltage of 19-24 kV was applied and controlled using a high voltage power source (ES50P-5W, Gamma High Voltage Research) to draw the nanofibers. Paper towel substrate was fixed on a grounded commercial aluminum mesh with wire diameter of 0.011 inch and mesh pore size of 1 mm×1 mm to collect the nanofibers and coat the paper towel surface. The needle-collector distance was fixed to 15 cm and a controlled feed rate of 0.5 ml/h was utilized. During electrospinning, the horizontal and vertical position of the needle was continuously regulated to deposit a uniform nanofiber mat with controlled diameter and thickness on the paper towel substrate. The SPI/PVA nanofabrics were fabricated following out previous work.

2.3. Polluted Air Sample Generation and Air Filtration Measurements

Tobacco smoke was selected to prepare the polluted air sample for testing. It is well known that tobacco smoke is rich in various PM particles ranging from 10 nm to more than 10 µm, numerous toxic gases and carcinogens (e.g. formaldehyde (HCHO), sulfur dioxide ($SO_2$), carbon monoxide (CO), and many other volatile organic compounds (VOCs)), and several heavy metal ions. This combination of pollutants makes the tobacco smoke an appropriate source of pollution for air filtration performance testing. A plastic vacuum air-bag was utilized to collect the tobacco smoke. Due to the extremely high initial concentration of pollutants, the polluted air sample was diluted to a hazardous level within the analyzer measurable range. PM particles with different sizes (0.3-10 µm) and two toxic chemicals (HCHO and CO) concentration was detected using a particle counter (CEM, DT-9881). Moreover, a portable gas detector (GMI PS500) was utilized to measure the concentrations of $SO_2$ and VOCs of the polluted air sample. Also, the pressure drop (pressure difference between upstream and downstream of the filter) was measured by a differential pressure gauge (EM201-B, UEi) at different air face velocities. In addition, a portable air sampler (MiniVol Air Metrics, Eugene, Oreg., USA) was utilized to test the air filtration properties at different air flow rates. A circular filter sample with diameter of 37 mm was placed in a home-made sample holder to perform air filtration testing for all the measurements. The filtered air was then collected in a clean plastic vacuum air-bag and similar measurements were carried out for the filtered air sample. To replicate the results, the testing process was executed on four composite filter mats prepared independently. One can calculate the removal efficiency (E %) using the following equation (5).

$$E(\%) = \frac{(C_u - C_d)}{C_u} \times 100 \quad (5)$$

where $C_u$ and $C_d$ are the pollutant concentrations in the polluted air sample and in the filtered air sample, respectively.

2.4. Characterizations

Scanning electron microscopy (SEM, FEI SEM Quanta 200F) was used to study the morphology of the different paper towels and gelatin nanofiber-coated PT filter mats. All samples were coated with platinum nanolayer (3 nm in thickness) using Cressington high resolution sputter coater. In order to study the interaction-based filtration mechanisms, Fourier transform infrared spectroscopy (FTIR) transmittance spectra was engaged. The FTIR spectrum of pure $SO_2$ gas sample before and after filtration was utilized to study the toxic chemical filtration mechanism. All the measurement was repeated for 4 times.

3. Results and Discussion 3.1. Filtration Analysis of Paper Towels and Preparation of the Hybrid Filters In order to study the air filtration performance of the hybrid air filters (protein-based nanofiber coated on paper towel substrate), first, the potential of paper towels (PTs), as a bio-based substrate is investigated. To this end, three types of paper towels, i.e. Scott® PT-T (textured surface), Scott® PT-P (plain surface), and Bounty® PT, are selected. Their characteristics, including surface morphology/texture fiber areal density, fiber diameter and thickness as well as their pore structures, are analyzed. The results are shown in FIGS. 25a-25f and in Table 1. The detailed morphology of the selected paper towels was observed using scanning electron microscopy (SEM). From the SEM images of the fibrous structure of different PT mats shown in FIG. 25a-25c, it can be found that all the PTs have the cellulose fiber diameters within the range of 10 to 13 µm. The sizes and size distributions of the fibers for the different PTs are almost similar, their pore sizes and pore size distributions are very different. As it is shown in Table 1, the Bounty PT possesses the smallest pore size of 22 µm. Scott® PT-T has larger pore size of 58 µm and highly textured surface than that of the Scott® PT-P with an average pore size 52 µm. The digital images clearly indicate the differences in the surface texture of the paper towels. In addition, the pore size and distribution of the PTs are characterized via ImageJ software, although the irregular pore morphology made it very challenging to characterize the accurate pore geometry. Among these three paper towel products, Bounty® one possesses the highest areal density, thickness and average fiber diameter but its average pore size is the lowest. Both Scott® paper towels show similar numbers on those characteristics except the thickness values. As paper towels are flexible cellulose-based fibrous mats with high porosity, it is believed that the pore structures of the fiber mats can significantly impact the air filtration properties, in particular it will affect the air flow resistance, or pressure drop of the filter. This is because (1) different pore structure can result in different air flow path ways through the filter, which can affect the pressure drop of the filter mat; (2) the particulate air filtration performance can be highly influenced by the porous structure due to the physical and size-based capturing mechanisms of filtration. Therefore, it is necessary to examine how the pore structures of the paper towels along with their surface textures impact their filtration performance, in order to select the appropriate paper towel as the substrate for making the hybrid air filters with the optimized air filtration performance via combining it with the protein nanofiber coatings. In particular, we need to know which one of the two Scott® paper towel products that have similar pore structures (average size and size distribution) is better for achieving higher performance from the resulting hybrid filter.

Figure 25A:
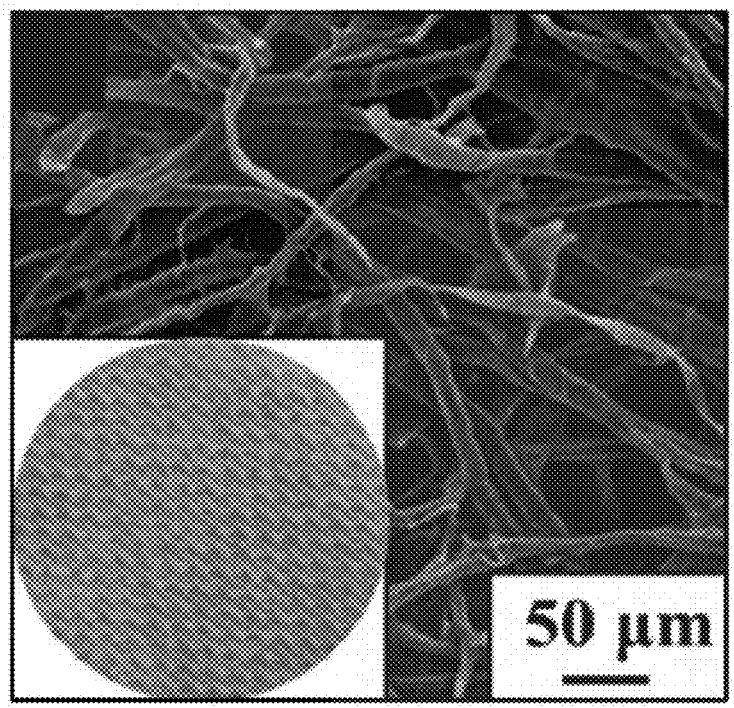
Figure 25B:
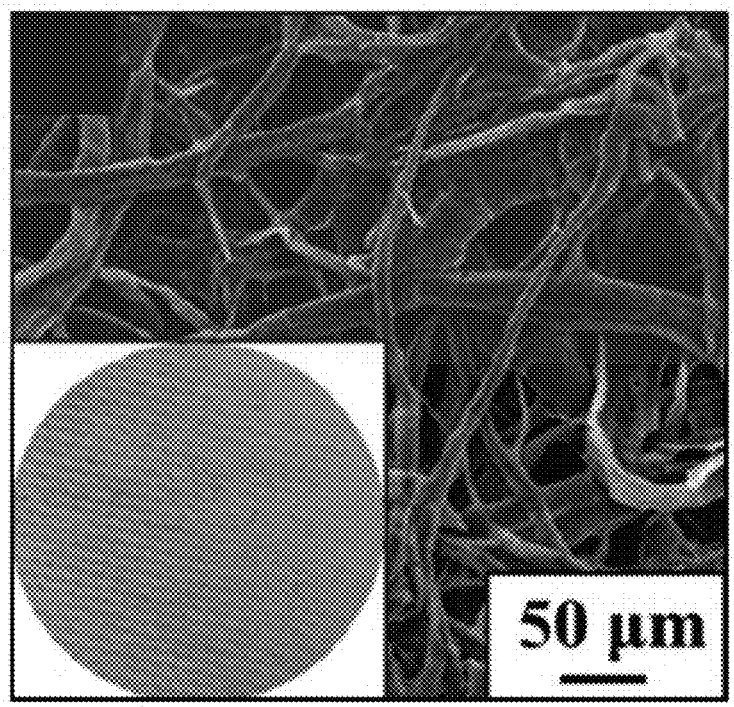
Figure 25C:
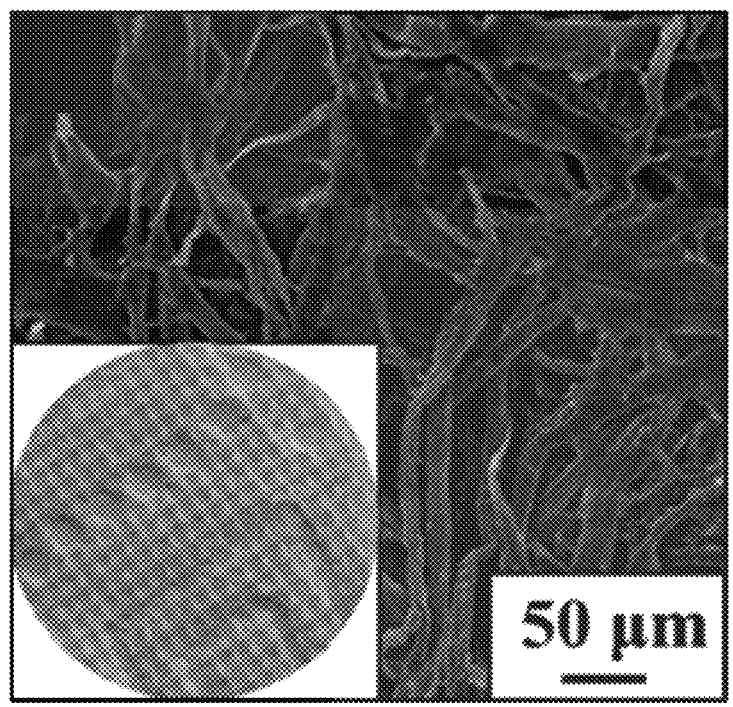
Figure 25D:
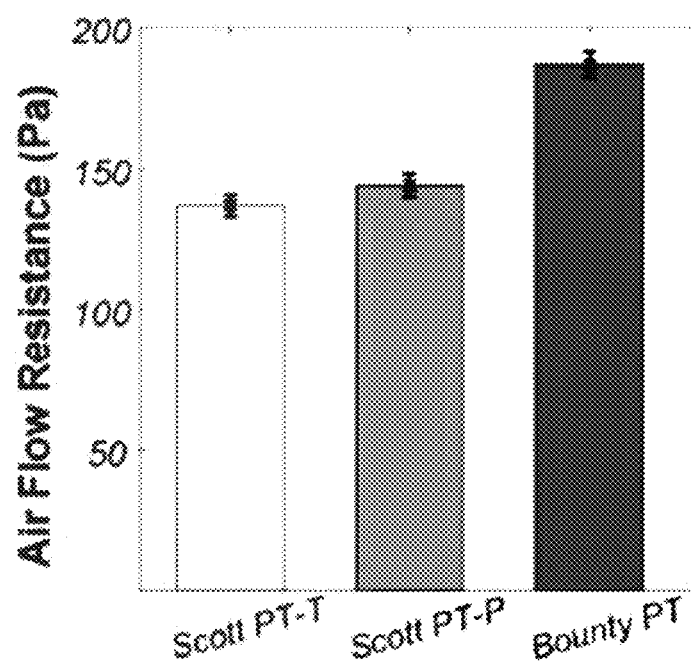
Figure 25E:
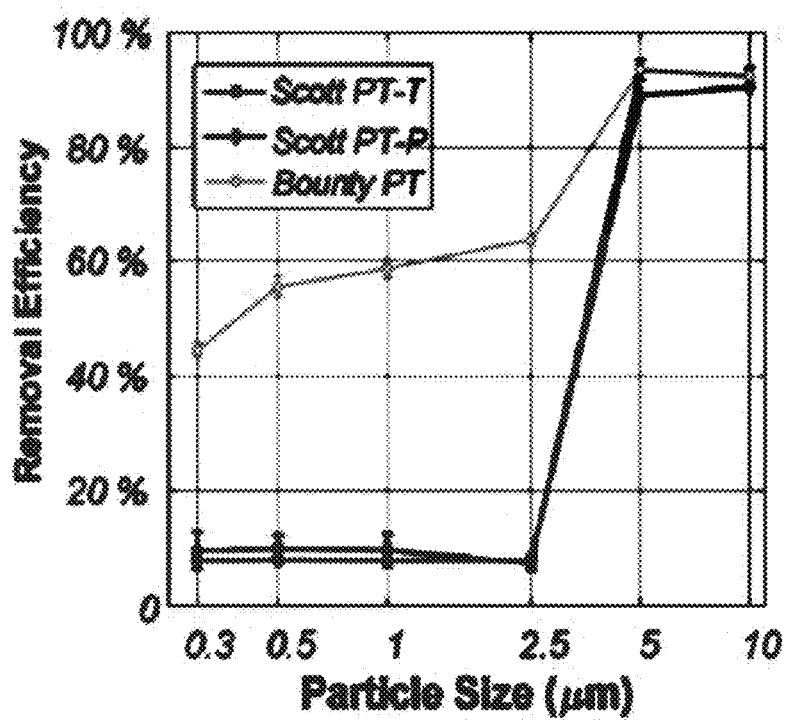
Figure 25F:
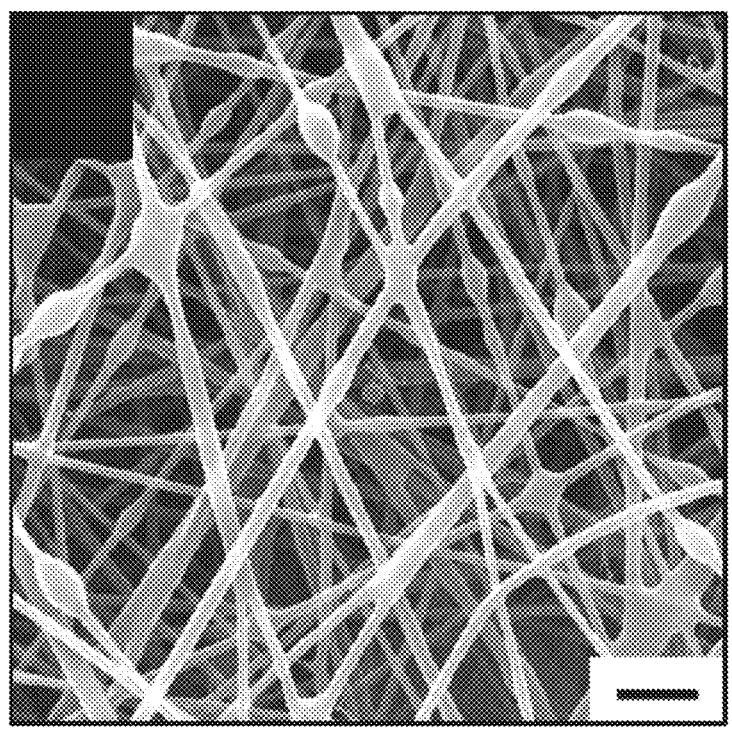

The filtration properties including particulate filtration efficiency ($E_p$ %) and the air flow resistance (known as pressure drop, $\Delta P$) of the three selected paper towels were tested. Pressure drop or the air flow resistance is one of the critical parameters related to the air filtration performance. Thus, we first focused on the pressure drop of the different paper towels, which were tested using standard 4 lit/min air flow rate. According to the US Department of Energy (D.O.E) the accepted pressure drop for a high efficiency particulate air filter is less than 325 Pa at a standard air flow rate. Our testing results are shown in FIG. 25d. It can be seen that the difference between the two different Scott® PTs is small as they have similar fiber morphology and pore structure. In specific, the pressure drop of the Scott PT-T (168 Pa) is slightly lower than that of the Scott PT-P (173 Pa) because of its a little larger pore size, while Bounty® PT has the highest pressure drop (196 Pa), which is not favorable for our selection for the hybrid filter fabrication. The removal efficiency for particulate pollutants with different particle sizes, $PM_{0.3}$ (0.3 μm), $PM_{2.5}$ (smaller than 2.5 μm) and $PM_{10\text{-}2.5}$ (2.5-10 μm), are compared among the different paper towels. From the results shown in FIGS. 25e and 25f, it can be observed that all the three paper towel products have very high $PM_{10\text{-}2.5}$ removal efficiency. In addition, Bounty® PT possesses the highest $PM_{0.3}$ removal efficiency (44.42%) and $PM_{2.5}$ (55.60%), compared with that of the two Scott® PTs, both of which possess the removal efficiency of ca. 9% for both $PM_{0.3}$ and $PM_{2.5}$. It is known that the particulate filtration performance of a filter is governed by four physical and size-based mechanisms. Bounty® PT has the smallest pore size and highest areal density. This means the Bounty PT include multiple fiber layers resulting larger thickness than the Scott® paper towels because all of them have similar fiber diameter. This is why Bounty® PT possesses higher particulate removal efficiency than Scott® PT.

It is noted that although the Bounty® PT possesses the highest particulate removal efficiency for all the particle sizes, it also shows the highest pressure drop value. Therefore, by considering the pressure drop values and filtration efficiency of the three paper towels, Scott PT-T was selected as the substrate (low pressure drop and high removal efficiency for big particles, i.e. good $PM_{10\text{-}2.5}$ performance) for further studies.

TABLE 1

Physical properties of different paper towels

| Properties | Samples | | |
|---|---|---|---|
| | Scott® PT-T | Scott® PT-P | Bounty® PT |
| Thickness (μm) | 108 | 81 | 183 |
| Fiber Areal Density (g/m²) | 53 | 50 | 68 |
| Avg. Fiber Diameter (μm) | 10.4 | 11.67 | 12.79 |
| Avg. Pore Size (μm) | 58 | 52 | 22 |
| Surface Texture | Textured | Plain | Highly Textured |

As paper towels are only effective for removal of particles with sizes larger than ca. 2.5 μm, but ineffective to capture small particles from the air, we combined paper towel with the nanofibers made of proteins that have been proved to possess high filtration performance for small particles and chemicals previously. In specific, a thin layer of protein nanofibers, gelatin (G) or soy protein-based composite (SC), was coated on the paper towel substrate. As it is shown in FIG. 26, the cellulosed-based paper towel made of micron size cellulose fibers can provide mechanical support and filtration capabilities for larger particles as indicated above. The protein nanofibers were fabricated on the cellulose-based paper towel substrate via facile electrospinning technique. The nanoscale protein fibers have a very high surface area and surface energy for removal of more pollutants from the air. More importantly, the functional groups existing in the structure of the cellulose and natural proteins can enhance the filtration capabilities for more types of pollutants. The digital photos shown in FIG. 26 indicate that the nanofiber layer can be peeled off and the protein nanofiber-coated PT filters are foldable. To study the effects of the protein nanofibers on the filtration properties, different filter samples that are made of protein based nanofibers, including soy protein-based and gelatin nanofibers were fabricated on the Scott® PT-T substrate. It is known that soy protein material is brittle. In order to easily make the soy protein nanofibers via electrospinning method, poly(vinyl alcohol) (PVA) was mixed with denatured soy protein isolate (SPI) to form the soy protein composite for making the nanofibers. The detailed information of all the filter samples are summarized in Table 2.

TABLE 2

Detailed properties of the single layer and Hybrid filter mat samples

| | Sample name | | Material | Thickness (μm) | Areal density (g/m²) | Avg. fiber diameter (nm) | Avg. pore size (μm) |
|---|---|---|---|---|---|---|---|
| Single material filters | PT | Cellulose fibers | Paper towel: (Scott® PT-T) | 108 | 53 | $1.04 \times 10^4$ | 58 |
| | G | Protein nanofibers | Pure gelatin | 11.33 | 2.25 | 70 | 4.4 |
| | SC | Soy protein composite nanofibers | [a]Soy-comp | 11.87 | 2.28 | 136 | 4.2 |
| Hybrid material Filters | (information on PT for below samples is shown in above PT) | | | | | Nanofiber layer | |
| | [b]SC/PT | Soy protein-based | SPI comp nanofibers/ Paper towel | 12.34 | 2.43 | 143 | 4.3 |
| | [b]G/PT | Gelatin-based | Gelatin nanofibers/ Paper towel | 10.85 | 2.24 | 87 | 4.1 |

TABLE 2-continued

Detailed properties of the single layer and Hybrid filter mat samples

| Sample name | Material | Thickness (μm) | Areal density (g/m$^2$) | Avg. fiber diameter (nm) | Avg. pore size (μm) |
|---|---|---|---|---|---|
| [b]PT/G | Paper towel/Gelatin nanofibers | 11.12 | 2.18 | 91 | 4.3 |
| [b]G/PT/G | Gelatin nanofibers/ Paper towel/ Gelatin nanofibers | 2 × 6 | 2 × 1.1 | 84 | 4.4//74.1 |

[a]Soy protein isolate (SPI) and poly(vinyl alcohol) (PVA) with 1:1 ratio.
[b]Air flow side.

3.2. Hybrid Filters: Gelatin Nanofiber-Coated Paper Towel 3.2.1. Morphology of Gelatin Nanofiber-Coated Paper Towel Filters The morphological characteristics of pure gelatin nanofibers and gelatin nanofiber-coated paper towel were studied first. The areal density for the pure gelatin nanofiber sample and the gelatin nanofiber layer in the hybrid materials is similar: ca. 2 g/m$^2$. FIGS. 27a and c show the SEM images of back surface and front surface of pure gelatin nanofibers before filtration testing, respectively. It can be seen that the ultrafine gelatin nanofibers (70 nm) possess uniform fiber distribution on both sides. Additionally, FIGS. 27e and 27g present the back sand front surface of the gelatin/paper towel (named as G/PT) before the air filtration testing, respectively. From the SEM images, it can be observed that gelatin nanofibers with the average fiber diameter of 87 nm are uniformly coated on the micrometer size PT fibers (11 μm). It is known that a porous structure is one of the important parameters affecting the air filtration performance of the filter. The pore size of the PT samples, pure gelatin nanofiber mats and the hybrid sample G/PT were summarized in Table 2. FIGS. 27b and 27d show the morphology of the back and front surface of the pure gelatin nanofibers after filtration testing, respectively. From the SEM images for the front side of the nanofibers it can be seen that lots of pollutants were captured as the polluted air passes through the filter; however, the back surface of the nanofibers remains clean. This result can be explained as that the polluted air encounters with nanofibers once and the front nanofiber layer remove the pollutants from the air, thus causes the inner nanofibers to have less chance to encounter with the pollutants, i.e. less opportunity of removal action of the pollutants from the air. FIGS. 27f and 27h show the back and front surface of the hybrid G/PT filter sample after being subjected to the air filtration testing, respectively. The SEM images illustrate that the G/PT fibers were able to capture huge number of particles after exposing to the same polluted air for the same period of time. More significantly, it is found that the back surface of the nanofibers that were coated on the paper towel substrate also contributed to the removal of pollutants. It is believe that the paper towel substrate causes a circulatory air flow between the protein nanofiber layer and the micron-sized cellulose fibers that increase the chances of the pollutants to encounter with nanofibers, and then the pollutants were captured. This can be confirmed by the filtration results shown in FIGS. 28a-28d. This phenomenon is significant and can promote the air filtration performance. The digital photos inserted in FIGS. 27g and 27h show obvious color change from a milky color for fresh air filter (before filtration) to a yellow/brown color (after filtration). This color change indicates that the nanofibers captured various pollutants from the air including both solid particles and gaseous chemicals.

3.2.2 Air Filtration Performance

Filtration of Particulate Pollutants.

In this section, we first investigated the effects of nanofiber configuration on the particulate filtration properties of the composite filter mats. In order to study the effect of nanofiber configuration on the filtration performance, three types of samples were prepared. One is that, the gelatin nanofibers were fabricated in the front side of the PT substrate (labeled as G/PT); for another sample, the nanofibers are fabricated on the back side of the PT (labeled as PT/G). The third one is that the gelatin nanofiber layer are on both sides of the PT layer (labeled as G/PT/G). The testing side (air flow goes from) for each sample is indicated under Table 2. To compare the performance, all these samples were prepared with the same nanofiber areal density (ca. 2 g/m$^2$). Then the results were also compared with that of the PT and neat gelatin nanofibers (2 g/m$^2$).

Figures 28A, 28B:
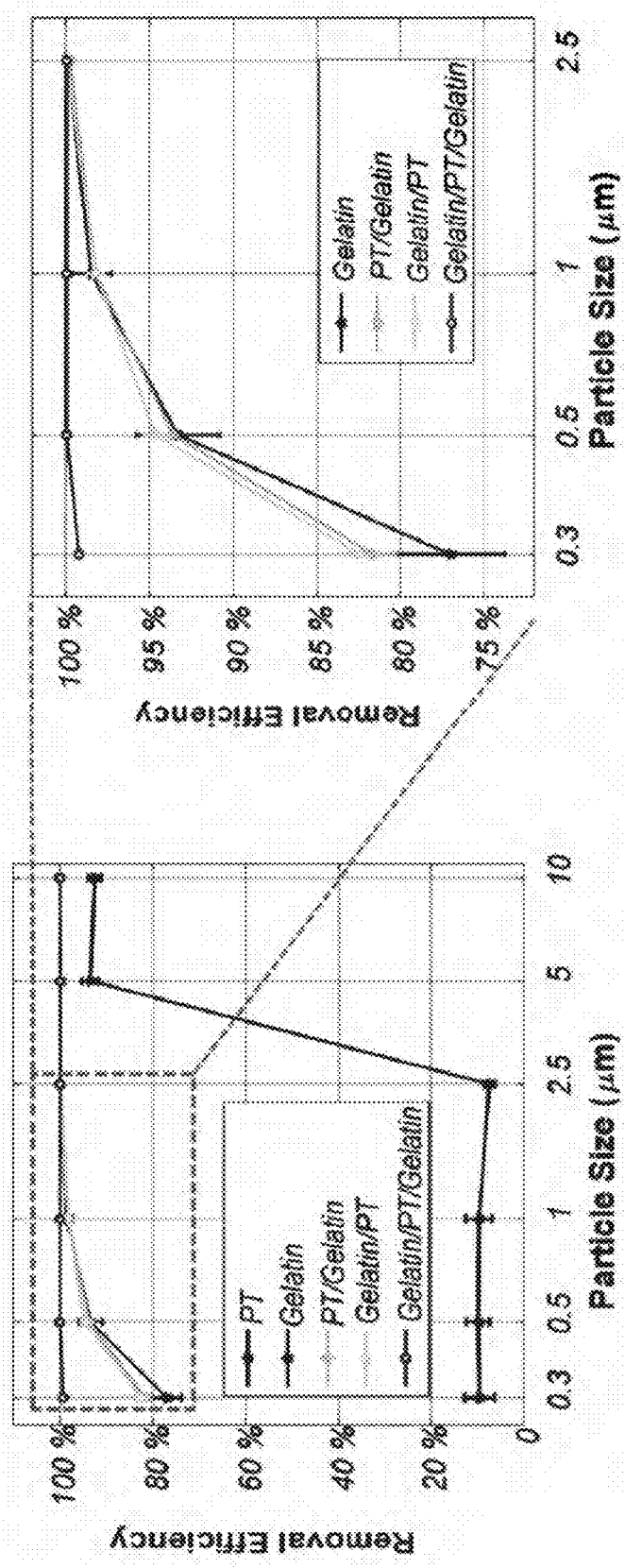
Figure 28D:
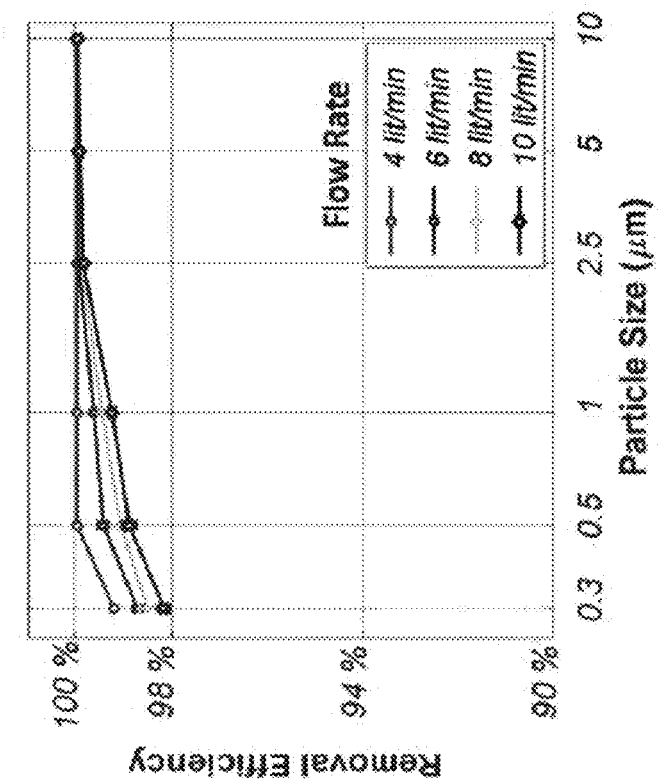
Figure 28C:
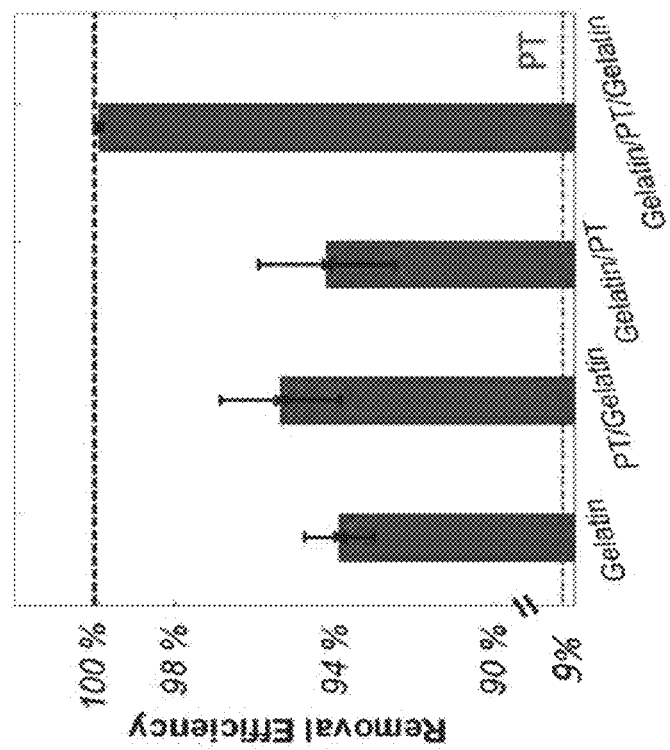

In FIG. 28a, the removal efficiency for solid particles with different sizes is compared among all the samples. For particles with sizes larger than ca. 0.5 μm, the removal efficiency does not change significantly among the hybrid samples and neat gelatin, and lies in the range of 98.80-99.98%, but much higher than PT sample (ca. 93%). However, for particles with sizes smaller than 0.5 μm, in particular PM$_{0.3}$, shown in FIG. 28b, the hybrid samples possess much higher removal efficiency (ca. 82.0%) compared with that of the neat gelatin (76.0%). In addition, PT shows much lower removal efficiencies (ca. 9%) especially for the particles with sizes less than 5 μm. These results can be explained in that, first, removal of smaller particles is more efficiently governed by the interaction-based mechanism between the pollutants and the nanofibers; secondly, nanofibers provide much higher surface area and surface energy which can increase the probability of pollutant-fiber encountering; thirdly, the circulatory air flow between nanofibers and paper towel substrate, which mentioned above, can drastically enhance the possibility of the pollutants to encounter with the nanofibers, as shown in the SEM images of FIGS. 27a-27h. Furthermore, the G/PT/G sample showed the highest removal efficiency of 99.30% for PM$_{0.3}$ particles and more than 99.98% for larger particles. Therefore, enhancement in the filtration efficiency can be realized by sandwiching the micron fibers of paper towel between two layers of nanofibers to form a hybrid layered filters. The reason is believed to be that the sandwich structure creates more circulatory air flow between nanofibers and micron fibers. The effects of nanofiber configuration on the removal efficiency for PM$_{2.5}$ are compared in FIG. 28c. It is found that the removal efficiency of PM$_{2.5}$ was dramatically increased from 9.12% (for PT) to ca. 96.0% (for G/PT) by introducing the gelatin nanofibers on one side of the PT substrate. Furthermore, the G/PT/G sample possesses the highest $PM_{2.5}$ removal efficiency of 99.91% compared with all the other samples including the neat gelatin filter (ca. 93.10%). These results indicate that, introducing protein nanofibers on the PT substrate can significantly improve the efficiency for filtration of small particulate pollutants for paper towel, fibrous structure of paper towel, as a substrate, can enhance the performance of the nanofilter mats for filtration of big particles.

In addition, the effect of air flow rate on the particulate air filtration properties of the three-layer hybrid sample G/PT/G that has the highest removal efficiencies was studied. The results shown in FIG. 28d indicate that for particles with sizes larger than 2.5 μm, the removal efficiency has no visible change with the air flow rate. For smaller particles with size less than 2.5 μm, the removal efficiency is slightly affected by the air flow rate. In specific, the $PM_{0.3}$ removal efficiency was slightly decreased from 99.30% to 98.26% with the increased flow rate. Therefore, the removal efficiency of the hybrid filter sample was very stable for different air flow situation, which is very positive for use as high efficiency air filters.

Removal Capability for Various Toxic Chemicals.

In addition to a high particulate filtration performance, filtration efficiency for multiple types of toxic chemicals was also studied. Four types of toxic gases with different molecular structure, such as formaldehyde (HCHO), carbon monoxide (CO), sulfur dioxide ($SO_2$), and volatile organic compounds (VOCs), were chosen to test the toxic chemical removal efficiency for the samples. These chemicals are carcinogens and very toxic gases that are present at the hazardous level in cigarette smoke. Table 3 summarizes the toxic chemical removal efficiency of PT, neat gelatin nanofibers, and the hybrid filter samples for these gases. For the HCHO removal performance, the overall range is between 13.0% and 82.58%. In specific, compared with PT sample that has a much lower removal efficiency (13.32%), the gelatin nanofiber-coated PT hybrid samples present much higher filtration efficiency (ca. 77.0% for both G/T and PT/G, and 83.70% for G/PT/G). In addition, the HCHO removal efficiency of all the three hybrid samples is higher than that of the neat gelatin nanofiber filters (ca. 65%). These results indicate that the combination of the gelatin nanofibers and PT substrate can dramatically increase the HCHO removal capability compared with each of their individual component materials separately. Similarly for the CO filtration performance, the removal efficiency of all the hybrid samples lies in a range of 69.0% to 81.0%, while the PT sample shows a removal efficiency of 20.7%, which is lower than that of pure gelatin filter (62.3%) and much lower than that of the hybrid samples. It is noted that the hybrid samples possess slightly lower CO removal efficiency as compared with that of HCHO. This phenomenon can be explained in that, first, HCHO has an active aldehyde group that may interact with the functional groups existing in the structure of gelatin via strong chemical bonding and result in high HCHO removal efficiency; second, CO is a polar molecule which can interact with the gelatin molecules via a secondary interaction type (e.g. polar-polar interaction); besides, being a small molecule enables it to penetrate through the filter mat easier.

Similarly, the hybrid samples show excellent $SO_2$ removal efficiency (77.85 to 81.77%), which is much higher than that of the PT (ca. 11.40%) and neat gelatin nanofibers (ca. 63.38%). In particular, the three-layer hybrid sample that has nanofibers on both sides on the PT layer shows the highest $SO_2$ removal efficiency (81.77%). Regarding the VOCs, the PT sample possesses much lower filtration efficiency than that of the neat gelatin and all the hybrid filters (79.14% to 83.70%). As a comparison, the chemical removal efficiency of commercial HEPA filters for HCHO and CO is less than 5% and 3, respectively, which means the commercial filters are incapable of removing toxic chemicals from the air, despite of possessing much higher material areal density (ca. 164 $g/m^2$) than our protein-based nanofiber mats coated on paper towel (with areal density ca. 2 $g/m^2$). We believe that the toxic chemical removal is governed by interaction-based mechanisms. These mechanisms are contributed by the functional groups existing in the molecular structures of gelatin and cellulose, since the gaseous pollutants are very small molecules and cannot be removed via the primary physical mechanisms that are very effective for filtration of the particulate pollutants.

Additionally, the effect of air flow rate on the toxic chemical removal efficiency of the sandwich hybrid sample (G/PT/G) was also investigated. From the results of FIG. 29, it can be observed that the chemical removal efficiency vs. the testing flow rate range from 4 to 10 lit/min for all the toxic gases were very stable. These results, in addition to the particulate filtration performance, indicate that the hybrid filtering materials can be promising for development of the high performance "green" multifunctional air filters to be utilized in various air filtration applications.

TABLE 3

Toxic chemical removal efficiency of air filter samples for various toxic chemicals

| Sample | $E_{HCHO}$ (%) | $E_{CO}$ (%) | $E_{SO2}$ (%) | $E_{VOCs}$ (%) |
|---|---|---|---|---|
| PT | 13.30 ± 3.24 | 20.70 ± 2.48 | 11.40 ± 2.20 | 27.55 ± 1.50 |
| Gelatin | 65.00 ± 1.24 | 62.34 ± 1.38 | 63.38 ± 1.12 | 79.14 ± 1.20 |
| Gelatin/PT | 77.37 ± 0.98 | 69.32 ± 1.10 | 79.85 ± 0.80 | 82.82 ± 1.30 |
| PT/Gelatin | 76.92 ± 1.40 | 69.26 ± 0.75 | 77.94 ± 0.52 | 80.68 ± 0.33 |
| Gelatin/PT/Gelatin | 83.70 ± 1.10 | 80.22 ± 1.40 | 81.77 ± 0.46 | 83.70 ± 0.55 |

Air Flow Resistance/Air Pressure Drop.

In addition to the particulate and toxic chemical capturing capabilities, air flow resistance, or pressure drop, is another important factor for air filters regarding the air filtration performance. The high filtration efficiency filters, in particular HEPA grade filters, must possess a pressure drop of less than ca. 325 Pa at a standard air face velocity. FIG. 30a shows the air flow resistance values for the hybrid samples in comparison with that of the PT and neat gelatin nanofiber mats. It is found that the hybrid samples possess slightly higher resistance to flow than the PT and neat gelatin nanofiber mats. This result is reasonable since by combining the gelatin nanofibers and PT fibers, air must penetrate through more layers of fibers, which leads to increased pressure drop to some extent. Moreover, it is found that the configuration of the nanofibers plays an important role in changing the pressure drop of the filter. As it can be seen that the sample with nanofibers in the front of PT substrate (G/PT) have a pressure drop of ca. 147 Pa compared with that of the sample with opposite nanofiber configuration (ca. 142 Pa). This is due to that the pore structure of the mat affects the pressure drop of the filter. In this study, the nanofiber mats have smaller pore size (ca. 4.2 μm for gelatin nanofibers) than that of the micrometer size fiber mats (ca. 58 μm for PT). Thereby, when the gelatin nanofibers is coated in the front side of the PT, the air stream has to penetrate through the smaller pores of nanofibers first, while for the opposite nanofiber configuration, air stream can easily breach through the large pores of PT. This flow sequence can result in a change in the air flow pathways through the entire filter which can lead to the change in pressure drop.

Furthermore, the effect of air flow rate on the pressure drop for the G/PT/G filter mat was tested and the results are shown in FIG. 30b. It is found that the pressure drop normally increases from 168 Pa to 195 Pa as the air flow rate rises from 4 lit/min to 10 lit/min. This result is owing to the multi-layers of pore and fiber structures in the sandwich hybrid filter, which can cause the change in the air stream pathways when it passes through the multiple layers of nanometer and micrometer size fibers. Although the pressure drop of the hybrid filter slightly increased with the air flow rate, the value (200 Pa) is still well below the DoE standard requirement of the high efficiency air filters (325 Pa). By taking the filtration performance, such as for particulate matter (FIGS. 28a-28d), toxic chemical removal efficiencies (FIG. 29), and the pressure drop values (FIGS. 30a and 30b) into account, it can be concluded that, coating paper towel substrate with (a) thin layer(s) of protein nanofibers can provide high efficiency and multifunctional "green" air filtering materials which have great potential to be utilized in various air filtration applications.

3.3. Hybrid Filters: Soy Protein Composite Nanofiber-Coated Paper Towel

Our previous work demonstrated that the soy protein composite nanofabrics possess extremely high removal efficiencies for both particulate and toxic chemical pollutants. We reported a $PM_{2.5}$ removal efficiency is more than 99.50% and toxic chemical capturing efficiency is more than 70% for the soy composite nanofiber filters with SPI to PVA ratio as 1:1 and has 4.50 g/m² areal density. Therefore, a thin layer of such composite nanofibers prepared under the same electrospinning conditions were coated onto the paper towel substrate (procedures as shown FIG. 26) and the air filtration properties of this novel hybrid filter were investigated.

Morphology of the SC/PT Filter.

First, the morphology of the SC/PT hybrid filter mat with nanofiber areal density of ca. 2 g/m² was studied using SEM technique. FIG. 31a shows the SEM image of SC/PT fibers before filtration testing. It can be observed that the soy protein composite nanofibers are uniformly deposited on the PT substrate. These nanofibers possess an average fiber diameter of ca. 143 nm and very uniform fiber diameter and pore size distribution. FIG. 31b shows the SC/PT filter after the filtration testing using cigarette smoke as the polluted air. It can be seen that the nanofibers captured large amount of pollutants from the air, as the nanofibers possess very high surface area and surface energy, which enables the SC/PT hybrid filter to remove more pollutants. Additionally, the hybrid SC/PT filter sample also showed obvious color change from white (before filtration) to a yellowish color (after filtration), which is similar to the change of the hybrid gelatin/PT filter samples. This color change, along with the air filtration results shown in FIGS. 32a and 32b, indicates that the nanofibers captured various pollutants including both solid particles and gaseous chemicals from the air.

Particulate and Chemical Filtration Performance.

In order to find out the effect of SC nanofiber layer on the filtration properties, the particulate and chemical removal efficiency of the hybrid filter were studied. The removal efficiency of PT, pure SC nanofibers, and SC/PT hybrid filter for solid particulate pollutants with different sizes are compared in FIG. 32a. The removal efficiency for the large particles (larger than 0.5 μm) of the hybrid SC/PT sample is slightly higher than that of pure SC nanofibers, and lies in the range of 99.60-99.82%, but it is much higher than that of the PT sample (ca. 93%). For smaller particles, this hybrid sample presented higher removal efficiency (ca. 88.90%) compared with that of the soy protein composite nanofibers (84.58%) and PT (ca. 9%), in particular for $PM_{0.3}$. It is believed that these results is because of the creation of circulatory air flow between the nanofibers and paper towel substrate, which can significantly increase the time and chance for the nanofibers to encounter with the pollutants and remove them from the air.

Furthermore, the removal capability of the SC/PT hybrid filter for four different toxic gaseous chemicals including HCHO, CO, $SO_2$, and VOCs, was studied. In FIG. 32b, the removal efficiency of the SC/PT hybrid filter for these chemicals is compared with that of the PT and pure SC nanofiber mat. For the HCHO removal capability, the three samples have an efficiency range from 13.0% to 56%. The SC/PT hybrid sample possesses the highest filtration efficiency (ca. 55.32%) compared with that of the PT (ca. 13.32%) and pure SC nanofabrics (ca. 46.12%). In addition, for CO removal capability, the SC/PT hybrid sample presents a removal efficiency as high as 85.33%, which is higher than that of the pure SC nanofabrics (ca. 78.34%) and much higher than that of the PT (ca. 20.7%). Similarly, the SC/PT hybrid sample shows the highest $SO_2$ (ca. 62.13%) and VOC (ca. 79.75%) removal efficiency among all three samples. These values are much higher than that of the pure SC nanofabrics (ca. 55.38% and ca. 77.14% for $SO_2$ and VOC, respectively) and the PT (ca. 11.4% and 27.55% for $SO_2$ and VOC, respectively). These results, along with the particulate removal performance of the SC/PT hybrid filter mat, indicate that the combination of soy protein-based nanofibers and paper towel substrate can lead to excellent filtration performance of for the hybrid filter compared with the filters made of each component individually.

3.4. Toxic Chemical Filtration Mechanisms

Figure 33A:
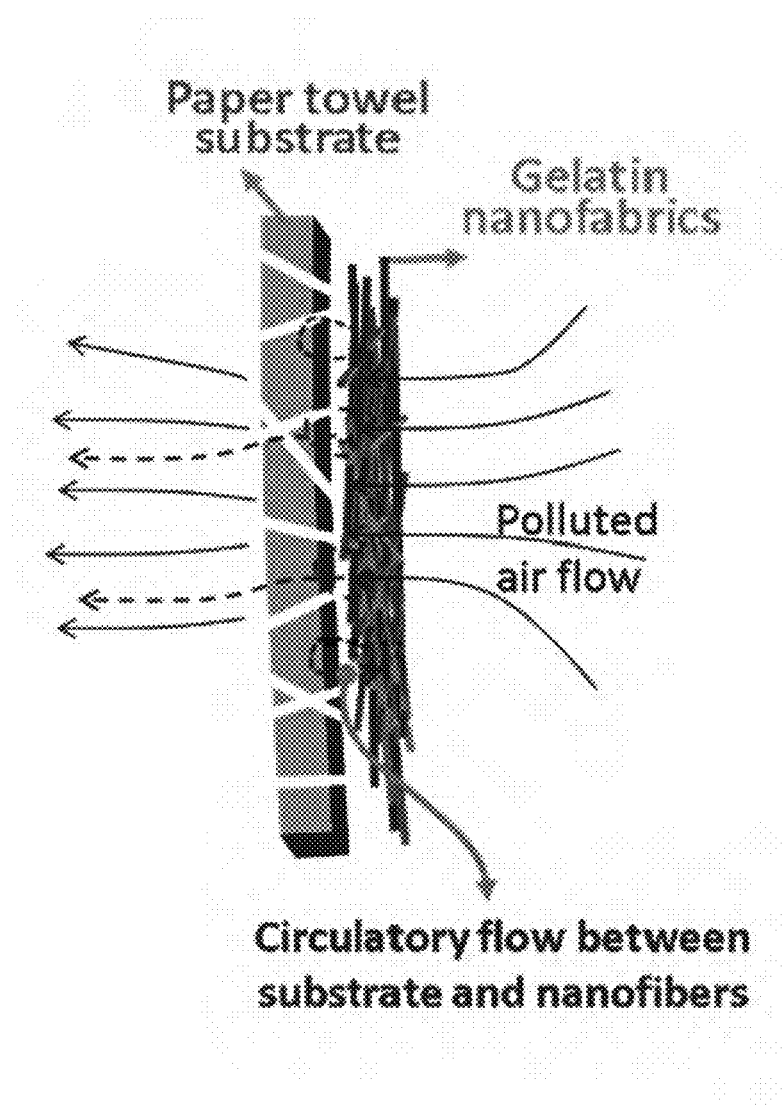
Figure 33B:
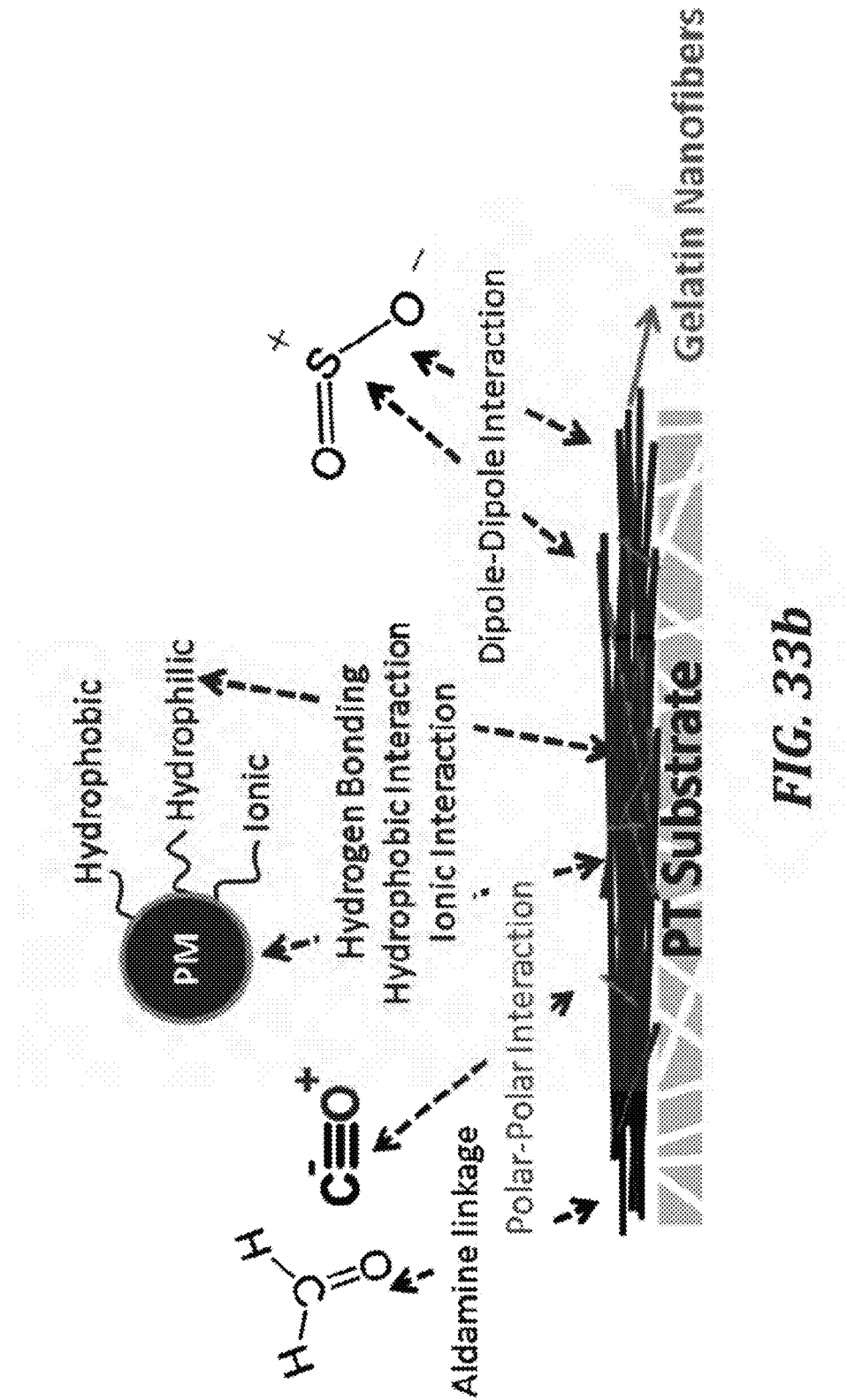

In order to understand the outstanding filtration performance of the protein nanofiber-coated PT materials, an interaction-based filtration mechanism, in addition to the primary physical capturing mechanisms, is proposed. This mechanism is projected based on the chemical characteristics of the filtering materials (proteins and cellulose) as well as that of pollutants. Typically, the conventional filter fibers capture the particulate pollutants only via the primary physical filtration mechanisms (size effects), which are governed by the fiber mat porous morphology. Therefore, the combination of protein-based nanofibers and micron cellulose fibers leads to a special porous structure with extremely higher surface area/energy and huge amount of functional groups that can dramatically enhance the fiber-pollutant interactions. Furthermore, the paper towel substrate can change the air flow pathways and create a circulatory flow between the protein-based nanofibers and cellulose micron-fiber in paper towel as shown in FIG. 33a. This phenomenon can increase the possibility and chances for the pollutants to encounter with the nanofibers and, as a result, to significantly increase in the removal efficiency. Moreover, the biomaterials, e.g. cellulose and natural protein, include various functional groups such as methylol, hydroxyl, glycine, proline, hydroxyproline, glutamic acid, lysine, and etc. in their structures. These functional groups offer many sites for strong interactions between the fibers and various pollutants, which enable the hybrid samples, protein nanofiber-coated PT filters, to achieve very high filtration efficiencies for both particulate and toxic gaseous chemicals. FIG. 33b shows the schematic interactions between the filtering materials and various pollutants such as PM particles, $SO_2$, HCHO and CO. The PM particles with different surface chemistries can undergo various types of interactions such as hydrogen bonding, ionic interactions, hydrophobic-hydrophobic interactions and etc. These interactions are more effective than the size effect mechanisms via the porous structures and can dramatically enhance the filtration performance of the filter. More significantly, gaseous pollutants, such as $SO_2$ and CO, can undergo dipole-dipole interactions with the protein nanofibers due to the uneven distribution of charges (electronegativity difference) on their molecules. Also, functional sites in the structures of chemicals, such as HCHO, can interact with the amine and carboxyl groups of the protein and/or cellulose which may lead to chemical absorptions and formation of new bonds (e.g. aldamine linkage). This phenomenon may be one of the reasons behind the color change of the filter from white to yellowish shown in FIG. 27h) after the filtration testing. This schematic figure illustrates that the fiber-pollutant interaction is important in understanding the filtration mechanism of the multifunctional air filters.

Figure 33C:
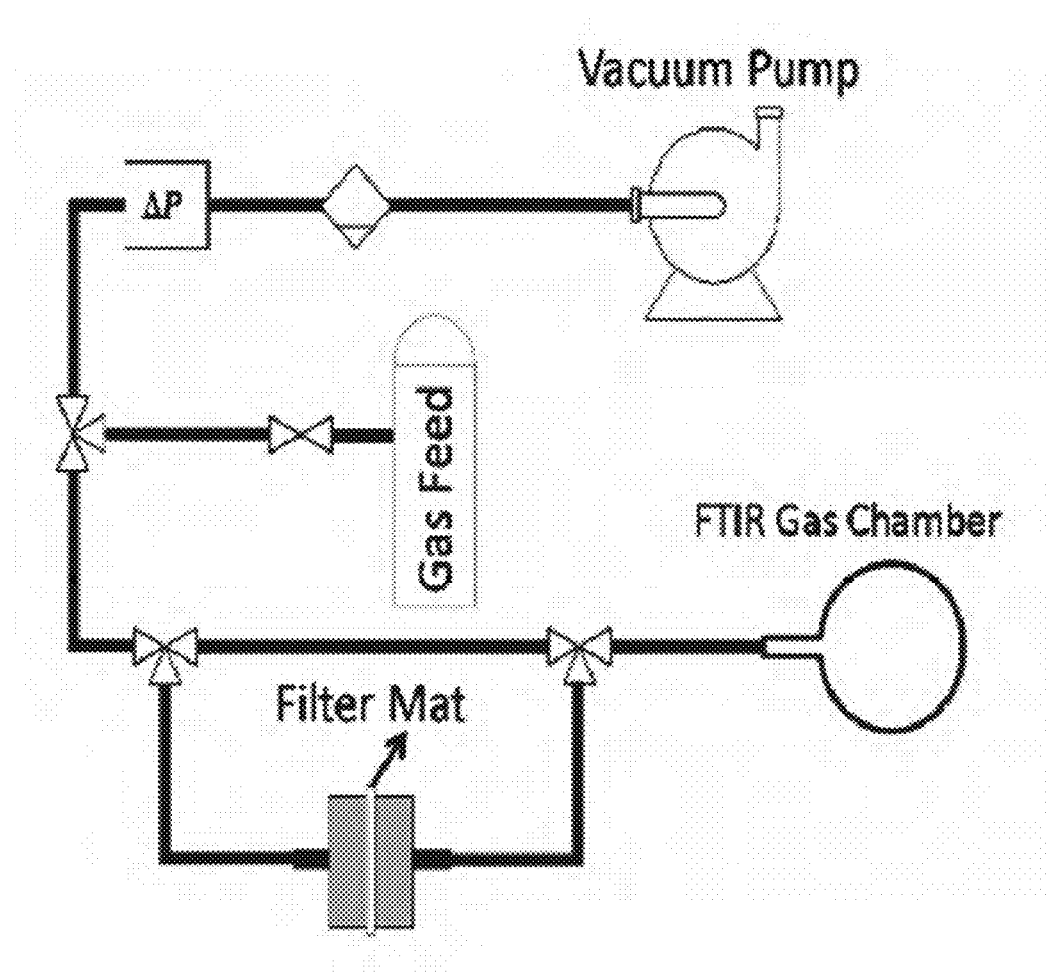
Figure 33D:
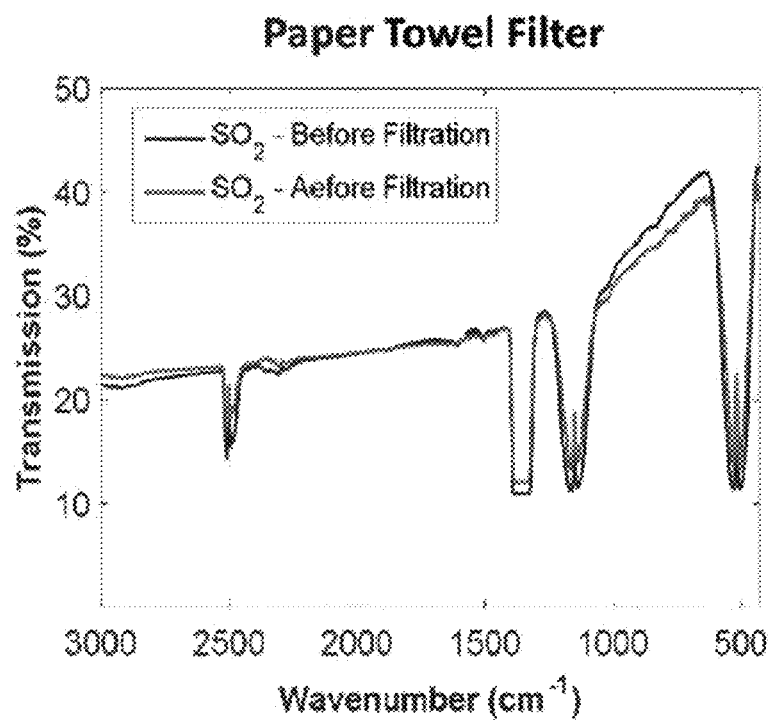
Figure 33E:
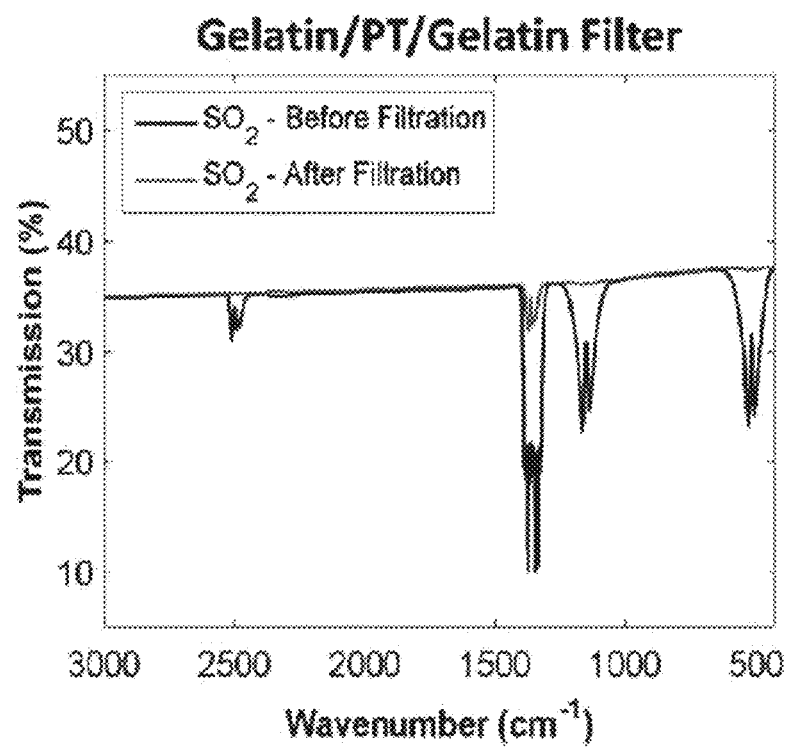

To prove the new interaction-based filtration mechanism, Fourier transform infrared spectroscopy (FTIR) was employed to examine the change of pure $SO_2$ gas before and after filtration. FIG. 33c shows a schematic illustration of the testing apparatus for pure $SO_2$ filtration and FTIR characterization. Firstly, the FTIR gas chamber was vacuumed, and then filled with $SO_2$ gas and the FTIR spectra of pure $SO_2$ was collected; secondly, the same amount of $SO_2$ passed through the filter, and then was collected in the FTIR gas chamber. FIG. 33d shows the FTIR spectra of the pure $SO_2$ before and after the filtration via using the paper towel as the filter media. The main peaks for the pure $SO_2$ are around 521, 1158, 1360, and 2514 $cm^{-1}$ which correspond to S—O bending, symmetric stretching, asymmetric stretching, and linear combinations of changes in the bonding length and angels, respectively. It can be seen that the intensity of these peaks does not change significantly (decreased less than 10%) after passing through the paper towel filter mat. This result is reasonable because the cellulose fiber of the paper towel only possesses active hydroxyl and carboxyl groups that can interact with the $SO_2$ molecules. By comparison of the FTIR spectra of the $SO_2$ before and after passing through the G/PT filter (shown in FIG. 33e), one can easily identify the dramatic changes in the $SO_2$ main peaks. It is found that the S—O bond bending, symmetric stretching, and linear combination peaks completely disappeared. Also, the intensity of the asymmetric S—O stretching was decreased by more than 80%. These results can be explained in that the gelatin protein possesses numerous active functional groups, such as amine, carboxyl, hydroxyl, and charged groups, which can strongly interact and immobilize the $SO_2$ molecules via dipole-dipole interactions and hydrogen bonding. These FTIR results are consistent with the toxic chemical removal efficiency values discussed above. Therefore, the study demonstrates the presence of strong interactions between gelatin nanofibers and various pollutants, particularly toxic gaseous chemicals, in the polluted air. These interactions can lead to the interaction-based filtration mechanisms, alongside with the primary physical capturing mechanism (size effects), which are effective for capturing different particles and toxic chemicals and, as a result, enhancing the multifunctional filtration performance.

Conclusions

The hybrid protein nanofiber-cellulose micro-fiber structures, i.e. protein nanofiber-coated PT filters (both gelatin-based and soy protein composite-based with paper towel as the substrate) presented very high filtration efficiencies for both particulate pollutants with variety of sizes and multiple toxic chemicals. Paper towel engaged as a substrate for protein nanofibers further enhance filtration performance, which can lead to the development of an environmentally friendly, sustainable and low cost air filtering materials. More significantly, this work also demonstrates that the functional groups in the structure of both cellulose and proteins can provide active sites to interact with various types of pollutants. It is found that the functional groups in the natural polymer structures are crucial for capturing the toxic chemicals and particles, in particular, for the particles with sizes smaller than the pore size of the filter mats. Additionally, the hybrid filters made of protein nanofiber-cellulose paper towel presented an extremely high multifunctional filtration performance while possessing a low pressure drop, both of which are most important parameters for feasible applications. In conclusion, this work indicates a class of high efficiency and multifunctional "green" air filtering materials generated from natural protein nanofiber-coated cellulose paper towel. The combination of protein nanofibers with the cellulose microfiber mat (paper towel) as the substrate provides a favorable environmentally friendly material system with excessive potential to capture various even unexpected pollutants from the air owing to their advanced interaction-based filtration mechanism.

While illustrative embodiments have been illustrated and described, it will be appreciated that various changes can be made therein without departing from the spirit and scope of the invention.

The invention claimed is:

1. An air filter, comprising a porous nanofiber mat configured to filter particles having a diameter of about 0.1 μm or greater when air is passed through the air filter, wherein the porous nanofiber mat has a thickness in the range of 8 μm to 30 μm, the porous nanofiber mat comprising a plurality of protein-containing nanofibers, comprising a protein configured to bind to, and thereby filter, at least one chemical species.

2. The air filter of claim 1, wherein at least a portion of the plurality of protein-containing nanofibers consist essentially of protein.

3. The air filter of claim 2, wherein the protein is selected from the group consisting of plant-based proteins, animal-based proteins, and synthetic proteins.

4. The air filter of claim 1, wherein at least a portion of the plurality of protein-containing nanofibers are composite nanofibers comprising protein and a polymer.

5. The air filter of claim 4, wherein the protein is selected from the group consisting of plant-based proteins, animal-based proteins, and synthetic proteins.

6. The air filter of claim 4, wherein the polymer is selected from the group consisting of poly(vinyl alcohol) (PVA), poly(ethylene oxide) (PEO), poly(acrylonitrile) (PAN), and nylon.

7. The air filter of claim 4, wherein the ratio of protein to polymer, by weight, is in the range of 0.5:1 to 2:1.

8. The air filter of claim 1, wherein the at least one chemical species is selected from the group consisting of carbon monoxide, formaldehyde, Sulfur oxides ($SO_x$), nitrogen oxides ($NO_x$), Ammonia ($NH_3$), carbon dioxide ($CO_2$), volatile organic chemicals (VOCs), Ozone ($O_3$).

9. The air filter of claim 1, wherein the air filter is configured for air flow through the air filter such that the resistance to air flow is 250 Pa or less at 4 L/min air flow rate.

10. The air filter of claim 1, wherein the plurality of protein-containing nanofibers have an average diameter of 1000 nm or smaller.

11. The air filter of claim 1, wherein the plurality of protein-containing nanofibers consist essentially of protein and have an average diameter of 100 nm or smaller.

12. The air filter of claim 1, wherein the plurality of protein-containing nanofibers are composite nanofibers comprising protein and a polymer and have an average diameter of 150 nm or smaller.

13. The air filter of claim 1, wherein the plurality of protein-containing nanofibers have a Gaussian diameter size distribution.

14. The air filter of claim 1, further comprising a cellulose-fiber layer that is adjacent to or abutting the porous nanofiber mat.

15. The air filter of claim 14, wherein the cellulose fiber layer provides a mechanical support for the porous nanofiber mat and is configured to filter particles from the air passed through the air filter.

16. The air filter of claim 14, further comprising a second porous nanofiber mat.

17. The air filter of claim 16, wherein the second porous nanofiber mat is adjacent or abutting the cellulose-fiber layer on an opposite side in relation to the porous nanofiber mat.

18. The air filter of claim 16, wherein the composition and configuration of the second porous nanofiber mat are the same as the porous nanofiber mat.

19. The air filter of claim 16, wherein the composition or configuration of the second porous nanofiber mat is different than the porous nanofiber mat.

* * * * *